United States Patent [19]

Sasuga et al.

[11] Patent Number: 5,079,624
[45] Date of Patent: Jan. 7, 1992

[54] DIGITAL IMAGE PROCESSING APPARATUS

[75] Inventors: Kazuyasu Sasuga; Kenichi Yamaguchi, both of Kanagawa, Japan

[73] Assignee: Fuji Xerox Co., Ltd., Tokyo, Japan

[21] Appl. No.: 398,441

[22] Filed: Aug. 25, 1989

[30] Foreign Application Priority Data

Sep. 2, 1988 [JP] Japan .................................. 63-221189

[51] Int. Cl.$^5$ .............................................. H04N 1/46
[52] U.S. Cl. .......................................... 358/75; 358/80
[58] Field of Search ............... 358/401, 429, 447, 448, 358/452, 453, 454, 455, 456, 457, 458, 462, 463, 464, 75

[56] References Cited

U.S. PATENT DOCUMENTS

| | | | |
|---|---|---|---|
| 4,642,683 | 2/1987 | Alkofer | 358/447 |
| 4,663,662 | 5/1987 | Sekizawa et al. | 358/447 |
| 4,679,155 | 7/1987 | Mitsuka | 358/450 |
| 4,698,691 | 10/1987 | Suzuki et al. | 358/458 |
| 4,823,194 | 4/1989 | Mishima et al. | 358/464 |
| 4,896,208 | 1/1990 | Moriya et al. | 358/453 |
| 4,939,590 | 7/1990 | Tada | 358/454 |
| 5,014,123 | 5/1991 | Imoto | 358/75 |

FOREIGN PATENT DOCUMENTS

| | | | |
|---|---|---|---|
| 2170372A | 7/1986 | United Kingdom | 358/454 |
| 2170373A | 7/1986 | United Kingdom | 358/454 |

*Primary Examiner*—Jin F. Ng
*Assistant Examiner*—Jerome Grant, III
*Attorney, Agent, or Firm*—Finnegan, Henderson, Farabow, Garrett and Dunner

[57] ABSTRACT

A digital image processing apparatus which receives color-separation signals of a picture represented in terms of gradation and converts the color-separation signals into binary signals of on and off, comprises a toner signal conversion and adjustment means for adjusting the density of a plurality of the color-separation signals to produce a plurality of gradation toner signals representing a density of or an amount of toner of process colors, producing india ink, and extracting gradation toner signals of development process color; a process toner signal processing means for applying processes for Moire prevention and edge emphasis to the gradation toner signals to convert into binary toner signal of on and off; a region picture control means for producing control information for each of a plurality of regions to control the toner signals conversion and adjustment means and the process toner signal processing means; and an edit control means having a plurality of edit regions and edit information for controlling the graduation toner signals in the edit regions in accordance with the edit information.

22 Claims, 46 Drawing Sheets (REDUCTION)         (ENLARGEMENT)

DIGITAL IMAGE PROCESSING APPARATUS

BACKGROUND OF THE INVENTION

1. Field of the Invention

The present invention relates to an apparatus for forming and providing color pictures in color copying machines, color printers, facsimile and the like, and more particularly to a digital image processing apparatus in which a color image signal is digitally processed for color conversion and adjustment of the image to be reproduced.

2. Prior Art

Conventionally, a a color picture forming apparatus has been provided in the form of a large sized printing apparatus in publishing and printing industries. However, an apparatus having sufficient functions for general use is expensive in cost, and therefore only a simple color printer suitable for hobby use has been provided in the market.

Recently, more attention has been given to a color printing in the industry. For example, the color printing is applied to news paper. With such an increasing demand for color printing, the color copying machines have become more commercially acceptable in terms of cost.

A color picture forming apparatus such as a copying machine is equipped with a developing machine for toners consisting of Y (Yellow), M (magenta), C (cyan), and K (black) for reproducing a full-color image, in which the respective color toners are transferred and printed over the preceding colors to reproduce a color picture. In other words, four successive copying processes have to be carried out for obtaining a full-color picture. Thus, a copy operation for copying a color picture of a color original placed on a platen is carried out as follows. The color picture of the original is first optically read out to be optically separated into the respective colors, and then the signals so read out are converted into a density signal for each toner. On the basis of the density signal, a modulation signal for modulating a laser light to which a photosensitive material is exposed is produced, to thereby perform the copy at an image output terminal. Particularly, reproducing a color picture includes reproduction of pictures having intermediate gradation such as photographs and paintings and reproduction of pictures including lines and characters, and therefore high level of signal processing is required for reproducing the colors and gradation according to both reproductions.

Generally, a large capacity of memory is required if four image signals obtained by one optical scanning operation of the original document are simultaneously stored for the four copying processes. Accordingly, the scanning operation and the subsequent processing of the image signals thus obtained are carried out every copy process and successively repeated at four times as a whole. In this method, the image signals are obtained as gradation signals of colors B (blue), G (green), and R (red) into which the picture is optically separated, and are converted into toner signals for those colors. As described above, the image signal is required to be subjected to various processings. Accordingly, the signal is converted into a digital signal at a first stage, and then to a binary signal of ON and OFF, at a final stage. The binary signal is used to control a laser beam to reproduce a picture having intermediate gradation through development of dot gradation.

As described above, a conventional full-color copying machine carries out four copying processes to superpose the respective color pictures on one another, and more attention is given to improve reproducibility of color, gradation, and fineness of the picture.

For example, color-separation signals of B, G and R which have been obtained by optically reading the original document are not matched up color balance due to the difference between characteristics of the respective sensors and the image thereof suffers blur. Thus, it is the most important problem how the blur is eliminated from such signals and color-balanced toner signals are obtained. Further, there occurs a problem that addition of K (black) causes muddiness when K is added to Y, M, and C. Still further, how smooth tone and emphasis of an edge are adjusted in a picture of letters and a picture having intermediate gradation such as a photograph or a painting is another problem.

While the color picture forming apparatus is expected to be capable of performing a wide variety of editing such as color conversion, mono-color, full-color, a line drawing for coloring, another problem occurs what actual editing functions are to be provided and how they are to be carried out.

SUMMARY OF THE INVENTION

An object of the invention is to provide a digital image processing apparatus having high reproducibility of color, gradation, fineness (resolution), and high data processing efficiency.

A digital image processing apparatus according to this invention in which color-separation signals of a picture represented in terms of gradation are converted into binary signals, comprises, a toner signal conversion and adjustment means for adjusting the density of a plurality of the color-separation signals to produce a plurality of gradation toner signals corresponding to a density of or an amount of toner of development color, producing india ink (black), and extracting gradation toner signals of development process color, a process toner signal processing means for applying processes for Moire prevention and edge emphasis to the gradation toner signals and converting into binary toner signal, region image control means for producing control information for each of a plurality of regions to control the toner signal conversion and adjustment means and the process toner signal processing means, and edit control means having a plurality of edit regions and edit information for controlling the gradation toner signals in the edit regions in accordance with the edit information.

BRIEF DESCRIPTION OF THE DRAWINGS

Features and details of the present invention will be apparent from the description of specific embodiments with reference to the accompanying drawings in which.

DETAILED DESCRIPTION OF PREFERRED EMBODIMENTS

An embodiment of the invention will now be described in detail with reference to the accompanying drawings.

While in the embodiment a color copying machine will be described as an example of a recording apparatus, the invention will not be limited to this embodiment but may also be applied to a printer, a facsimile machine, and other image recording apparatuses.

Table of content of the specification is presented below, in which items (I) to (II) will present general description of overall construction of a copying machine to which the present invention is applied and item (III) will describe the embodiment of the present invention used in the copying machine.

(I) GENERAL DESCRIPTION OF APPARATUS (I-1) Arrangement of apparatus
(I-2) Functions and features of system
(I-3) Arrangement of electric control system

(II) SPECIFIC ARRANGEMENT OF RESPECTIVE UNITS (II-1) System
(II-2) Image input terminal (IIT)
(II-3) Image output terminal (IOT)
(II-4) User interface (U/I)
(II-5) Film image reading device

(III) EMBODIMENT OF THE PRESENT INVENTION (III) (III-1) Image processing system (IPS)
(III-1) (III-2) Module arrangement of IPS
(III-2) (III-3) Hardware arrangement of IPS

(I) GENERAL DESCRIPTION OF APPARATUS (I-1) Arrangement of apparatus

Figure 1:
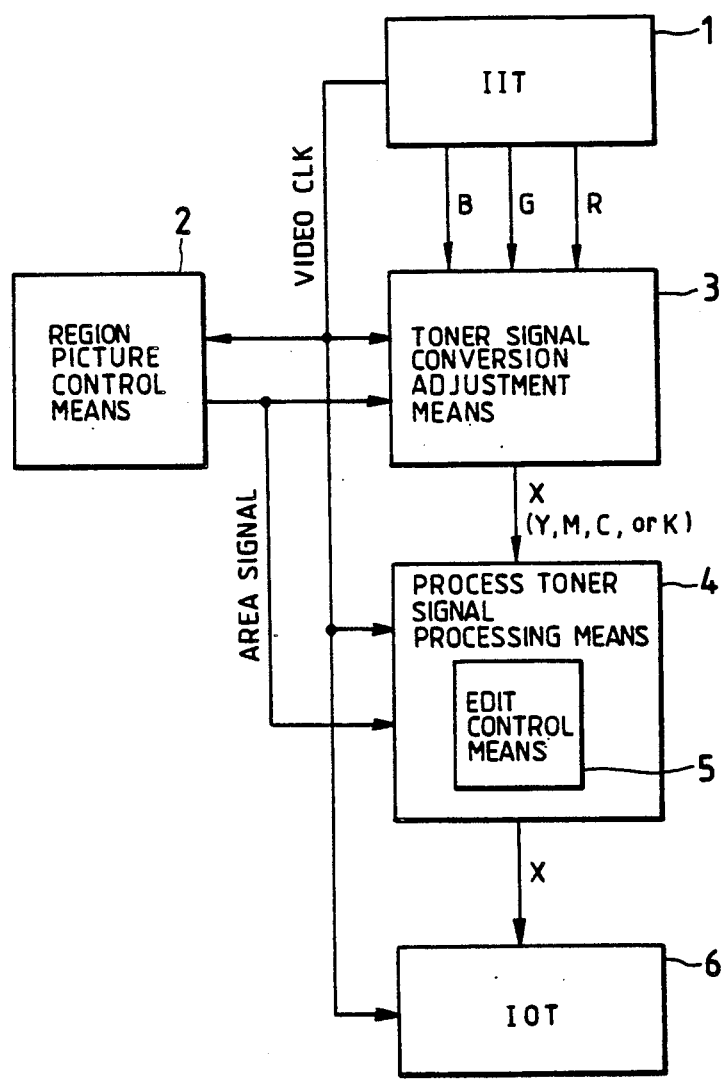
FIG. 1 illustrates an embodiment of a digital image processing apparatus according to the present invention.

FIG. 1 shows a basis arrangement of the digital image processing apparatus according to the present invention. In FIG. 1, the color-separation signals B, G and R of a color image are input through, for example, an IIT (image input terminal) 1 to be converted into a binary toner signals X of "on" and "off", and then outputted to an IOT (image output terminal) 6. More specifically, the digital image processing apparatus of this invention comprises a toner signal conversion/adjustment means 3, a process toner signal processing means 4, a region image control means 2, and an editing control means 5. The toner signal conversion/adjustment means 3 adjusts the density of the plurality of color-separation signals B, G and R using a conversion table so as to convert into a plurality of toner signals Y, M and C that correspond to the amount or density of the toner of the developing colors and then produces an india ink K(black), thereby producing the toner signals X (Y, M, C, or K) for the development process colors. The process toner signal processing means 4 processes the toner signals X to prevent Moire and to emphasis the edges, and then converts the toner signals into the binary toner signals x of "on" and "off". The region image control means 2 produces control information for each of a plurality of regions to thereby control the toner signal conversion/adjustment means 3 and the process toner signal processing means 4. The editing control means 5 has a plurality of edit regions and edit information, and controls the toner signals in the edit region on the basis of the edit information.

The toner signal conversion/adjustment means 3 performs the density adjustment to obtain a plurality of toner signals Y, M and C which correspond to the color toners for development, so that the density-balanced toner signals Y, M, and C are obtained to permit color region judgment of a picture, edge judgment and frame erasure of an original document with high accuracy, and further various processes such as color conversion, backgroundcolor removal, and india ink production are easily carried out. The toner signals X of the process colors are subjected to digital filtering to produce the binary toner signals X of ON/OFF, whereby efficient processings for preventing the moire and blur and emphasizing an edge are carried out. The region image control means 2 produces the control information of the region, so that the color conversion and the control on a region basis in accordance with color modes such as mono-color and full-color and picture modes such as photograph and characters are easily performed. Further, addition of image data such as netting and line drawing for coloring or modification and edit of the image data can be made by the editing control means 5.

Figure 2:
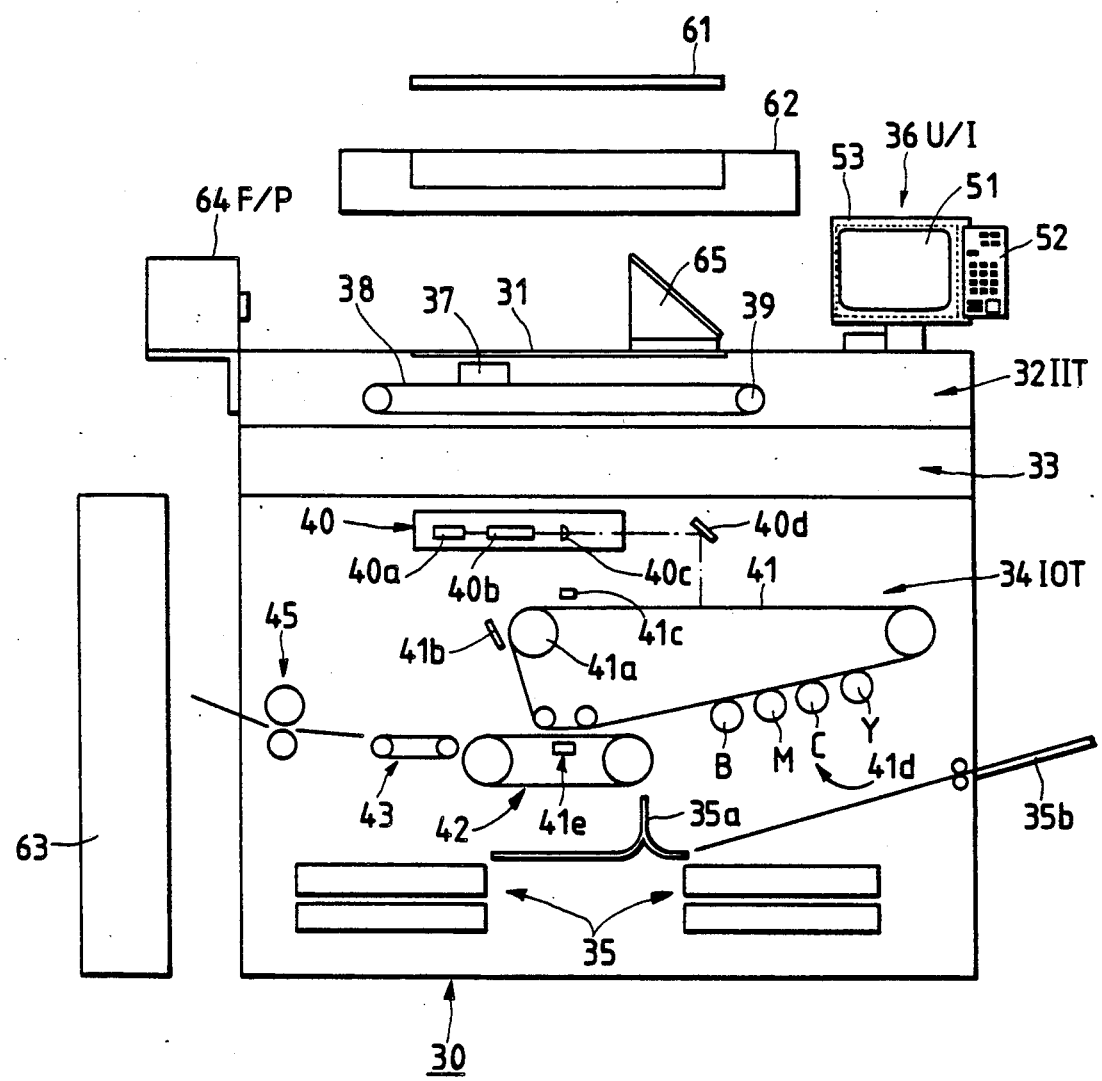
FIG. 2 illustrates an example of a color copying machine to which the present invention is applied.

FIG. 2 shows an example of an overall construction of a color copying machine to which the present invention is applied.

The color copying machine comprises a base machine 30 as a core construction, a platen glass 31 on which an original document is placed, an image input terminal (IIT) 32, an electrical control housing 33, an image output terminal (IOT) 34, a sheet tray 35, and a user interface (U/I) 36. The copying machine may include optionally an edit pad 61, an auto document feeder (ADF) 62, a sorter 63 and a film projector (F/P) 64.

Controlling of the IIT, IOT, and U/I, etc. requires electrical hardware, are assembled on a plurality of boards each of which is used for each of IIT, IPS for image-processing the output of the IIT, U/I, F/P and IOT, respectively. These boards, together with an SYS board for controlling them and an MCB board (machine control board) for controlling IOT, ADF and a sorter, etc. are accommodated in an electrical control housing 33.

The IIT 32 includes an imaging unit 37, a wire 38 for driving the imaging unit 37, and a driving pulley 39, and reads the color document every color of the primary colors, i.e. B (blue), G (green), and R (red) by using the CCD line sensors and a color filter in the imaging unit 37 and convert signals thus read out into digital image signals to output to the IPS. The IPS converts the respective B, G, and R signals into the primaries of toner Y (yellow), C (cyan), and M (magenta), K (black), and further carries out various data processing for converting the toner signal of the process color into binary toner signals and output to the IOT 34.

The IOT 34 has a scanner 40 and a photosensitive material belt 41 and converts at a laser output unit 40a the image signal from the IPS into an optical signal, and then causes a latent image corresponding to a picture on the document to be formed on the photosensitive material belt 41 through a polygon mirror 40b, F/θ lens 40c and a reflection mirror 40d. The sensitive material belt 41 is driven by a driving pulley 41a, around which a cleaner 41b, a charger 41c, developing machines 41d for each of Y, M, C and K, and a transferer 41e are disposed. A transfer device 42 is provided opposing to the transferer 41e to draw the sheet delivered from the paper tray 35 via a paper delivery path 35a. For example, the transfer device 42 rotates four times in the full color copy mode so as to transfer the image onto the sheet in the order of Y, M, C, and K.

The sheet to which an image is transferred is delivered by means of a vacuum delivery device 43 to a fixing device 45 where the sheet is subjected to fixing and is then discharged. The sheet is also selectively delivered to the sheet delivery path 35a via an SSI (single sheet inserter) 35b.

The U/I 36 is a device through which the user selects desired functions and commands execution condition thereof, and is provided with a color display 51 and a hard control panel 52 on its side. Further, an infrared touch board 53 is combined with the U/I 36 so that the operator can command directly through "soft buttons" on a screen.

Options for the base machine 30 will be described hereinafter. One of the options is that the edit pad 61 as a coordinate input device is placed on the platen glass 31 to permit edit of the various images through an input pen or a memory card. Another option is that the apparatus allows ADF 62 and sorter 63 used in the art to be mounted thereon.

The further feature of the present invention is that a mirror unit (M/U) 65 is placed on the platen glass 31 upon which a film picture is projected from an F/P 64, and then the projected picture is read as an image signal by an imaging unit 37 of the IIT32, thereby allowing direct color copy from a color film. In this case, the document include a negative film, a positive film, and slides. Also, the embodiment is equipped with an autofocus device and an automatic exchange device for a correction filter.

(I-2) Functions and features of system (A) Functions

An apparatus according to the present invention is provided with a wide variety of functions that fulfill the users' needs and is automated the copy procedures thereof from input terminal to output terminal, while also the user interface allows a CRT display to display selection of functions, selection of execution conditions of the functions, and other menus, thereby permitting everybody to readily accesses and operate the apparatus.

The major functions of the apparatus include, for example, the operations of start, stop, all clear, the key, interrupt, information, and language selection, etc. by operating hard control panel, that cannot be specified by the operation flow, and the various functions may be selected by touch-operating the "soft button" on the basic picture. Touching the pass way tab corresponding to the pass way that is a function selection region permits the user to select various edit functions such as marker edit, business edit, creative edit, etc., thereby allowing the users to operate the apparatus with conventional "copy feeling" for both the full-color copy and the black and white copy.

The present invention is characterized by the full color function having four colors, and additionally three colors and black may be selected, respectively.

The sheet feeding operation may be carried out in both of the automatic sheet selection feeding and in the specified sheet feeding.

Reduction/enlargement may be set with an increment of 1% in the range from 50% to 400%. Also the apparatus is provided with a function of unequal enlargement in which length and breadth are scaled independently of each other and a function of automatic scale selection.

The copy density for a black and white document is automatically adjusted.

Automatic color balance adjustment is applied to a color document and a color to be reduced in tone on the copy may be specified.

A memory card can be used for writing jobs thereinto as well as for reading the jobs therefrom. The memory card can store up to eight jobs. In addition, optional functions include COPY OUTPUT, COPY SHARPNESS, COPY CONTRAST, COPY POSITION, FILM PROJECTOR, PAGE PROGRAMMING, and MARGIN. In COPY OUTPUT, if the machine is equipped with a sorter as an option, then a maximum adjusting function is enabled to automatically set the number of sheets to be copied within a bin tray capacity when "Uncollated" is selected.

COPY SHARPNESS for performing edge emphasis is provided with a photograph sharpness adjusting function consisting of optional seven-step manual sharpness adjustment, photograph(photo), character, dot print(print), and mixture of photograph and character (photo/character). The copy sharpness may be arbitrarily set by selecting default or tool pass way.

COPY CONTRAST can be controlled in seven steps by an operator and its default may be arbitrarily set through the tool pass way.

COPY POSITION is a function for selecting a position on a sheet to be copied at which a copy image is to be transferred. Options include auto centering function for aligning the center of the copy image with the center of the sheet, and default is auto centering.

FILM PROJECTOR is used for copying various kinds of films, in which a 35 mm negative/positive projection, placing a 35 mm negative film on the platen, placing a slide film of 6 cm×6 cm on the platen, and placing a slide film of 4 inch×4 inch on the platen, can be selected. In FILM PROJECTOR, the A-4size sheet is automatically selected unless a particular size of paper is selected. Within the film projector pop up is provided color balance function which corrects the tone to more redish if color balance is positioned to "redish" and to more bluish if positioned to "bluish". Also unique automatic density control and manual density control are available. PAGE PROGRAMMING includes cover function in which a front/back cover or a front cover is added to the copy, insert function in which a sheet of white paper or a color paper is inserted between the copies, color mode in which color mode may be set according to pages, and sheet selection function in which a sheet tray may be selected together with color mode according to the pages of the document.

MARGIN can be set with an increment of 1 mm in the range from 0 to 30 mm and may be set at only one side of a document.

MAKER EDIT is a function in which editing process may be performed to a region defined by a marker. The marker edit deals with a written document and therefore the document is dealt with as a black and white document. In the BLACK mode, a portion within a specified region is converted into the pallet colors on the GRT and portions other than the specified region is set to black copy. In the RED/BLACK mode, the image within the specified region is converted into red while portions other than the specified region is processed as a red/black copy. The red/black mode is provided functions of TRIM, MASK, COLOR MESH, and BLACK TO COLOR.

A region is specified by drawing a closed loop on the document or by means of the ten key or the edit pad. The region is specified in the same manner for the following respective edit functions. The specified region is displayed in similar figures in the bit map area on the CRT.

In TRIM, only the image within the marked region is copied in black and white while the image outside the marked region is erased.

In MASK, the image within the marked region is erased while the image outside the marked region is copied in black and white.

In COLOR MESH, the color pattern of a specified color is placed within the marked region; the image is copied in black and white; the color mesh is available in eight standard colors (preselected colors) and eight registered colors (the user can register up to eight colors out of 1.65 millions colors at a time), with four different patterns.

In BLACK-TO-COLOR, the image in the marked region may be copies in any color selected from the eight standard colors and the eight registered colors.

BUSINESS EDIT aims at quick preparation of high quality documents, particularly business documents. The document is treated as a full-color document, specifying an area or a point is required in all the functions; and a plurality of functions can be set for a single document.

In BLACK/MONO COLOR mode, an area other than the specified region is treated as a black or monocolor copy, the black image is color converted into the pallet colors on the CRT while in the red/black mode an area except the specified region is applied the red/black copy and inside of the specified region is converted into red.

As in MARKET EDIT, the BLACK/MONO COLOR mode is provided with LOGOTYPE, LINE, PAINT 1, CORRECTION, and FUNCTION CLEAR in addition to TRIM, MASK, COLOR MESH, and BLACK-TO-COLOR.

The LOGOTYPE is a function for insertion a logotype such as a symbol mark at a specified point, and two types of logotype may be placed longitudinally or transversely. Only one logotype is allowed to be set for one document and logopattern is supplied in a ROM to individual customers. The LINE is a function for drawing a horizontal line or a line perpendicular to an x-axis by two-point indiction, color of which may be selected from the eight standard colors and the eight registered colors for each line.

The number of lines which can be specified is not limited but up to only seven colors can be used at a time.

The PAINT 1 is a function for specifying a point within a loop to paint out each of the loops with a color selected from the eight standard colors or the eight registered colors, on color for one loop.

The COLOR MESH may be selected form the four different patterns for each area. The number of loops that can be specified is not limited but the number of the color mesh patterns available is up to seven patterns.

The CORRECTION function includes area/point change in which setting function may be confirmed and modified for each area, area/point correction in which the size of area and the position of the point can be changed with an increment of 1 mm, and area/point cancel mode for erasing the specified are. The CORRECTION performs confirmation, modification, change, and erasure of the specified region.

The CREATIVE EDIT includes IMAGE COMPOSITION, COPY ON COPY, COLOR COMPOSITION, PARTIAL IMAGE SHIFT, MULTI PAGE ENLARGEMENT, PAINT 1, COLOR MESH, COLOR CONVERSION, NEGATIVE/POSITIVE TURN, REPEAT, PAINT 2, DENSITY CONTROL, COLOR BALANCE, COPY CONTRAST, COPY SHARPNESS, COLOR MODE, TRIM, MASK, MIRROR IMAGE, MARGIN, LINE, SHIFT, LOGOTYPE, SPLIT SCAN, CORRECTION, FUNCTION CLEAR, and ADD FUNCTION. In the CREATIVE EDIT function, the document is treated as a color document and a plurality of functions can be set to a single document, more than two functions can be set to a single area, and the areas that can be specified are a square specified by two points and a point specified by a single point.

IMAGE COMPOSITION is a function in which after a base original document is color copied in four cycles, the sheet is held on the transfer device, the original document is subsequently trimed, and is then overcopied in four cycles to be output.

COPY ON COPY is a function in which a first original document is copied in four cycles, then the sheet is held on the transfer device, and a second original is overcopied in four cycles to be output.

In COLOR COMPOSITION, a first original is copied in magenta, then the sheet is held on the transfer device, a second original is subsequently overcopied in cyan, the sheet is held on the transfer device, a third original is overcopied subsequently in yellow and then the paper is output. The sheet is further overcopied in black if it is FOUR COLOR COMPOSITION.

PARTIAL IMAGE SHIFT is a function in which after color copy operation is effected in four cycles, the sheet is held on the transfer device and is subsequently overcopied in four cycles, na is then output.

In FULL COLOR MODE, the copy is carried out in four cycles in the full-color mode, three cycles in the three color mode except when the edit mode has been set, one cycle in the black mode except when the edit mode has been set, and one to three cycles in the plus-one-color mode.

TOOL PASSWAY includes AUDITRON, MACHINE SET UP, DEFAULT SELECTION, COLOR REGISTRATION, FILM TYPE REGISTRATION, COLOR CORRECTION, PRESET, FILM PROJECTOR SCAN AREA CORRECTION, AUDIOTONE, TIMER SET, BILLING METER, DIAGNOSTIC MODE, MAX ADJUSTMENT, and MEMORY CARD FORMATING. In order to set and change via these TOOL PASSWAY, a pass word must be input. Therefore it is only the key operator and the customer engineer who is able to set or change through TOOL PASSWAY. Also, it is only a customer engineer who can enter DIAGNOSTIC MODE.

COLOR REGISTRATION is used for registering colors on register color buttons in the color pallet and the color is read in from a color document by means of a CCD line sensor.

COLOR CORRECTION is used for fine adjustment of the colors registered on the register color buttons.

FILM TYPE REGISTRATION is used to register a register film type for the film projector mode. When not registered, the register button can not be selected on the film projector mode picture.

PRESET presets the reduction/enlargement scale, copy density in seven steps, copy sharpness in seven steps, and copy contrast in seven steps.

FILM PROJECTOR SCAN AREA CORRECTION is for adjusting scan area in the film projector mode.

AUDIO TONE adjusts the volume of selection sound, etc.

TIMER SET sets a timer which may be opened to the key operator.

Additionally, the apparatus according to the present invention is provided with a crush recovery function for restarting the subsystem when the subsystem falls in the crush condition, a function for setting fault mode if the subsystem still does not recover after two crush recovery operations, and functions for recoverying from a jammed condition and for stopping in emergency.

Further, combination of the basic copy and the optional functions, basic/optional function and market edit, and business edit and creative edit may be possible.

An entire system according to the present invention provided with the above described functions has the following features.

(B) Features (a) Achieving a full-color of a high quality of pictures

The present invention improves reproducibility of black picture quality, light color reproducibility, generation copy quality, OHP picture quality, thin line reproducibility, reproducibility of picture quality in a film copy, and copy maintenability, thereby accomplishing high picture quality of full color that can reproduce clear color documents.

(b) Cost reduction

The present invention reduced costs of photosensitive material, developing machine, cost of picture material and consuming parts such as toner as well as service costs such as UMR and parts cost, while at the same time the apparatus may be used as a black and white copy machine as well. In addition, in the black and white copy, a copy speed of 30 sheets/A4 size, which is about three times that of conventional apparatus, has been achieved, thereby reducing running cost of the apparatus and the cost for each copy.

(c) Improving productivity

An ADF and a sorter (option) are provided as an input output device for processing a large number of sheets of documents; enlargement scaling may be selected in the range from 50–40%; maximum document size is A3 size; the sheet tray is arranged to be B5 to B4 size for the upper tray; B5 to B4 size for the middle tray: B5 to A3 size for the lower tray; and B5 to A3 size for the lower tray; and B5 to A3 size for SSI.

The copy speed in four full colors is 4.8 CPM for A4 size, 4.8 CPM for B4 size, 2.4 CPM for A3 size, 19.2 CPM for A4 size, 19.2 CPM for B4 size, and 9.6 CPM for A3 size. The warm up time is less than eight minutes. FCOT of less than 28 seconds for the four full colors and of less than 7 seconds for the black and white have been achieved. Also successive copy speed of 7.5 sheets/A4 for the full color and 30 sheet/A4 for the black and white have been achieved, thereby accomplishing high productivity.

(d) Improving operability

Using both hardware buttons on a hard control panel and software buttons on a CRT picture software panel, selection of functions may be directly selected, easy for beginners and comfortable for well skilled persons. Operability is improved by gathering operation at one place whenever possible, while also colors are used effectively so as to convey necessary information to the operator.

High fidelity copy is effected by only operating controls on the hard control panel and the basic pictures. Operating the hard buttons enables START, STOP, ALL CLEAR, and INTERRUPT while operating the software panel on the basic picture permits PAPER SELECTION, REDUCTION/ENLARGEMENT/, COPY DENSITY, PICTURE QUALITY ADJUSTMENT, COLOR MODE, and COLOR BALANCE ADJUSTMENT, so that the users who have been accustomed to a conventional monocolor copy machine can use without problems. Further, only touch-operation of pass way tabs in the pass way region on the software panel opens up the pass way to select the various edit functions. Still further, storing copy mode and execution conditions thereof in a memory card in advance permits the required operations to be automated.

(e) Well developed functions

Touch-operating the pass way tab in the pass way region of the software panel opens to enable the various edit functions e.g., editing of black and white documents is made possible by the use of a tool in the form of a marker in the market edit, original documents of high quality, particularly the business documents, can be made quickly in the business edit, and various edit functions are available in the creative edit, large number of selection branches are provided in the full color and the monocolor, thereby the copy machine adjusting itself to requirements from specialists including designers, copy service business people, and key operators. The are specified by the edit functions is displayed in the bit map area so that the specified are can be confirmed. In this manner, a variety of edit functions and color creation greatly enhances expressive effects of the written document.

(f) Accomplishing power saving

A maximum power consumption of 1.5 kVA is enough to realize a copy machine of four full colors, and high performance. Control methods have been carefully employed so that the respective modes can be operated within the 1.5 kVA as well as an allowable power consumption is judiciously distributed throughout the machine for the target total power consumption of 1.5 kVA. An energy flowchart is made for visualizing energy distributing routes as well as supervision and verification by using the energy flow chart.

(C) Example of discriminating against other users

A duplicator to which the present invention is applied is used both as a full-color copying machine and a black and white copy machine, and additionally not only allows the beginners to easily copy and the well accustomed people to promptly copy, but also enables to make original documents. Thus the copying machine can adjust itself to the use by specialists and artists, thereby allowing discrimination against other users with respect to the use of the copying machine. The followings are examples.

For example, the copy machine according to the invention can make posters, calendars, cards, or invitation cards or new year cards with conventionally printed photographs at much lower costs if quantity is not so large. Also making full use of the edit functions, for example original calendars may be made to one's preference. It is made possible to make a wide variety of creative calendars on a department basis which would otherwise be printed in a uniform fashion on a company basis.

As is evident in interior designs and electric appliances, color influences sales volume significantly, copying a colored design at manufacture steps in the interior design and clothes permits a plurality of people to review of the design as well as color thereof, thus assisting in developing new colors that may derive more market demand. In apparell industry, when placing an order of products to a remote manufacturing site, sending a copy of a colored final drawing enables to specify colors more exactly than even before, thereby improving work efficiency.

Further, the present invention allows copy work both in color and in black and white, thus either of the black and white copies and the color copies may be made from a sheet of document, as many copies as required in each mode. Therefore, when studying the color at technical schools and universities, it is possible to represent a colored design both in color and in black and white, and comparing them quickly reveals, that, for example, red is of almost the same brightness as grey, thus allowing to study the effect of brightness and color to visual sensation.

(I-3) Arrangement of electrical control system

In this section, hardware architecture, software architecture and state division will be described as electrical control systems of the invention.

(A) Hardware architecture and software architecture

Using a color CRT as UI (user interface) as in the present invention, necessarily increases the amount of data for color display as compared to the use of a black and white CRT, as well as attempting to build a more friendly UI by carefully arranging the structure of a display picture and transition of the picture will increase the amount of data.

To overcome the drawback, a CPU equipped with a memory of a large capacity may be employed but will impose problems that the printed circuit board will be large in size, therefore it is difficult to house the circuit board in a main body, it is difficult to take a flexible measure to changes of the specification, and the cost will be high.

Thus in the present invention, devices such as a CRT controller that can be shared by other models or apparatuses are treated as "remote", thereby decentralizing the CPU to adjust the copy machine itself to an increase in the amount of data.

The electrical hardware is roughly divided into three systems i.e., UI system, SYS system, and MCB system. UI system includes a UI remote 70. SYS system is decentralized into an F/P remote 72 for controlling the F/P, IIT remote 73 for reading a document, and an IPS remote 74 for various picture processings, which are all supervised by SYS (SYStem) remote 71. SYS remote requires a tremendously large capacity of memory for programs for controlling picture transition of UI; therefore "8086" equipped with 16 bit CPU is employed. For example, other CPU such as "6800" may also be used in place of "8086". MCB system is decentralized into VCB (Video Control Board) which is an ROS (Raster Output Scan) for receiving from IPS remote 74 and outputting to IOT a video signal used in producing a latent image on the sensitive material belt by laser, RCB remote 77 for the servo of a transfer device (turtle), IOB remote 78 which serves as an I/O port for IOT, ADF, a sorter, and accessories, and ACCESSORY remote 79, which are all supervised by MCB (Master Control Board) remote 75.

Each remote in FIG. 3i s formed of a single printed circuit board. Solid lines in the figure indicate an LNET high speed communication network of 187.5 kbps; thick dotted lines represent a master/slave serial communication network of 9600 bps; and thin solid lines show hot lines as a transmission line for control signals. A line attended by "76.8 kbps" is an exclusive line for reporting, from UI remote 70 to IPS remote 74, and graphical information depicted in the edit pad, copy mode information that is input from the memory card, graphical information in the edit area. "CCC" (Communication Control Chip) in the figure is an IC for supporting protocol of the high speed communication line LNET.

Figure 4:
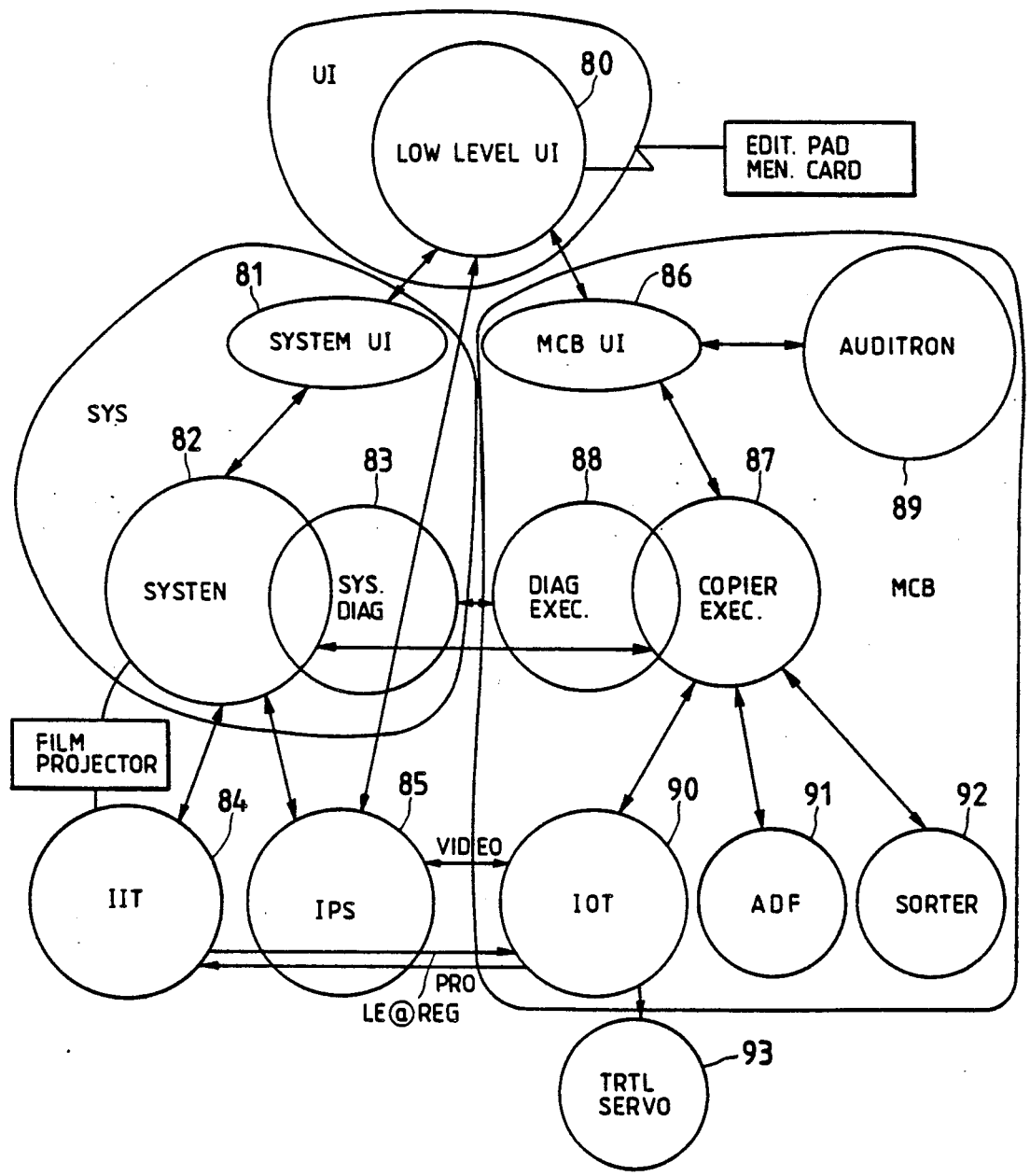
FIG. 4 is a diagram for showing a software architecture.

As described above, the hardware is roughly divided into three systems of UI, SYS, and MCB, and the processes handled by the respective systems will be described with reference to the software architecture in FIG. 4 as follows. Arrows in FIG. 4 indicate data transmit/data receive over the LNET high speed communication network of 9600 bps or communication relationship between control signals via the hot lines.

UI remote 70 includes LLUI (Low Level UI) module 80 and modules (not shown) for processing data related to the edit pad and the memory card. LLUI module 80 is a software module, similar to those known as a CRT controller, for displaying on the color CRT. What picture is to be displayed at that time on the CRT is controlled by either SYSUI 80 or MCBUI module 86. Thus it is evident that the UI remote can be shared by the other models or devices. Because while what picture structure or picture transition should be employed depends on the individual models of copying machines, the CRT. SYS remote 71 consists of three modules, i.e., SYSUI module 81, SYSTEM module 82, and SYS.-DIAG module 83. SYSUI module 81 is a software module for controlling the picture transition while SYSTEM module 82 is a module which comprises a software that selects F/F (Feature Function) for recognizing which coordinate in which picture has been selected, i.e. what type of job has been selected, a software for finally checking jobs whether there is any conflict between the copy execution conditions, and a software for receiving and transmitting various information such as F/F selection between the other modules, job recovery, and machine states. SYS.DIAG 83 is a module that operates in customer simulation mode in which copy is taken in diagnostic state for self diagnosis.

Customer simulation mode operates in the same manner as the normal copy thus SYS.DIAG module 83 is substantially the same as SYSTEM module 82, therefore SYS.DIAG module is used in a special state of diagnosis; it is described, separately from but partly overlapped with SYSTEM module 82. Within IIT remote 73 is stored IIT module 84 for controlling a stepping motor used in an imaging unit and within IPS remote 74 is stored IPS module 85 for performing various process related to IPS. These modules are controlled by SYSTEM module 82.

Within MCB remote are stored MCBUI module 86 which is a software for controlling the picture transition when faulting diagnostic, auditron, and jam, IOT module 90 for carrying out necessary processes when performing copy operation such as control of sensitive material belt, control of a developing machine and control of a fuser etc., ADF module 91 for controlling ADF, respective software modules for controlling SORTER module 92 and COPIER EXECUTIVE module for supervising the respective software module 87, diag-executive module 88 for carrying out various diagnostic processes, and auditron module 89 for accessing the electronic counter through a password number to process copy charge. On RCB remote 77 is stored a turtle servo module 93 which is under control of IOT module 90 to carry out transfer process of zero graphy cycle. In FIG. 4, COPIER EXECUTIVE module 87 and DIAG EXECUTIVE module 88 are shown partly superposed for the same reason as SYSTEM module 82 and SYS.DIAG module 83 are shown in a partly superposed relation.

Figure 5:
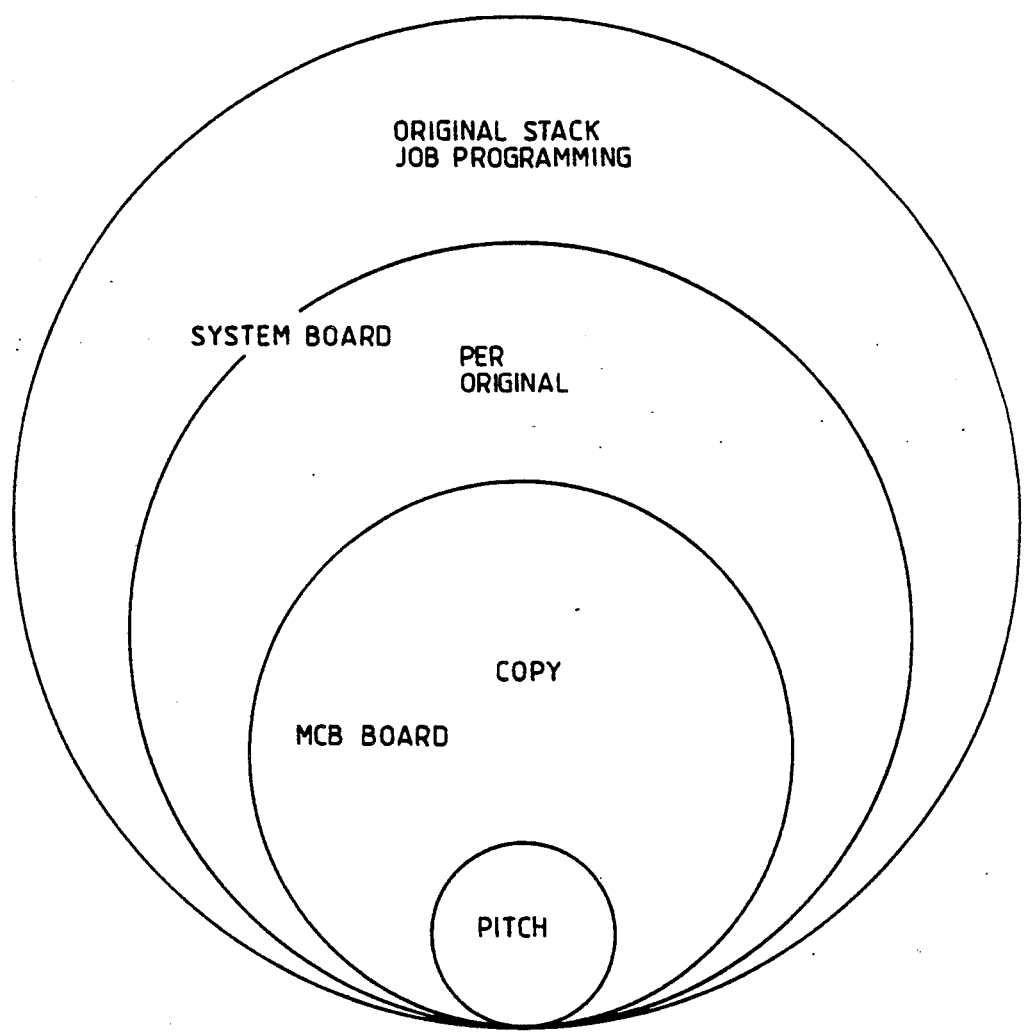
FIG. 5 shows a copy layer.

The tasks for thus far described processes will be described as follows, following flow of copy operation. The copy operation is almost repetition except the difference in color to be developed; therefore the copy operation can be grouped into some layers as shown in FIG. 5. A sheet of color copy is processed by repetitively processing some minimum units of process called a pitch.

Figure 3:
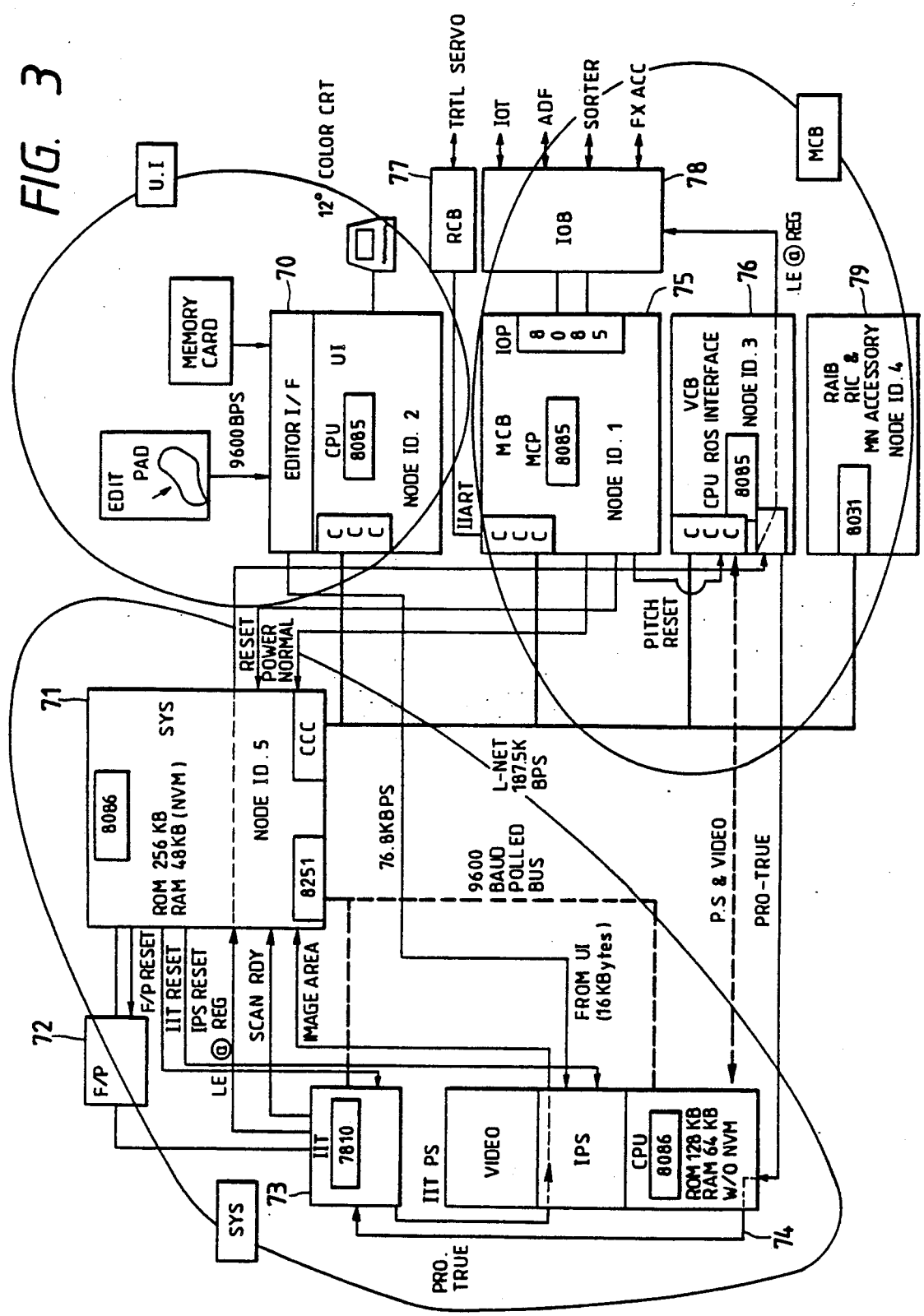
FIG. 3 is a diagram for showing a hardware architecture.

Specifically, they are operating steps of moving the imaging unit, deliverying the sheet, and detecting jamming when taking a sheet of copy in a single color. Processing these "pitches" for each of the three colors, Y, M, and C completes a sheet of three-color copy and processing for each of Y, M, C, and K completes a full-color copy of four colors. This is called a copy layer which specifically causes the fuser to fix the image after transferring of the toner of the respective colors onto the sheet and then delivers the sheet from the main body of the copy machine. The process up to this stage of the copy operation is supervised by COPIER EXECUTIVE module 87 of MCB system. Of course while the pitches are processed, IIT module 84 and IPS module 85 residing in the SYS system are also used, and for this purpose, a PRO signal and a LE@REG signal are transmitted and received between IOT module 90 and IIT module 84 as shown in FIG. 3 and FIG. 4. Specifically, the PRO signal that is output from IOT module 90 is supplied to VCB remote 76 from MCB remote 76 via LNET, and then further from VCB remote 76 to IPS remote 74 as well ask IIT remote 73 over the hot line. Thereby the pitches are processed with both IIT remote 73 and IPS remote 74 being in synchronism with IOT. During which, between IPS remote 74 and VCB remote 76 is transmitted and received a video signal by which a laser light for forming the latent image on the sensitive material belt is to be modulated, the video signal received by VCB remote 76 is supplied to MCB remote 75 through LNET and then to a laser output unit 40a of IOT via IOB remote 78.

When one pitch process is completed and the imaging unit takes up a predetermined REGI-position, IIT remote 73 outputs the LE@REG signal through the hot line to SYS remote 71, VCB remote 76, and IOB remote 78, and then from IOB remote 78 to IOT.

Repeating the above described operation four times makes up a full color copy of four colors, thus completing one copy operation.

The process thus far described is the process up to the copy layer, which is to be followed by PER ORIGINAL layer where the number of copies is set i.e., how many times the jobs required for a single copy are to be carried out. Thereafter, job programming layer will follow for processing changing of parameters of the job, which specifically includes whether or not ADF is to be used, changing the color of a part of the document, whether or not the unequal enlargement scaling is to be used. The PER ORIGINAL process and job programming process are supervised by SYSTEM module 82 of the SYS system. For this purpose, SYSTEM module 82 checks and decides the job contents sent from LLUI module 80, produces necessary data to report to IIT module 84 and IPS module 85 via a 9600 bps serial communication network and to MCB system via LNET.

As described above, in the present invention, those that perform independent processes and those that may be shared with other models or devices are decentralized as "remotes", which are roughly divided into UI system, SYS system, and MCB system. Modules are constructed for supervising the machine in accordance with the layer of the copy process, thereby resulting in advantages i.e., design task of each designer is clearly defined, development technology will be uniform, setting of delivery time and cost may be clearly forecasted, the machine may be readily adjusted itself to the change in specification by altering only the modules involved, etc. Thus development efficiency of the machine is improved.

(B) Dividing states

Having described about the process to be split by UI system, SYS system and MCB system, this section will discuss how the copy operation is carried out by UI system, SYS system, and MCB system, following the flow of copy operation.

In the copy machine, machine condition from power-on to copy operation and condition after completion of the copy operation are divided into some states, jobs in each state is predetermined so that the machine will proceed to a further state only after the jobs in the preceding state have completed, thereby assuring efficiency and accuracy of control. This is called state division which is carried out in the invention as shown in FIG. 6.

A feature in state division of the copy machine according to the invention is that control right of supervising each state and UI master right of using UI in that state are in SYS remote 71 in some cases and in MCB remote 75 in other cases. That is to say, decentralizing the CPU as described above permits LLUI module 80 of UI remote 70 to be controlled by not only SYSUI module 81 but also MCBUI module 86. Process is split in such a way that the pitches and the copy process are supervised by the COPIER EXECUTIVE module 87 while the PER ORIGINAL process and the job programming process are under control of SYSTEM module 81. Accordingly, each state differs from the others in that module, SYSTEM module 82 or COPIER EXECUTIVE module 87, possesses control right over the entire machine or UI master right. In FIG. 6, the states marked by vertical lines indicate that COPIER EXECUTIVE module 87 of MCB system has UI master right whereas states that are painted out black show that SYSTEM module 82 possesses UI master right.

Figure 6:
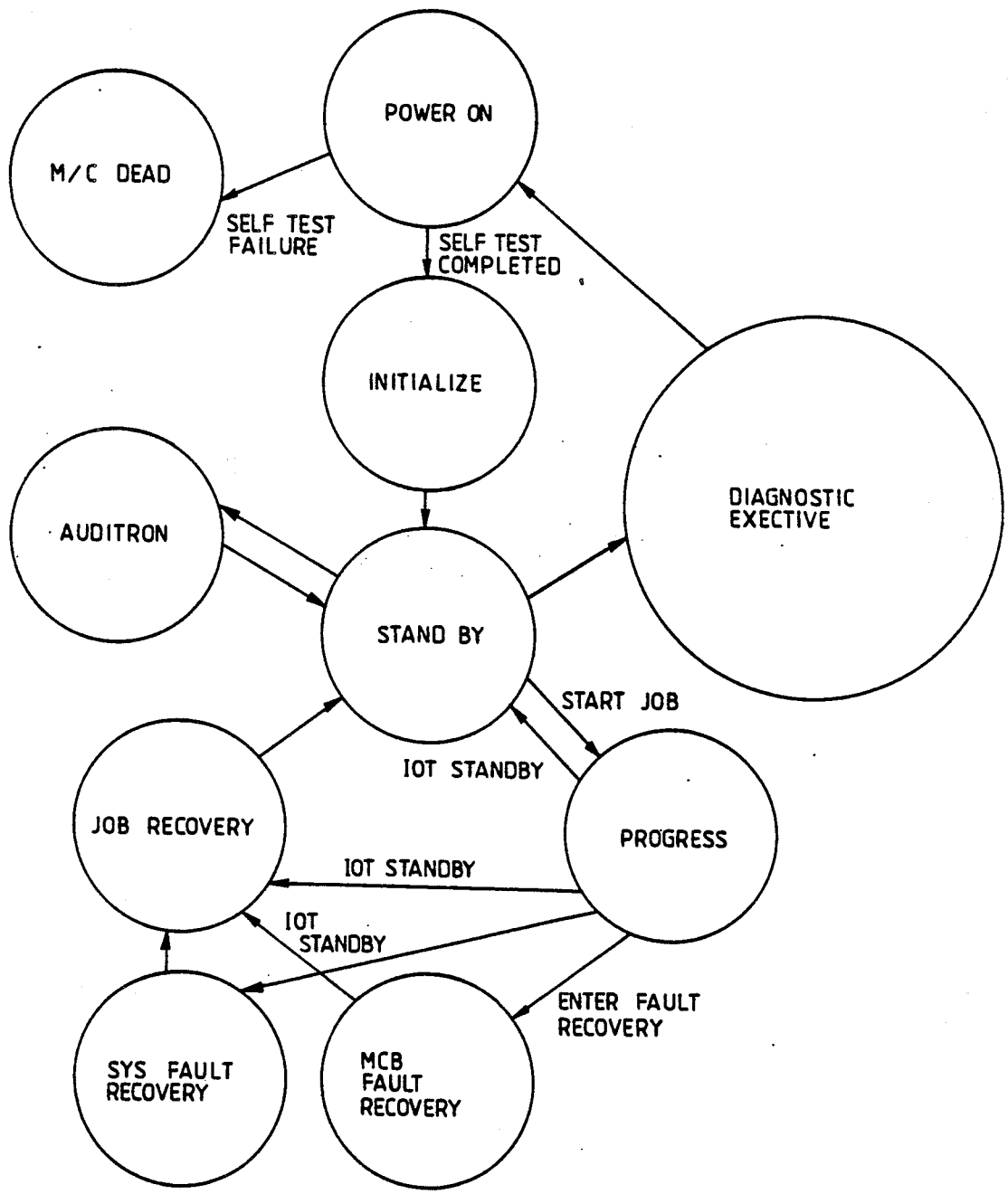
FIG. 6 shows state division.
Figure 7:
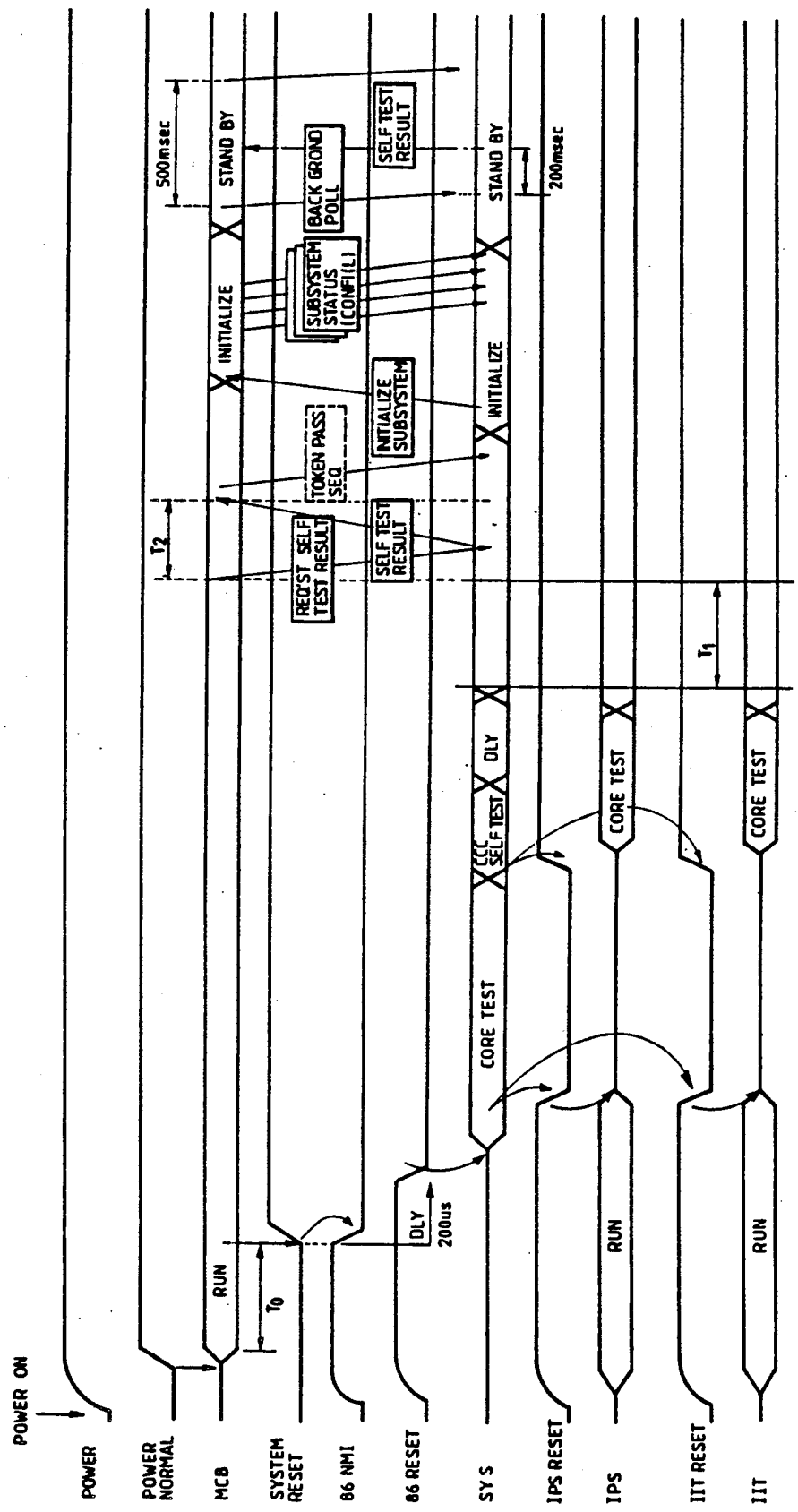
FIG. 7 is an illustrative diagram for illustrating sequence from power on state to standby state.

FIG. 7 illustrates the state division shown in FIG. 6, from power on to stand-by. In FIG. 3, when power is turned on, IPS reset signal supplied from SYS remote 71 to IIT remote 73 and IIT reset signal supplied from SYS remote 71 to IPS remote 74 will become H (high), thereby allowing IPS remote 74 and IIT remote 73 to start operation thereof. When supply voltage is detected to have become normal, a power normal signal becomes ON, MCB remote 75 starts to operate, acquiring the control right and UI master right while also performing test of the high speed communication network LNET. The power normal signal is sent to SYS remote 71 from MCB remote 75 over the hot line. A predetermined time $T_0$ after start of MCB 75, a system reset signal supplied from MCB remote 75 to SYS remote 71 through the hot line becomes H to cancel the reset of SYS remote 71 thus SYS remote 71 starts to operate. At this time, the start of SYS remote 71 is further delayed 200 μs is provided for storing information indicative of what state the machine is at into a non-volatile memory when the machine stops or runs away due to momentary troubles such as crush or instantaneous power failure, run away of software, and bug in the software.

When SYS remote 71 starts to operate, core test including checkups of ROM, RAM and hardware is carried out for about 3.8 μs. During this period there is possibility that SYS remote may run away if data not desired may be input; thus SYS remote 71, under its own control, sets IPS reset signal and IIT reset signal to L (low) at the same time as initiation of the core test for causing IPS remote 74 and IIT remote 73 to stop. SYS remote 71 carries out CCC self test for 10-3100 msec after the core test, setting the IPS reset signal and the IIT reset signal to H to restart IPS remote 74 and IIT remote 73, which carry out core tests for themselves.

The CCC self test is a test in which a predetermined data is outputted to LNET and the data outputted is then received to confirm the received signal is the same as the data outputted. For example, when SSY remote 71 is carrying out its CCC self test, if other nodes send out their data to LNET, then data collide each other to fail the self test. Thus LNET is of a contention method in which the respective node of SYS remote 71 and MCB remote 75, etc. transmits data when ever needed, and if other data is already on the line, then the node transmits the data again after a predetermined time. Each CCC self test is carried out within time interval assigned thereto so that each CCC self test is not in conflict with the other in time. Thus when SYS remote 71 is to start its CCC self test, MCB remote 75 has completed its LNET test. After the CCC self test has been completed, SYS remote 71 waits till IPS remote 74 and IIT remote 73 have completed the core test thereof. During a period T1, the SYS remote 71 carries out communication test of SYSTEM node. This is to test a serial communication network of 9600 bps by transmitting and receiving a predetermined data in a predetermined sequence. After the communication test during time interval T1 has been completed, LNET communication test is carried out between SYS remote 71 and MCB remote 75 during an interval T2. That is to say, MCB remote 75 requests SYS remote 71 of the result of the self test and SYS remote 71 issues a self test result or the test result that it has carried out to the MCB remote 75. The MCB remote 75 issues a token pass to the SYS remote 71 when it receives the self test result. The token pass is a tag attending the UI master right, transferring the token pass to SYS remote 71 causes the MCB remote 75 to transfer UI master right to the SYS remote 71. Up to this stage is the power on sequence. During the power-on sequence, UI remote 70 displays, for example, "PLEASE WAIT FOR A WHILE" while carrying out various tests such as the core test, the communication test etc. thereof. Of the above described power on sequences, if there is no answer to the request for the self test result or there is abnormality in the self test result or there is abnormality in the self test result, the MCB remote 75 sets the machine to "dead", issues the UI control right to control the UI remote 70, thereby indicating the abnormality. This is a state of "machine dead".

At the end of the power on state, the initialize state is entered to set up the respective remotes. In the initialize state, SYS remote 71 possesses the control right over the entire system and the UI master right. Therefore SYS remote 71 initializes SYS systems while also issuing "INITIALIZE SUBSYSTEM" command to MCB remote 75 in order to initialize MCB system as well. The result of this is sent back as a subsystem status information from MCB remote 75. Thereby in IOT, for example for the machine to be ready for copy operation the fuser is heated and the elevator of the tray is positioned in place, the initialize state is up to this point.

After the initialize has been completed, the respective remote enters a stand-by or waiting condition. Since SYS remote 71 still possesses in this condition, SYS remote 71 displays F/F on the UI picture in accordance with the UI master right, thereby being ready for accepting copy execution conditions. At this time, MCB remote 75 monitors IOT. In the stand-by state, MCB remote 75 issues a background poll every 500 msec to SYS remote 71 in order to check whether there is abnormality or not, and SYS remote 71 sends the self test result within 200 msec to MCB remote 75. If the self result does not come back from the MCB 75 or there is abnormality in the self test result, MCB remote reports UI remote that there is abnormality to cause it to display that abnormality.

In the stand-by state, when the auditron is used, the auditron state is entered and MCB remote 75 carries out the auditron control while also controlling UI remote 70 to cause the UI remote 70 to display for the auditron.

In the stand-by state, when F/F is set and the start key is depressed, a progress state is entered. The progress state is further sub-divided into six states, i.e., set up, cycle up, run, skip pitch, normal cycle down, and cycle down shut down. These states will be described with reference to FIG. 8.

Figure 8:
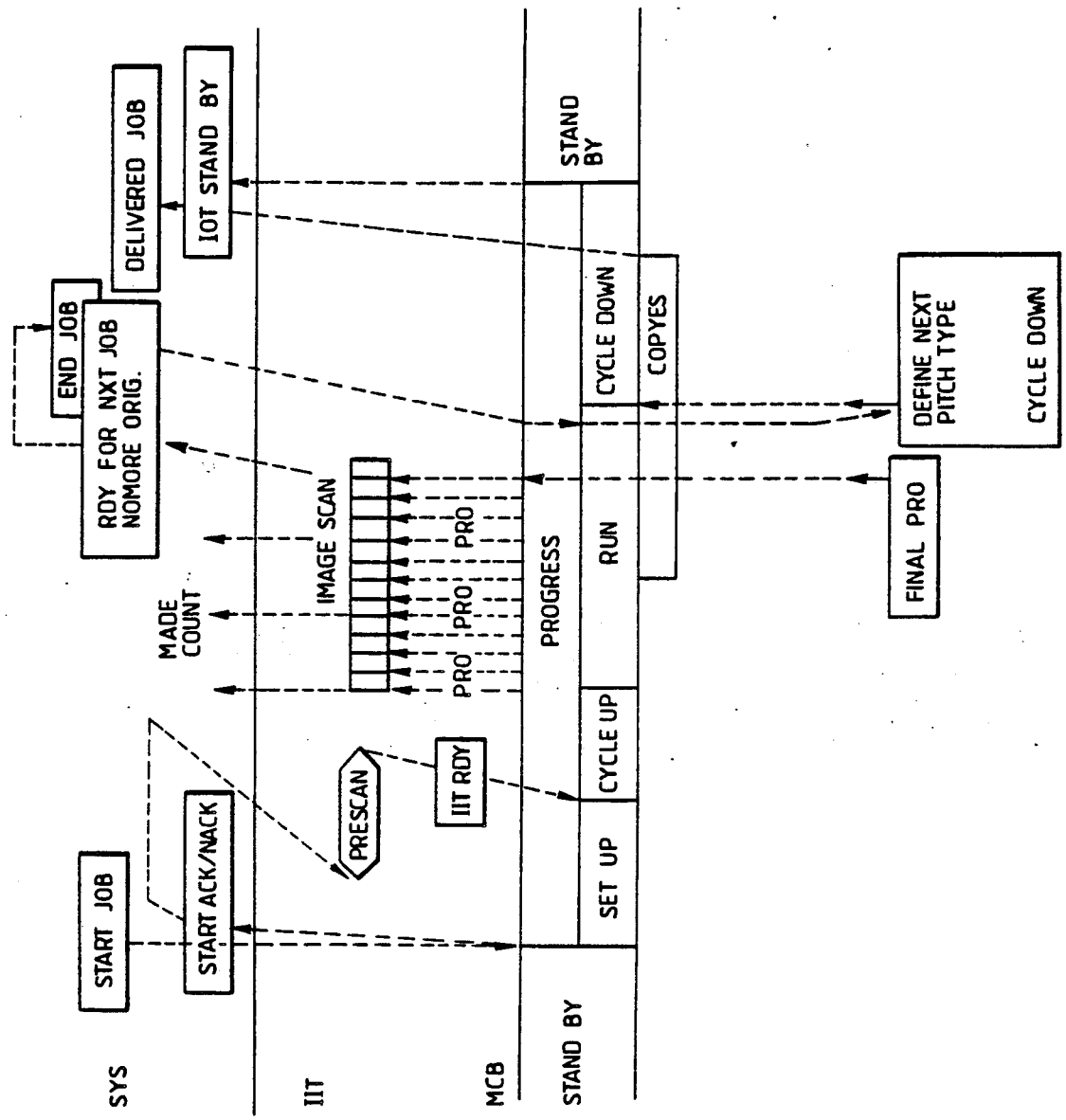
FIG. 8 is an illustrative diagram for illustrating sequence of progress state.

FIG. 8 illustrates timing charts for a case of platen mode, four full color, and copy set number of three.

When SYS remote 71 detects that the start key is depressed, it sends the job content to IIT remote 73 and IPS remote 74 over the serial communication network while also outputting the job content together with a command "start job" to the COPIER EXECUTIVE module 87 in MCB remote 75 over the LNET. Upon which the machine enters the set up and the respective remotes perform preparatory set up for carrying out the specified jobs. For example, IOT module 90 adjusts parameters for driving the main motor and sensitive material belt, etc. Confirming that ACK (Acknowledge) responding to the start job is sent back from MCB remote 75, SYS remote 71 causes IIT remote 73 to perform pre-scan.

The pre-scan includes four types of scans, i.e., pre-scan for detecting the document size, pre-scan for detecting the color of a specified position of the document, pre-scan for detecting a closed loop when coloring the line drawings, pre-scan for reading markers when editing. The pre-scan may be performed up to three times depending on the selected F/F. During which, UI displays a display, for example, "PLEASE WAIT".

When the pre-scan is over, a command by the name of IIT READY is issued to be the COPIER EXECUTIVE module 87 and the machine enters the cycle up. The cycle up is a state during which the machine waits for the respective remotes to come into operation. During the cycle up, MCB remote 75 initiates operation of IOT and the transfer device and SYS remote 71 initializes IPS remote 74. At this time UI displays that the machine is in the progress state, and also displays the job content selected.

When the cycle up has completed, the machine enters "run" to start copy operation in which IIT performs the first scan when the first PRO is output from IOT module 90 of MCB remote 75 and IOT performs development of the first color to complete the first pitch. Upon the second PRO, the second color development is carried out to complete the second pitch. The process is carried out four times to complete four pitches and then IOT fixes the toner before the copy is output. Carrying out the above mentioned process three times will produce three sheets of copies.

MCB remote 75 supervises the pitch process and copy process while SYS remote 71 supervises the PER ORIGINAL process, where the number of copy to be made is set. When the first PRO for the respective copy is output, MCB remote 75 is to issue a made-count signal to SYS remote 71 so that SYS remote 71 can recognize how many copies have been made before the one presently being copied. When the ultimate PRO is issued, MCB remote 75 provides the command "DRY FOR NXT JOB" to SYS remote 71 to request of the next job. At this time, the job continues on if a start job is issued. If the user does no set the next job, then the job will be terminated; thus SYS remote 71 issues the command "END JOB" to MCB remote 75. When MCB remote 75 receives the command "END JOB" to confirm that the job has been completed, the machine enters normal cycle down.

In the normal cycle down, MCB remote 75 causes the operation of IOT to stop while SYS remote 71 issues as top job command and waits for the response to it.

During the cycle down, when all the copied sheet are recognized to have been discharged, MCB remote 75 reports SYS remote 71 through the command "DELIVERED JOB" that all the copied sheet have been discharged. Also the MCB remote 75 sends to SYS remote 71 a "IOT STAND BY" command indicative that the machine is inoperative when normal cycle down has completed. Thereby, the progress state completes and the machine returns to the stand-by state.

The above description makes no mention about skip pitch and cycle down shut down but in skip pitch, SYS remote 71 initializes SYS system for the next job and MCB remote 75 is in stand-by condition for the next copy. Cycle down shut down is a state in fault, thus both SYS remote 71 and MCB remote 75 carry out fault process.

As mentioned above, in progress state, MCB remote 75 supervises the pitch process and copy process while SYS remote 71 supervises PER ORIGINAL process and job programming process; therefore both posses control right in accordance with respective share of processes. In the mean time, SYS remote 71 possesses UI master right. This is because set value of the number of copies and selected edit process are necessary to be displayed on UI, these displays belong to either per original process or job programming process, and are supervised by SYS remote 71. In the progress state, when fault occurs, the machine enters a fault recovery state. Fault is a general term of abnormalities of the machine including no sheet, jam, malfunction or damages or parts. The fault is divided into two kinds, one can be recovered by the user by resetting F/F, etc. and the other must be attended by a serviceman to recover e.g., replacement of the parts. As described above, the display of fault is effected basically by MCBUI module 86 but F/F is supervised by SYSTEM module 82. Thus SYSTEM module 82 is in charge of recovery of the fault that can be recovered by setting F/F again while COPIER EXECUTIVE module 87 is in charge of recovery of others. Detection of fault is effected for SYS system and MCB system, respectively. In other words, SYS remote 71 detects faults of IIT, IPS, and F/P since SYS remote 71 supervises them while MCB remote 75 detects faults of IOT, ADF, and a sorter since MCB remote 75 supervises them. Therefore it should be appreciated that there are four types of faults in the present copying machine.

(1) Fault is detected by SYS node, and is recovered by the SYS node.

For example, pressing the start key with the F/P being not ready will cause fault, which the user can recover by setting F/F again.

(2) Fault is detected by SYS node, and is recovered by MCB node.

This type of fault includes malfunction of a regisensor, abnormal speed of the imaging unit, overrun of the imaging unit, abnormality of the PRO signal, abnormality of CCC, abnormality of the serial communication network, and check error of ROM and RAM. With these faults, contents of the faults and messages such as "PLEASE CALL A SERVICEMAN" are displayed.

(3) Fault is detected by MCB node and is recovered by SYS node.

When SORTER is specified through F/F while the sorter is not provided, MCB node detects the fault. The user can also recover the fault by setting F/F again to change into a mode in which no sorter is used. The same is true of ADF. Further, faults may be detected when the toner is about to run out, when tray is not inserted, and when the sheet runs out. These faults are basically supposed to be recovered by replinishing the toner, setting the tray, and supplying sheet, all may be done by the users. In the case where a tray runs out of sheet other trays maybe used to recover the fault, in the case where toner of a color runs out the fault may be recovered by specifying other color. In other words, since the fault may be recovered by selecting F/F, SYS node is adapted to recover the faults, (4) Fault is detected by MCB node and is recovered by MCB node.

For example, malfunction of the developing machine, abnormality of feeling of the toner, malfunction of a motor clutch, and malfunction of the fuser, etc. are detected by MCB node and the UI displays a message such as "PLEASE CALL A SERVICEMAN". If jam occurs, location of the jam as well as how to clear the jam are displayed but recovery is left to the users.

As mentioned above, in the fault recovery state, the control right and the UI master right are possessed by SYS node or by MCB node according to where the fault is located or how the fault is to be recovered.

When the fault is recovered and IDT stand-by command is issued by MCB node, the job recovery state is entered to finish the remaining jobs. Assuming that the number of copy to be taken is three and a jam occurs while the second copy is being made, the jam has to be cleared before the remaining two copies can be made. Thus SYS node and MCB node perform the processes belonging to the respective nodes to recover the job. Therefore in job recovery, both the SYS node and the MCB node share the control right in accordance with the process carried out by each node, except that UI master right is possessed by SYS node.

This is because the messages for job recovery such as "PLEASE PRESS START KEY" and "PLEASE SET REMAINING DOCUMENT" must be displayed when performing the job recovery as well as this message display relates to PER ORIGINAL process or JOB PROGRAMMING process which are supervised by SYS node.

Also when IOT stand-by command is issued in the progress state, the job recovery state is entered and is then entered upon completion of the recover job, then waits for the next job.

In stand-by state, a predetermined key operation enables to enter the diagnostic state (referred to as DIAG herein after).

Figure 9:
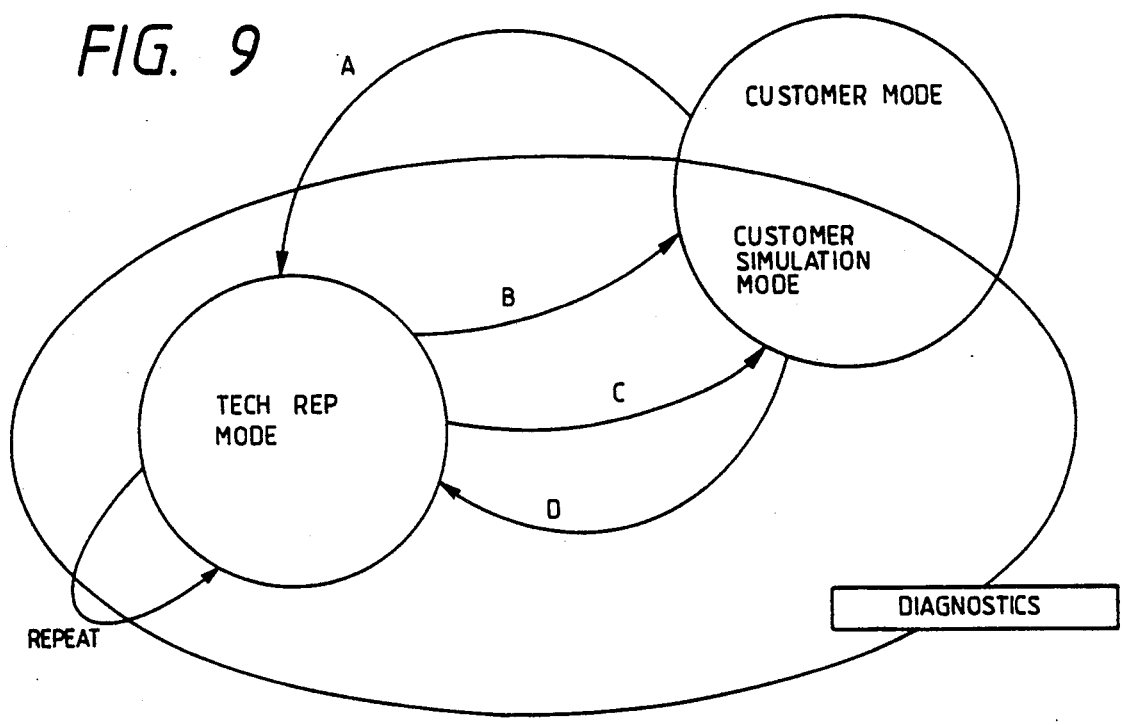
FIG. 9 illustrates sequence of a general idea of diagnostic.

The DIAG state is a state for self diagnosis in which checking of input/output of the parts, setting of various parameters, setting of various modes, and initialization NVM (non-volatile memory, etc. are carried out). FIG. 9 illustrates a general concept of the DIAG state. As is apparent from FIG. 9, there is provided two modes, one TECH REP mode, the other COUSTOMER SIMULATION mode.

TECH REP mode is used when the serviceman performs diagnosis of the machine such as checking of input and output. A coustomer mode used when the user usually takes a copy is called the COUSTOMER SIMULATION mode when used in DIAG.

Suppose that TECH REP mode is entered via route A shown in FIG. 9 through a required operation from the stand-by state of the coustomer mode. If the TECH REP mode is to perform only various checks and setting parameters and the machine is to return to the coustomer mode again (route B in FIG. 9), a required key operation will permits to shift to the power on state as shown in FIG. 6 and then to return to the stand-by state through the sequence shown in FIG. 7.

Since the copy machine according to the invention is provided with various edit functions, it is necessary to confirm, after setting various parameters in TECH REP mode, that desired colors are obtained by actually taking a copy and that the edit function functions as it is supposed to. This confirmation is done in COUSTOMER SIMULATION mode which is different from the COUSTOMER mode in that billing is not performed and UI displays that it is in DIAG. This is what is meant by COUSTOMER SIMULATION mode in which COUSTOMER MODE is used in DIAG. Shifting from TECH REP mode to COUSTOMER SIMULATION mode (route C in FIG. 9) or oppositely from COUSTOMER SIMULATION mode to TECH REP mode (route D in FIG. 9) are effected by the respective predetermined operations. TECH REP mode is carried out by DIAG EXECUTIVE module 88 (FIG. 4); therefore MCB node possesses both the control right and UI master right. While COUSTOMER SIMULATION mode performs ordinary copy operation under control of SYS.DIAG module 83 (FIG. 4); therefore SYS node possesses both the control right and the UI master right.

(II) SPECIFIC ARRANGEMENT OF RESPECTIVE UNITS (II-1) System

Figure 10:
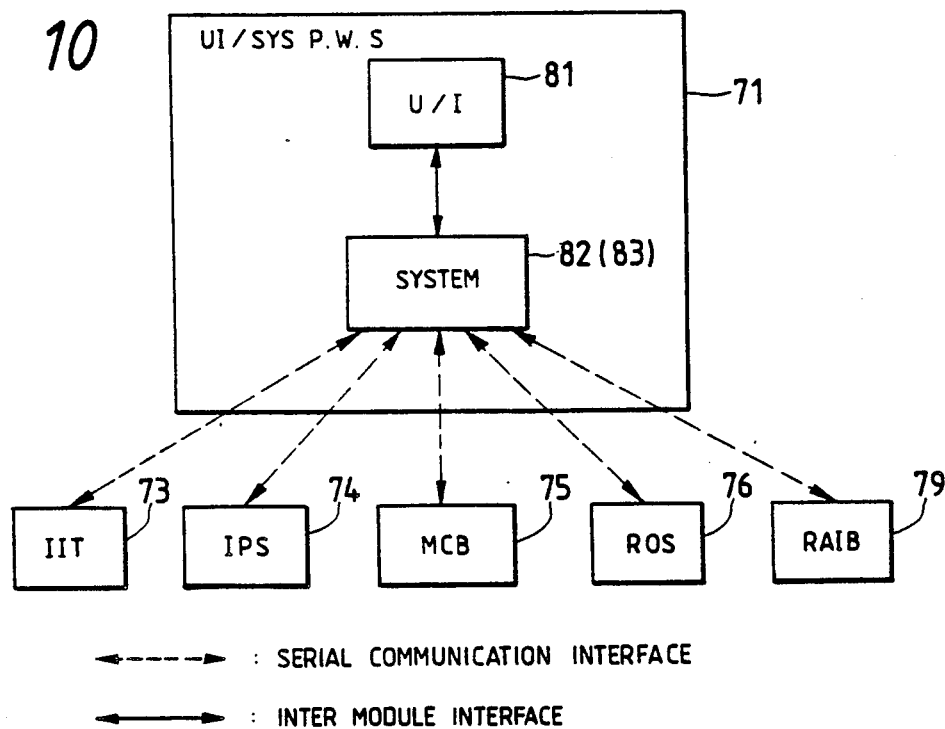
FIG. 10 shows the relation between the system and the other remote.

FIG. 10 shows the relation between the systems and other remotes.

As mentioned previously, the remote 71 is equipped with SYSUI module 81 and SYSTEM module 82, data transmit/receive between these modules is effected through the interface between these modules while SYSTEM module 82 is communicated with IIT 73 and IPS 74 over the serial communication interface, and MCB 75, ROS 76, and RAIB 79 are communicated with each other through the LNET high speed communication network.

The module arrangement of the system will now be described as follows.

Figure 11:
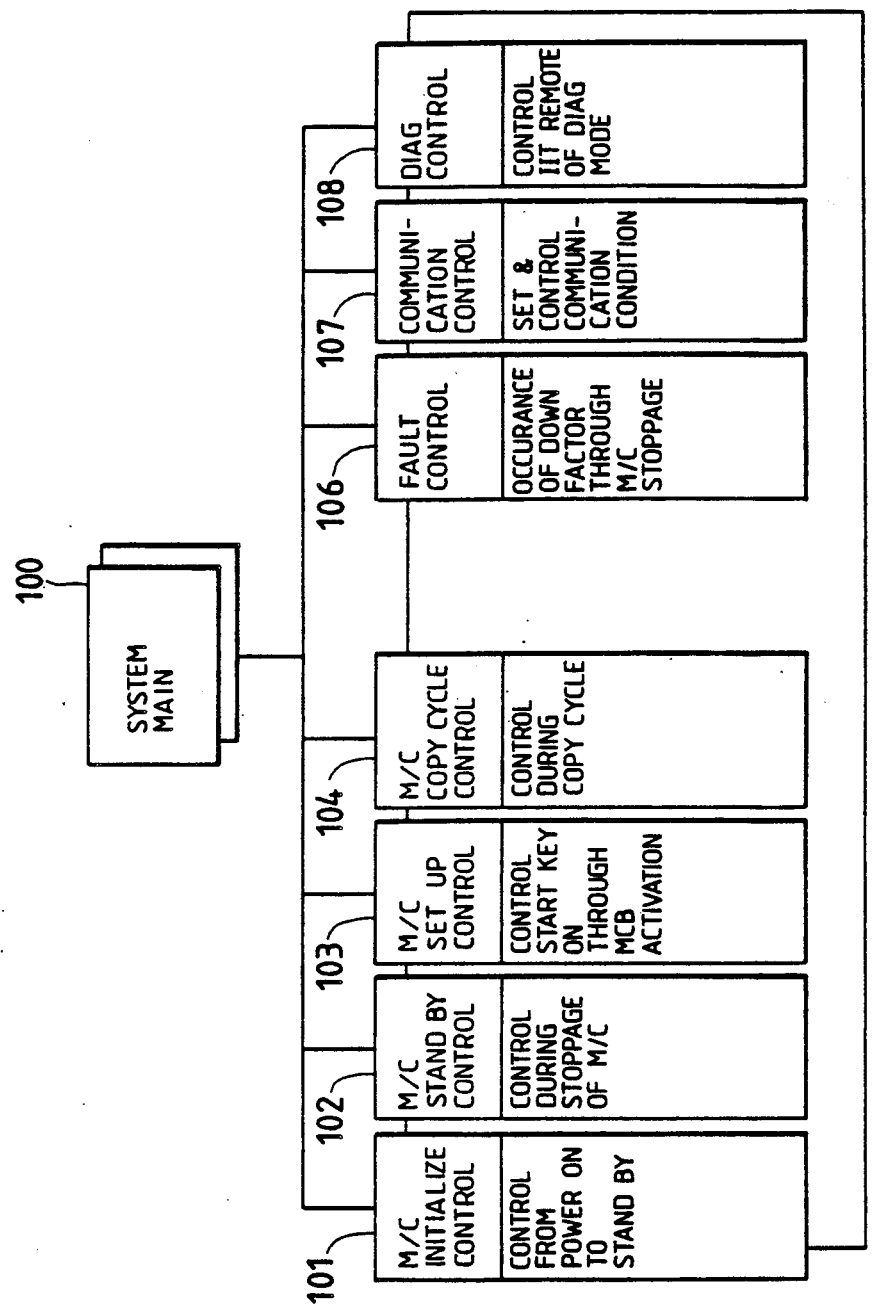
FIG. 11 is a diagram for showing a module arrangement of the system.

FIG. 11 is a diagram for showing the module arrangement of the system.

The copy machine according to the invention treats the respective modules such as IIT, IPS, and IOT, etc., as parts; the respective modules of the system are treated to have inteligence for controlling these parts. The copy machine employs decentralized CPU method. The system side is in charge of PER ORIGINAL process and JOB PROGRAMMING process and possesses the control right for supervising initialize state, stand-by state, set up state, and cycle state and the UI master right for allowing these states to use UI; therefore the system is formed of modules corresponding to these rights.

A main system 100 reads in signals received from SYSUI and MCB, etc. into an internal buffer, clears data stored within the internal buffer, calls the respective lower level of modules of the system main 100 for transferring the process to update the system state.

M/C initialize control module 101 controls initialize sequence from power on to stand-by condition of the system, which module is activated upon completion of power on process in which various tests are performed after the power is turned on.

M/C set up control module 103 controls a set up sequence from depress of a start key to activation of MCB for processing copy layer, and specifically provides a job mode on the basis of FEATURE (specified items to M/C in order to fulfill the user's requests) specified by SYSUI and decides a set up sequence in accordance with the job mode just provided.

Figure 12A:
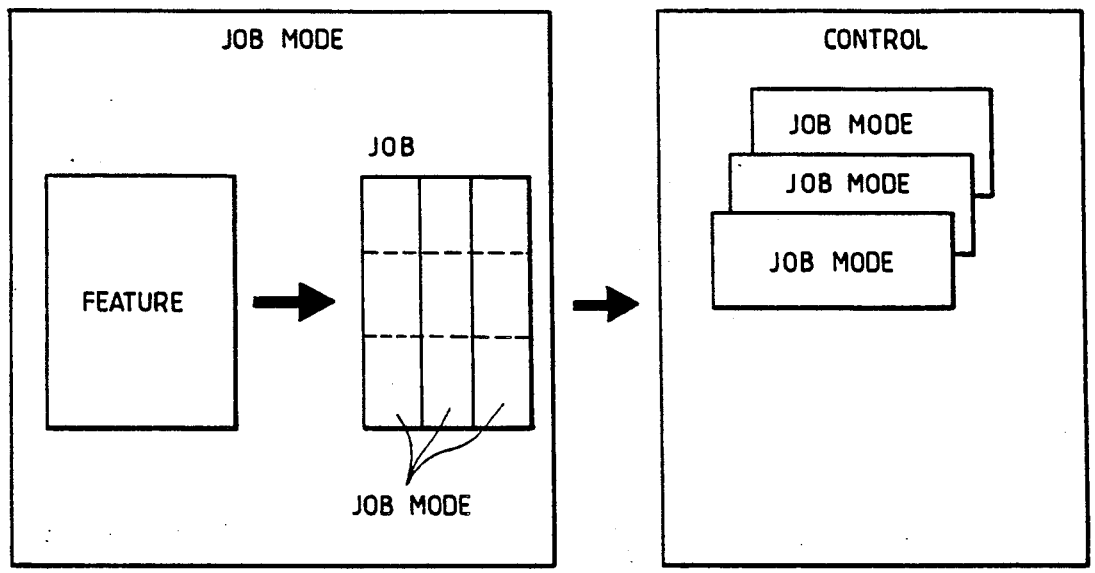
FIG. 12 is a diagram for illustrating formation of job modes.

As shown in FIG. 12a, a job specified by the F/F is analyzed to break down to individual step, which the job in this case includes M/C operation from start of the M/C upon request from the user, through discharge of all the copies as required, to stoppage of M/C, and is a group of job modes each of which is a minimum unit to which the user request could possibly be divided down.

Figure 12B:
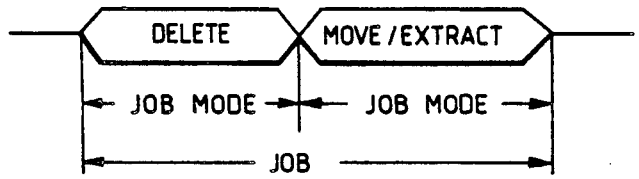
Figure 12C:
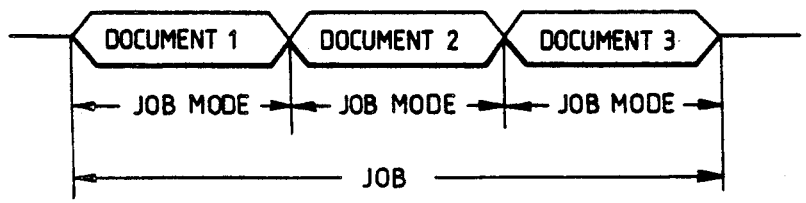

This is explained by way of example of mosaic synthesis as follows. As shown in FIG. 12b, the job modes consists of deletion/move and extract; thus the job is a group of these job modes. In the case of three sheets of ADF document as shown in FIG. 12c, each of the job modes is a feed process to a document 1, document 2, and document 3, thus the job is a group of these job modes.

The job performs document scan in the auto mode, the prescan in the line drawing mode, prescan in the marker edit mode and sample scan in the color detection mode (prescan is done up to three times). Also the job distributes there quired copy modes for the copy cycle to IIT, IPS, and MCB and activates MCB upon completion of the setup sequence.

The M/C stand-by control module 102 controls a sequence in M/C stand-by, more specifically acceptance of the start key, control of color registration, entering the DIAG module, M/C copy cycle control module 104 controls the copy sequence from activation of MCB to stoppage thereof, more specifically performs reporting of sheet feed count, deciding the completion of JOB to request the set up of IIT, deciding completion of MCB to request the withdraw of IPS.

M/C copy cycle control module 104 also functions to report a through command generated while M/C is in operative or in inoperative condition to the corresponding remote.

Fault control module 106 monitors factors or causes of withdrawing from IIT and IPS, and requests the MCB of withdrawal thereof when the factors occur, specifically causing withdrawal of the MCB by means of a fail command from IIT and IPS. Also after a request of withdrawal is issued, the fault control module 106 decides recovery of stoppage of the M/C and recover by, for example, a jam command from MCB.

Communication control module 107 sets an IIT READY signal from IIT and enable/disable of communication in the image area.

DIAG control module 108 controls the input check mode and the output check mode in DIAG mode.

Data transmit/receive between these respective modules and between those modules and other subsystems will be described as follows.

Figure 13:
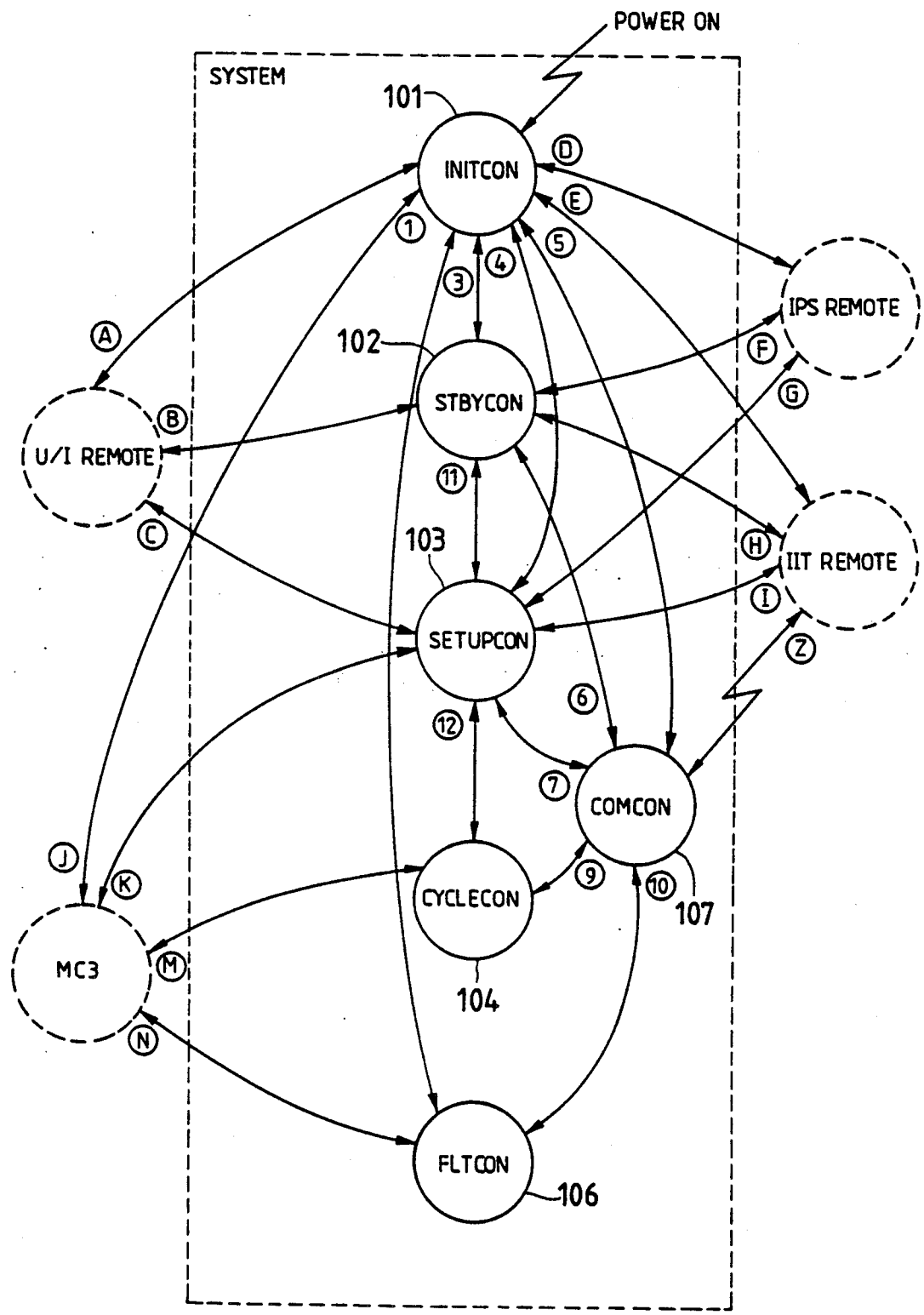
FIG. 13 shows the data flow between the respective remote and the system as well as the data flow between the modules in the system.

FIG. 13 shows a data flow between the system and the respective remotes and a data flow between modules within the system.

Between the SYSUI remote and a stand-by control 102, the SYSUI remote transmits a mode change command, a start copy command, and a tray command, while the stand-by control unit 102 sends out an M/C status command, a tray status command, a toner status command, a recovery bottle status command, a color registration ANS command, and a TOKEN command.

Between SYSUI remote and a set up control unit 103, the set up control unit 103 sends out the M/C status command (progress), an APMS status command while the SYSUI remote transmits a stop request command and an interrupt command.

Between IPS remote and the initialize control unit 101, the IPS remote sends out an INITIALIZE END command, and the initialize control control unit 101 sends out the NVM parameter command and an INITIALIZE command.

Between the IPS remote and the stand-by control unit 102, the IPS remote sends out an initialize free hand area, an answer command, a remove area answer command, and a color information command while the stand-by control unit 102 transmits a color detection point command, an initialize free hand area command, and a remove area command.

Between the IPS remote and the set up control unit 103, the IPS remote transmits the IPS READY command, a document information command while the set up control unit 103 transmits a scan information, a basic copy mode .ommand, an edit mode command, and an M/C stop command.

Between the IIT remote and the stand-by control unit 102, the IIT remote transmits IIT READY command for reporting that prescan has completed while the stand-by control unit 102 sends out a sample scan start command and an initialize command.

Between the IIT remote and the set up control unit 103, the IIT remote transmits the IIT READY command, and an initialize end command while the set up control unit 103 transmits a document scan start command, a sample scan start command and a copy scan start command.

Between MCB remote and stand-by control unit 102, the stand-by control unit 102 sends out an initialize sub system command and a stand-by selection command while the MCB remote sends out a subsystem status command.

Between the MCB remote and the set up control unit 103, the set up control unit 103 transmits a start job command, IIT READY command, a stop job command, and a declare system fault command whereas the MCB remote sends out an IOT stand-by command, and a declare MCB fault command.

Between the MCB fault and the cycle control unit 104, cycle control unit 104 sends out the stop job command while the MCB remote sends out a transmit MADE command, a ready for next job command, a job delivered command and an IOT stand-by command.

Between the MCB remote and a fault control unit 106, the fault control unit 106 transmits a declare system fault command, a system shut down completion command, and an MCB remote sends out a declare MCB fault command, and a system shut down command.

Between the IIT remote and a communication control unit 107, the IIT remote transmits a scan ready (SCN RDY) signal and an image area signal.

The interface between the respective modules will now be described.

The system main 100 sends out a receiving remote. No. and a receiving data to the respective modules 9101 to 107) and the respective modules receive and transmit data between the corresponding remote. The respective module (101 to 107) sends out no signals to system main 100.

The initialize control unit 101 reports a system state (stand-by) to the fault control unit 106 and the stand-by control unit 102, respectively, when the initialize process has been completed. The communication control unit 107 transmits information on whether or not communication is possible to the initialize control unit 101, the stand-by control unit 102, the set up control unit 103, the copy cycle control unit 104, and the fault control unit 106.

The stand-by control unit 102 informs the set up control unit 103 of system state (progress) when the start key is depressed.

The set up control unit 103 informs the copy cycle control unit 104 of a system state (cycle) when set up is completed.

(II-2) Image input terminal (IIT)

(A) Documents scanning mechanism

Figure 14:
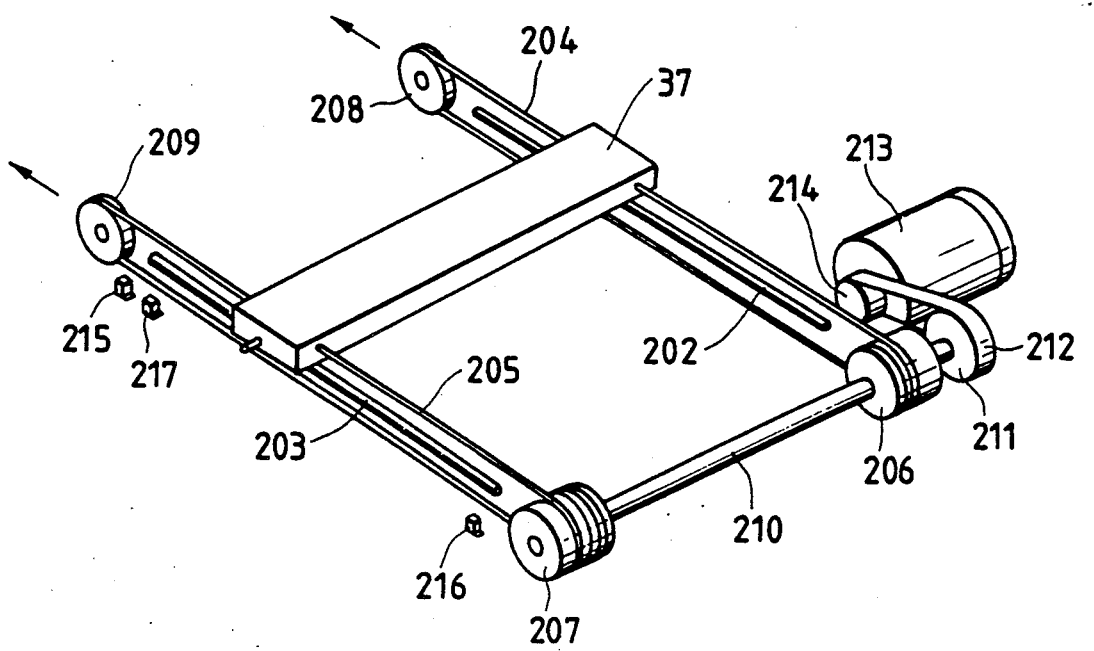
FIG. 14 is a perspective view of a document scanning mechanism.

FIG. 14 is a perspective view of a document scanning mechanism. An imaging unit 37 is movable placed on two slide shafts 202, 202 while also is secured at both ends thereof to wires 204, 205. The wires 204, 205 are each would around drive pulleys 206, 207 and tension pulleys 208, 209. The tension pulley 208, 209 are applied tension in a direction of arrows as shown. A drive shaft 210 on which the drive pulleys 206, 207 are mounted is provided with a speed reduction pulley 211 and is connected to an output shaft 214 of a stepping motor 213 via a timing belt 212. Limit switches 215, 216 are sensors for detecting the position of both ends of the imaging unit 37 when it moves.

To obtain a color copy, IIT has to repeat four scannings. A problem is how small deviation in synchronism and location between the four scannings can be attained. Therefore, it is important to minimize variation of stop position of the imaging unit 37, required time for the imaging unit to travel from its home position to the regi-position and variation in scanning speed. A stepping motor 213 is employed for this purpose. Since the stepping motor 213 suffers from more vibration and noise as compared to a DC servo motor, variety of measures for high quality and high speed have been taken in the present invention.

(B) Control method of stepping motor

Figure 15A:
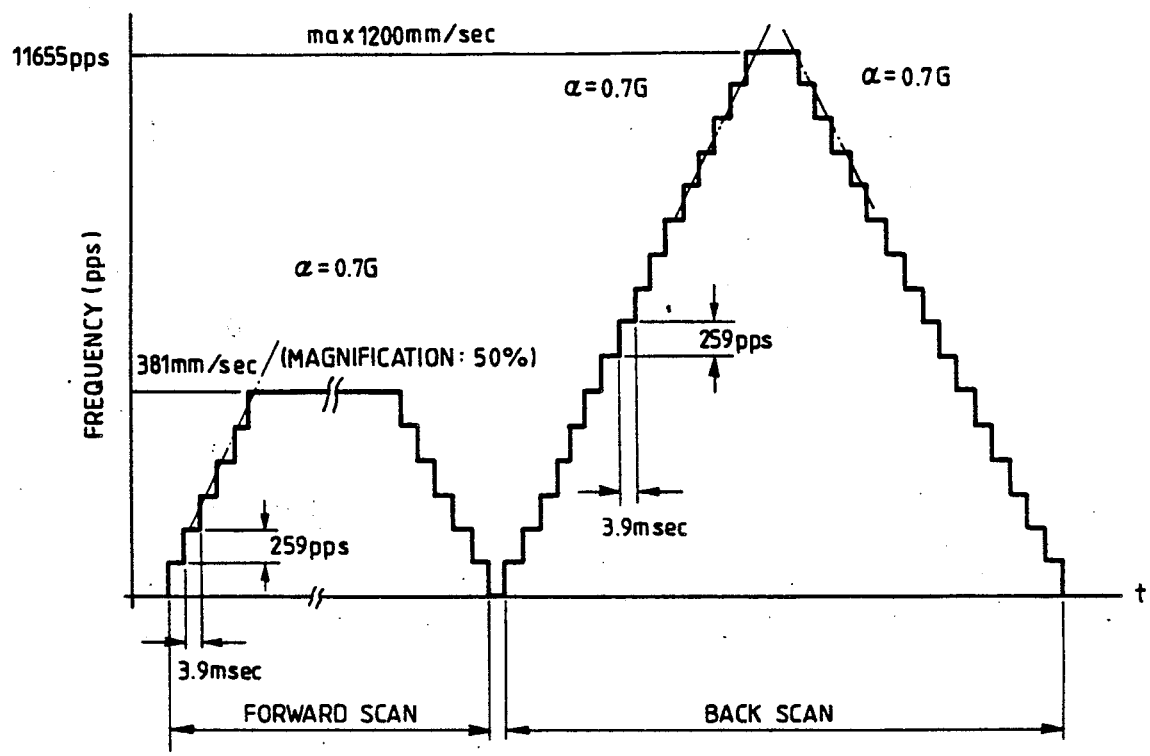
FIGS. 15(a)-(e) are diagrams for showing control method of a stepping motor.

The stepping motor 213 has a motor winding of pentagon, junction of which is connected to a positive side and negative side of a supply through two transistors. The motor 213 is driven by ten bi-polar transistors. The current through the motor is fed back to smoothly change the current through the motor, thereby preventing vibration and noise. FIG. 15a shows scan cycle of the imaging unit 37 driven by the stepping motor 213. FIG. 15 illustrates the relation between the speed of the imaging unit 37 i.e., the frequency applied to the stepping motor, and the time when forward scanning and back scanning is to be carried out at an enlargement factor of 50% or a maximum translation velocity.

Figure 15B:
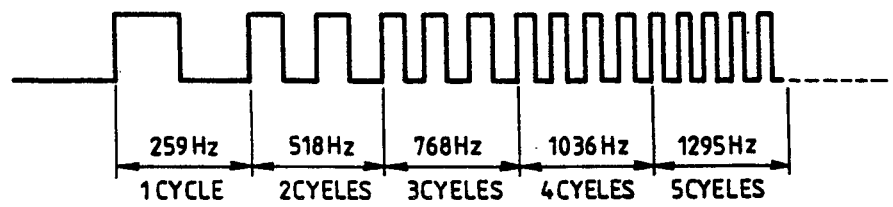

When accelerating, as shown in FIG. 15b, for example, a frequency of 259 Hz is multiplied up to about 11 to 12 kHz. In this manner, a train of pulse is given a regularity, thereby providing for easy production of pulses. As shown in FIG. 15a, the frequency is regularly increased at 259 pps/3.9 ms in a stair case fashion, thereby making a trapezoidal profile of frequency. Between the forward scan and back scan is provided an interval time for waiting for the vibration of the IIT mechanical system to be damped as well as for allowing synchronism with a picture output in IOT. In the embodiment, the acceleration is set to 0.7 G, larger than conventional acceleration, thereby shortening scan cycle time.

Figure 15C:
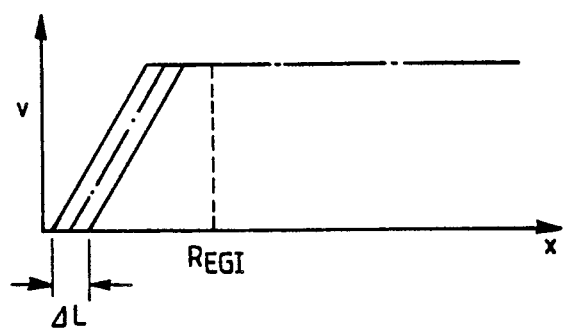
Figure 15D:
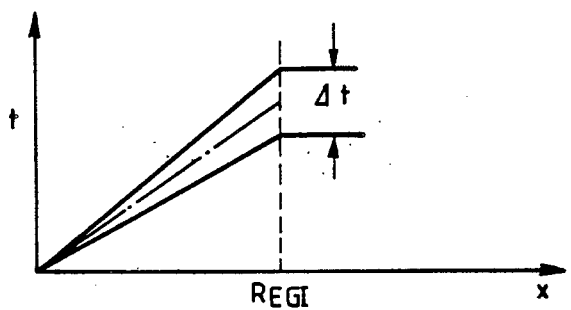
Figure 15E:
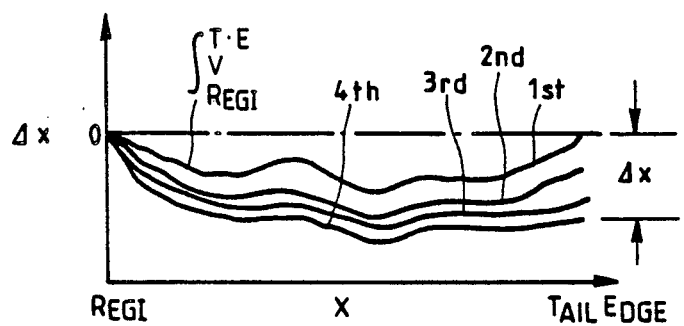

As mentioned previously, when reading a document, a serious problem is how deviation in position between the four scans, that causes misalignment in the position of colors or distortion in a picture, can be minimized. FIG. 15c to FIG. 15e illustrate how misalignment of color is caused, of which FIG. 15c shows that when the imaging unit returns to its home position after scanning, it takes up a position different from where it was originally, and time required for the unit to reach the regi-position will deviate to cause shift in color position when scanning next time. Also as shown in FIG. 15d, excess vibration of the stepping motor during the four scannings causes the time required for the unit to arrive at the regi-position to be shifted, which in turn causes shift in color position. FIG. 15e illustrates variation of constant velocity scan characteristic for the unit to move past the regi-position to a tail edge, showing that a variation in speed for the first scan is much larger than that for the second to fourth scan. Therefore, Y which exhibits no noticeable shift in color position is developed for the first scanning.

The factors that cause the shift in color position may include mechanical instability such as change with time of the timing belt 212, the wires 204, 205 and viscous resistance between the slide pads and the slide rails 202, 203.

(C) Control method of IIT

The IIT remote has a sequence control for the various copy operations, a service support function, a self diagnosis function, and a fail safe function.

The sequence control of IIT is conventionally divided into SCAN, SAMPLE SCAN, and INITIALIZE. Various commands and parameters for IIT control are transmitted from SYS remote 71 by means of serial communication.

Figure 16A:
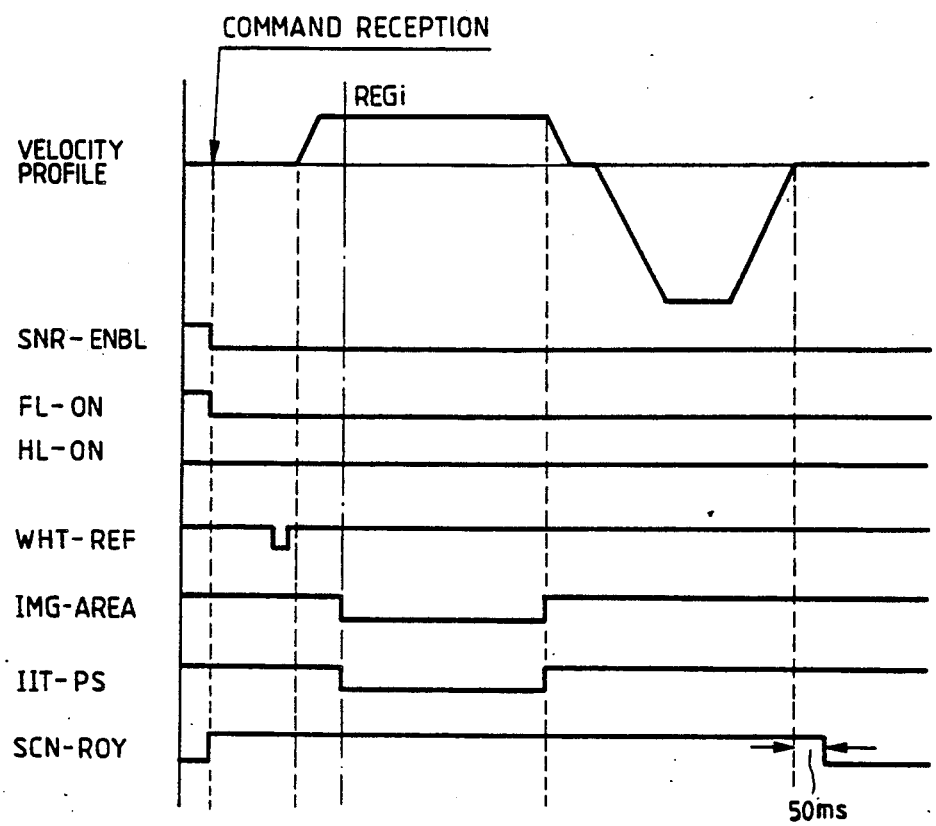
FIGS. 16(a)-(c) are timing charts for illustrating IIT control method.
Figure 16B:
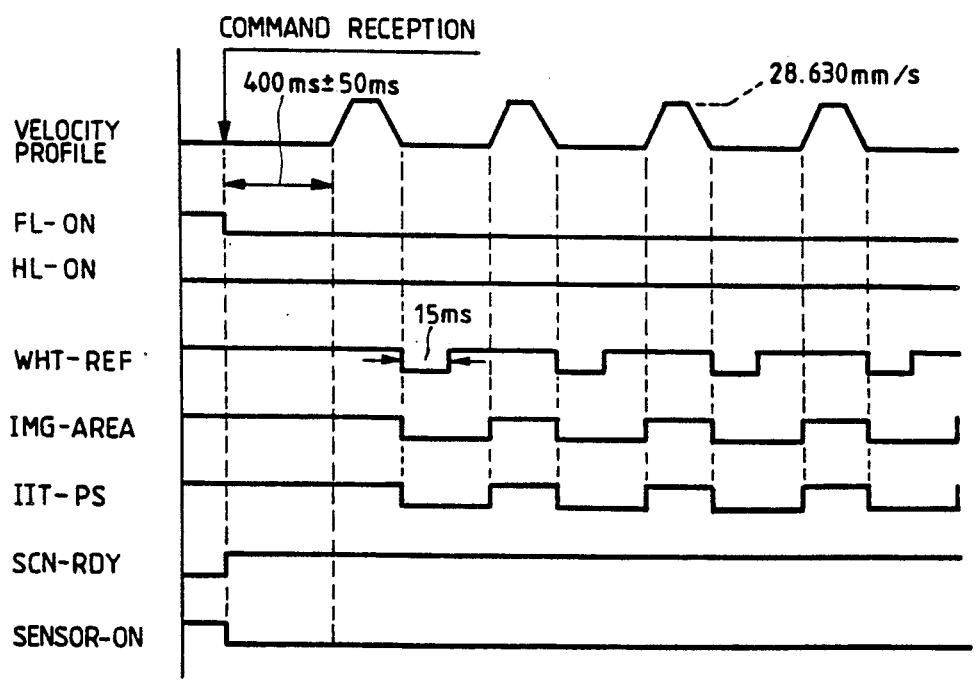

FIG. 16a shows timing chart for ordinary scan. A scan length data is set 0–432 mm with an increment of 1 mm according to a paper length and an enlargement factor. Scan speed and prescan length data (from stop position to regi-position) are set in accordance with the enlargement factor (50-400%). In the IIT sequence control, when the scan command is received, an FL-ON signal causes a fluorescent lamp to light up while also a SCN-RDY signal sets a motor driver to ON. After a preselected timing, a shading correction pulse WHT-REF is produced to start scanning. When the imaging unit 37 passes the regi-sensor 217, the image area signal IMG-AREA becomes low level just long enough for the predetermined scan length and IIT-PS signal in synchronism with IMG-AREA signal is outputted to IPS.

FIG. 6b shows timing chart of SAMPLE SCAN. SAMPLE SCAN is used for detection of color in color conversion and for color balance correction and shading-correction when using F/P. The imaging unit 37 moves toward the sample position as a destination and repeats a number of halts and fine movements before it stops.

Figure 16C:
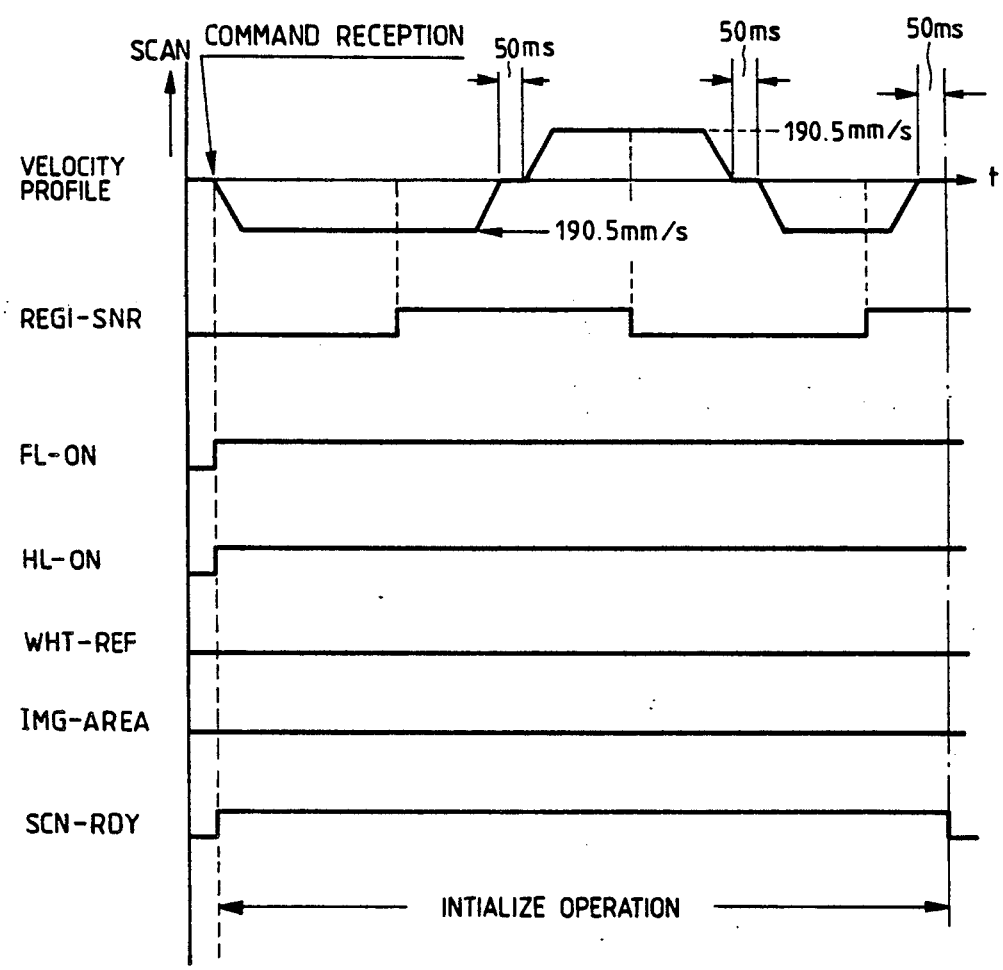

FIG. 16c illustrates the timing charts for initialize. When power is turned on, the IIT receives a command from the SYS remote to confirm regi-sensor, operation of the imaging unit by means of the regi-sensor, and to correct the home position of the imaging unit by means of the regi-sensor.

(D) Imaging unit

Figure 17:
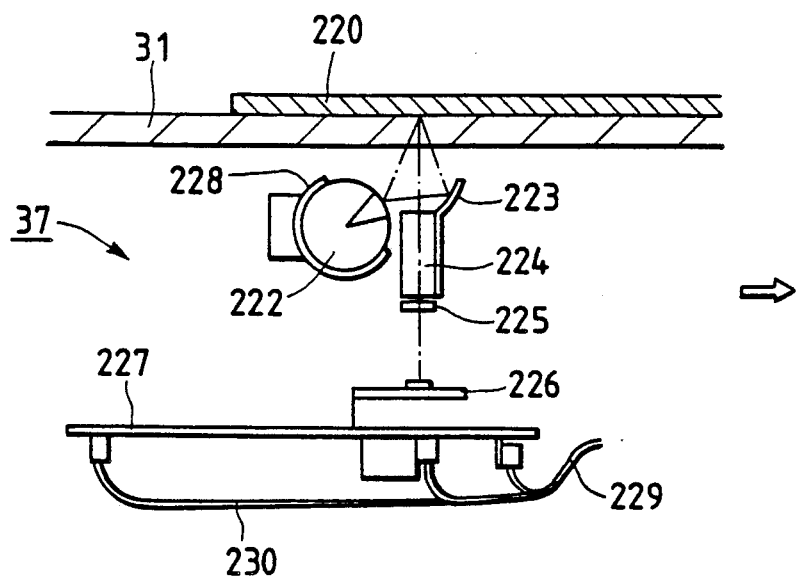
FIG. 17 is a cross-sectional view of an imaging unit.

FIG. 17 shows a cross-sectional view of the imaging unit 37. A document 220 is set on a platen glass 31 with a picture surface to be copied facing downwardly. The imaging unit 37 moves below the underside of the document in a direction of an arrow to expose the document surface using a 30 W-daylight fluorescent lamp 222 and a reflective mirror 223. The light reflected from the document 220 is transmitted through a SELFOC lens 224 and cyanogen filter 225 thereby image-forming an erect image of unity enlargement on the light receiving surface of a CCD line sensor 226. The SELFOC lens 224 is a compound eye lens made up of fiber lens of four rows and is advantageous in that it has high brightness and high resolution but requires only a small power as well as it is compact in size. The imaging unit 37 is equipped with a circuit board 227 including a CCD line sensor drive circuit and a CCD line sensor output buffer circuit, etc. The reference numeral 228 is a lamp heater, 229 a flexible cable for power supply for lighting, and 230 a flexible cable for control signals.

Figure 18A:
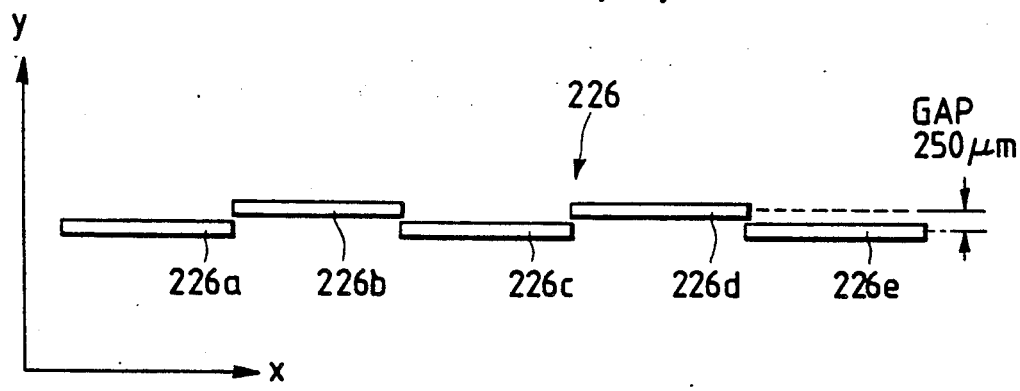
FIGS. 18(a)-(b) are diagrams for showing one way of disposing CCD line sensor.

FIG. 18 shows a sample layout of the CCD line sensor 226. Five CCD line sensors 226a-226e are disposed in a zigzag fashion in a direction of a main scan direction X. This is because it is difficult to produce a large number of light receiving elements having a uniform sensitivity without defects as well as if a plurality of CCD line sensors are disposed in a single line, it is difficult to produce picture elements to both ends of the CCD line sensor and some portion of the document may be difficult to be read.

Figure 18B:
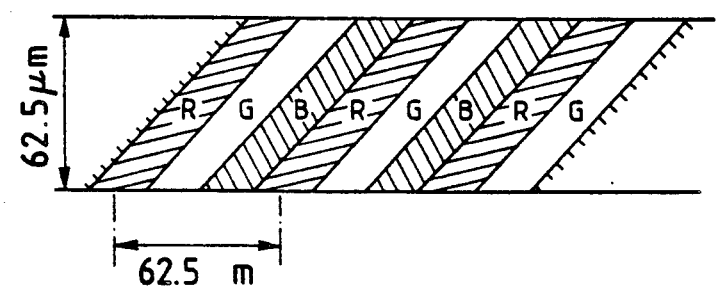

With the sensor portion of the CCD line sensor 226, as shown in FIG. 18b, three color filters of R, G, and B are disposed in a regular order on the surface of the respective picture elements of the CCD line sensor 226, thereby forming one picture element with adjacent three bits when reading a document. Assuming that the density of a picture element to be read of each color is 16 dots/mm and the number of picture elements per one chip is 2928, the length of one chip is 2928/(16 times 3)=61 mm), total length for five chips will be 61 times 5=305 mm. Thus this arrangement can provide a CCD line sensor for unity enlargement factor, capable of reading A3 size paper. The respective picture elements of R, G, B are disposed with inclination of 45 degrees to reduce Moire.

In the case where a plurality of CCD line sensor 226a-226e are disposed in a zigzag arranged, an adjacent CCD line sensor scans the document surface different from what the other sensor scans. That is, if the document is scanned by moving the CCD line sensor in the subscan direction Y, perpendicular to the main scan direction X, then time-discrepancy that corresponds to the position-discrepancy between adjacent CCD line sensors will be produced between a signal from the CCD line sensor 226b, 226d of the first row that precedes scanning of the document and a signal from the CCD line sensors 226a, 226c, 226e of the second row.

In order to construct a continuous signal of one line on the basis of the picture element signals which a plurality of CCD line sensors are read individually, it is required to store signals from the CCD line sensors 226b, 226d of the first row that precedes scanning of the document and then to read out in synchronism with subsequent signals from the CCD line sensors 226a, 226c, 226e of the second row. In which case, for example, if the amount of discrepancy in position is 250 μm and resolution is 16 dots/mm, then a delay long enough of four lines is required.

Reduction/enlargement with conventional picture reading devices is effected by dilution and thinning by IPS in the main scanning direction and by increasing and decreasing of moving velocity of the imaging unit 37 in the subscanning direction. Thus reading speed (the number of lines that is read within a unit time) of the picture reading device is set fixed while moving velocity is varied to change resolution in the subscanning direction. In other words, for example, if resolution is 16 dots/mm when reduction/enlargement factor is 100%, then following relation will result.

| Reduction/ Enlargement (%) | Speed (times) | Resolution (dots/mm) | Zigzag Correction (number of lines) |
| --- | --- | --- | --- |
| 50 | 2 | 8 | 2 |
| 100 | 1 | 16 | 4 |
| 200 | ½ | 32 | 8 |
| 400 | ¼ | 64 | 16 |

Higher the reduction/enlargement factor increases, higher the resolution increases; therefore required number of line memory for correcting a difference of 250 μm between the zigzag layout will increase.

(E) Video signal processing circuit

Figure 19:
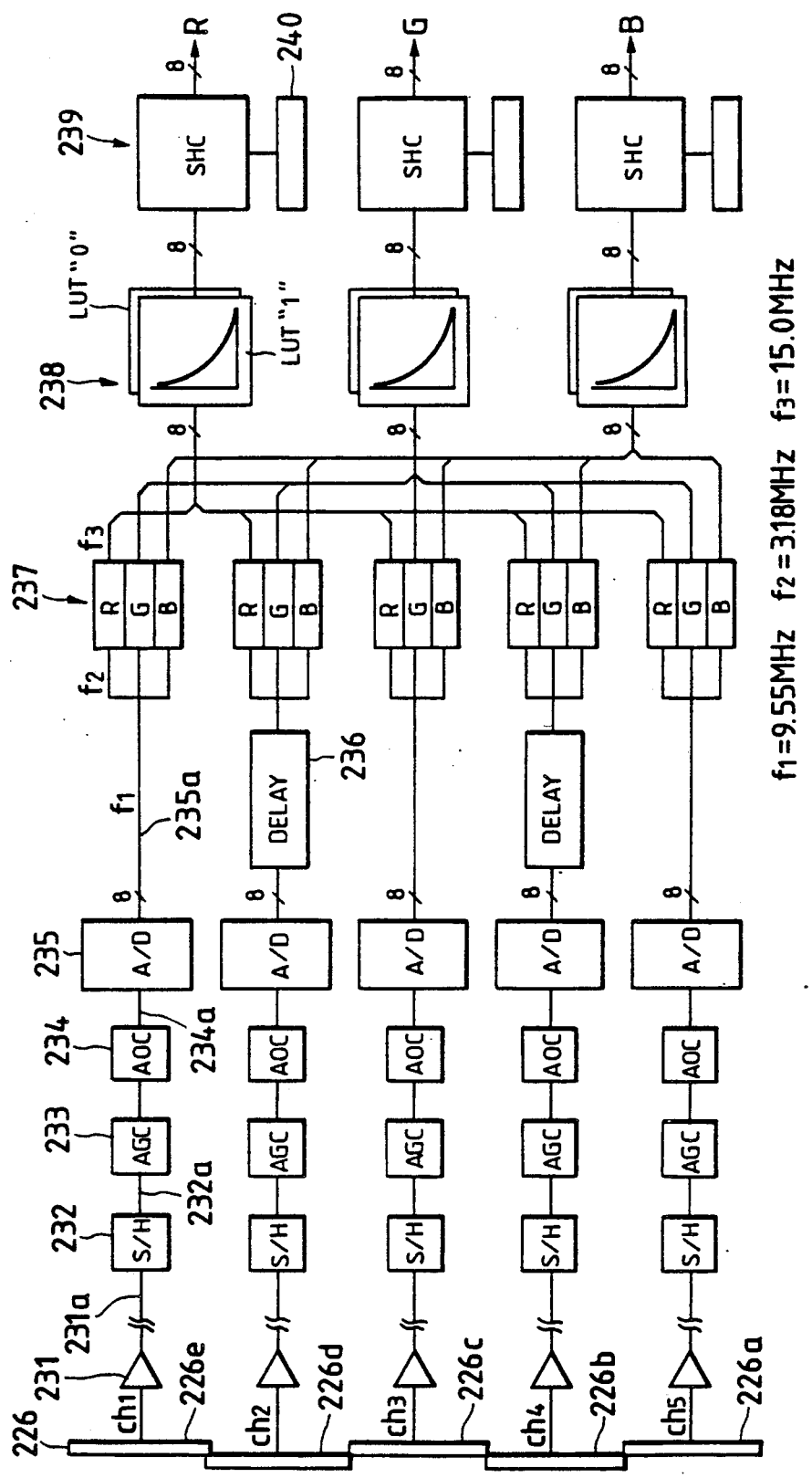
FIG. 19 shows an example of an arrangement of a video signal process circuit.

A video signal processing circuit will now be described with reference to FIG. 19, in which the CCD line sensor 226 is used to read a color document in terms of a reflection factor signal for each of R, G and B, which is converted into a digital value of a density signal.

Figure 20:
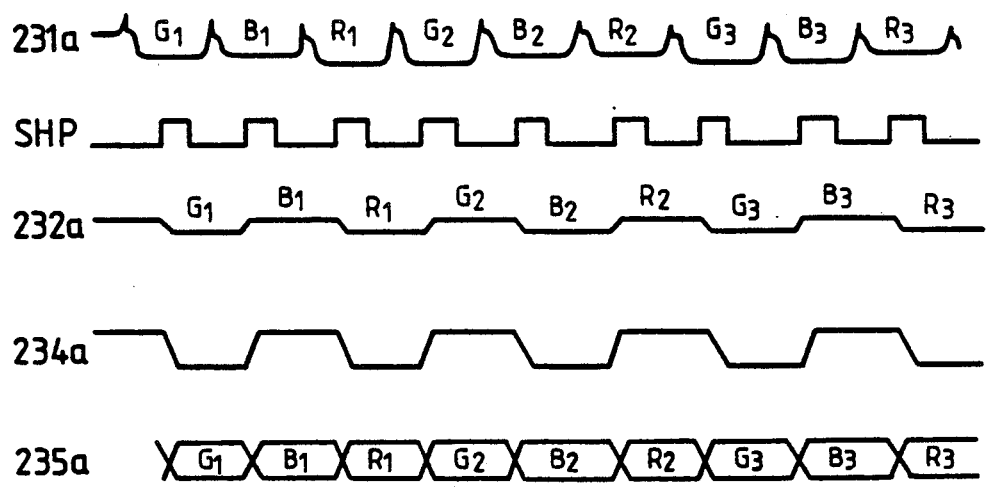
FIG. 20 is a timing chart for illustrating the operation of the video signal process circuit.

The document is divided into five segments to be read through five channels consisting of five CCD line sensors 226 in the imaging unit 37; each of segments is read in terms of three colors R, G and B; the respective channels are amplified by respective amplifiers 231 to the required levels and are then transmitted over transmission cables that connects between units and the main body (FIG. 20 231a). Then a sample hold circuit SH 232 eliminates noise from the video signals using sample hold pulse SHP (FIG. 20 232a) to shape the waveform. However, the photoelectric transducing characteristic of the CCD line sensor varies from picture element to picture element and from chip to chip, causing different output levels from a document of the same density, which in turn causes lines and unevenness in the picture data. For this reason, various correction process are necessary.

AGC (Automatic Gain Control) circuit 233 adjusts the output level from the sensors to an optimum level. This is referred to as "white level adjustment" and is provided, in a circuit in which the outputs from the respective sensors are amplified and fed to an A/D converter 235 through a later described AOC 234, for minimizing error in A/D conversion. For this purpose, the respective sensors reads a white reference level, which is digitalized to be stored into a shading RAM 240. Of which the data for one line is compared by SYS remote 71 (FIG. 3) with a predetermined reference value to provide a digital value indicative of a required gain of AGC 233 through D/A conversion, thereby enabling adjustment of the gain in 256 steps.

An offset adjustment circuit AOC (Automatic Offset Control) 234 is for adjusting output level from the respective sensors when it is dark, which is referred to as black level. For this purpose, the fluorescent lamp is turned off for reading the output from the respective sensors when it is dark. Of which the data for one line is compared by SYS remote 71 (FIG. 3) with a predetermined reference value for converting the offset value from digital to analog to output the analog signal to the AOC 234, thereby adjusting the offset voltage in 256 steps.

The output of the AOC is adjusted its output density to ultimately satisfy specified level with respect to the density of a document as depicted by 234a in FIG. 20.

In this manner, the data converted into digital value (FIG. 20 235a) by an A/D converter 235 is output in the form of a data train of eight bits in the order GBRBGR .... A delay-amount setting circuit 236 is a memory into which data for plurality of lines are stored in FIFO arrangement, preceding signals from the CCD line sensors 226b, 226d of the first row are stored and then are outputted in synchronism with subsequent signal outputs from CCD line sensors 226a, 226c and 226e of the second row.

A separation and synthesis circuit 237 separates the data of R, G, B of the respective line sensors and then serially synthesizes a document portion of one line to form a train of each of R, G, B of the respective CCD line sensors.

A converter 238 consists of ROMs in which a log-conversion table LUT "1" is stored. When a digital value is input as an address signal, information on the reflective index of r, G, B is converted by the log-conversion table LUT "1" into information of the density.

A shading correction circuit 239 will be described. Shading characteristic appears due to variation in light distribution property of a light source, less intensity at ends of a fluorescent lamp, variation in sensitivity between bits of the CCD lien sensors, or stain on a reflecting mirror and so on.

Therefore, when initiating the shading correction, a light reflected from a white board as a reference density data for shading correction is input into the CCD line sensor and the above mentioned signal processing circuit performs A/D conversion and log conversion, thereby storing the reference density data log (Ri) into a line memory 240. Then substracting a picture data log (Di) that is read in by scanning the document from the aforementioned reference density data log (Ri) gives the following relation.

$$\log (Di) - \log (Ri) = \log (Di/Ri)$$

This relation gives logarithmic representation of data of the respective picture elements which has been shading-corrected. Shading-correction after logarithmic conversion in this manner eliminates the necessity of building a hard logic divider using complicated circuits of a large scale as in conventional apparatus, thereby facilitating arithmetic operation through use of general purpose adder ICs.

(II-3) Image output terminal (A) General construction

Figure 21:
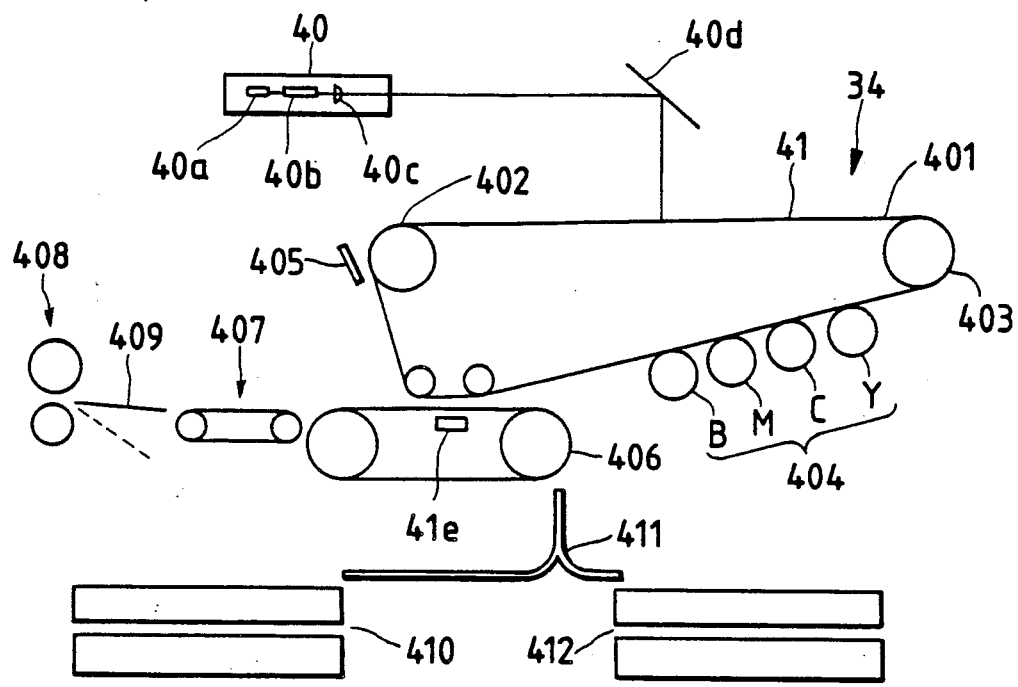
FIG. 21 is a diagram for showing a general arrangement of IOT.

FIG. 21 is a diagram for showing general construction of the image output terminal (IOT).

The apparatus according to the present invention employs organic photo recepter belt as a sensitive material and is provided with a developing machine 404 consisting of Y, M, C, K for four full color with a tow roll transfer loop 406 for deliverying the paper to the transfer unit, a vacuum transfer 407 for deliverying the paper to a fixing unit 408, paper trays 410, 412, a paper delivery path 411. Three units, i.e. the photo recepter, the developing machine, and the two roll transfer loop, are constructed in such a way that they may be drawn out to the front side of the apparatus.

Information light obtained by modulating the laser light from a laser light source 40 illuminates the sensitive material 41 through a mirror 40d for exposing to form a latent image. The image formed on the sensitive material is developed by the developing machine 404 to form a toner image. The developing machine 404 consists of B, M, C and Y which are disposed in a positional relation shown in FIG. 21. They are so disposed taking into consideration the relationship between dark decay and the property of the respective toner and different effects of the other toners to the black toner due to intermixing, etc. However, full color copy is carried out in the order of M→C→Y→B. In the mean time, the paper supplied from a paper tray 410 consisting of two-stage elevator tray and other two-stage paper tray 412 is supplied to a tow roll transfer loop 406 through a delivery path 411. The tow roll transfer loop 406 is disposed in the transfer unit and is formed of two rolls coupled through a timing chain or a belt, and a later described gripper bar which grasps the paper to delivery it, thereby causing the toner image on the sensitive material to be transferred to the paper. In the case of four full colors, the paper is rotated four times by the tow roll transfer, thereby the images in M, C, Y and B being transferred in this order. The paper that has been transferred is released from the gripper to a vacuum transfer 407 via the tow roll transfer loop 406 and is then subjected to fixing by the fixing unit 408. The vacuum transfer 407 compensates the speed difference between the tow roll transfer loop 406 and the fixing unit 408 for synchronous operation between the loop 406 and the unit 408. In the present apparatus, transfer speed (process speed) is set to 190 mm/sec, which is different from fixing speed of 90 mm/sec for the full color copy. For good fixing result, the process speed is decreased but the requirement of total power consumption of less than 1.5 kVA does not allow much power to be devoted to the fixing unit 408. For this reason, when taking copies of small size paper such as B5 and A4 sizes, as soon as the transferred paper is released from the tow roll transfer loop 406 and is placed on the vacuum paper carrier 407, the speed of the vacuum paper carrier 407 is decreased from 190 mm/sec to 90 mm/sec, equal to the fixing speed. The present apparatus is indented to be compact by disposing the tow roll transfer loop 406 and the fixing unit 408 close to each other. Therefore the A3 size paper cannot be placed comfortably between the transfer point and the fixing unit 408 but instead extends beyond it, and when the speed of the vacuum paper carrier 407 is decreased, the tail end of the A3 size paper is still being transferred image thereon, thus imposing a drag on the paper to cause color misalignment. Thus between the fixing unit 408 and the vacuum paper carrier 407 is provided a baffle board 409 which is inclined downwardly for allowing the paper to pass through a "longer delivery path", thereby the vacuum paper carrier 407 being of the same speed as the tow roll transfer loop speed but the forward end of the paper arrives at the fixing unit 408 after transfer of the image has been completed. In this manner, the speed difference between the tow roll transfer loop 406 and the fixing unit 408 is compensated. Likewise, the OHP is copied in the same manner because its heat transfer is not good. The present apparatus is adapted to ensure the same productivity for both in the full color and in the black and white. In the black and white case, the fixing speed remains 190 mm/sec and the vacuum paper carrier 407 is not decreased its speed since only a single toner layer is used and only a small amount of heat is required. The same arrangement as in the black and white case mentioned above is applied to a single color case because the single color case uses a "single toner layer" as in the black and white case and therefore requires no speed reduction when fixing. When the transfer is completed, residual toner deposited on the sensitive material is scratched off with a cleaner 405.

(B) Construction of tow roll transfer loop

Figure 22:
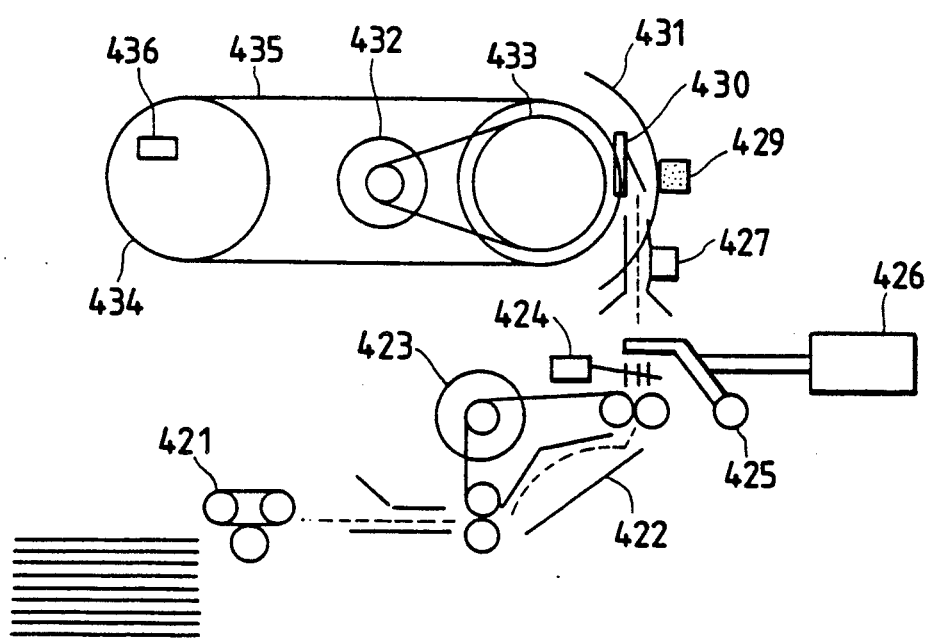
FIG. 22 is a diagram for showing a general arrangement of a transfer device.

The tow roll transfer loop 406 is arranged as shown in FIG. 22.

A tow roll transfer loop of the present apparatus is of a construction in which a mechanical paper retaining member is not employed so that nonuniformity of color will not result. Further, the transfer loop is controlled in two-speed mode so as to increase transfer speed.

The paper is taken up from the tray by a feed heat 421, delivered through a buckle chamber 422 driven by a paper pass servo 423, and supplied to the tow roll transfer loop via a regi-gate 425 controlled to open and close by a regi-gate solenoid 426. An arrival of the paper at the regi-gate 425 is detected by a pre-regi-gate sensor 424. The tow roll transfer loop is driven in counterclockwise by a roller 433 driven by a servo motor 432 through a timing belt.

A roller 434 is not particularly driven but two timing chains or belts 435 are provided between the roller 433, 434 and the gripper bar 430 is provided between the two chains (in the direction transverse the delivery path) which is normally closed by resiliency thereof and is opened by a solenoid at the entrance of the transfer loop. The gripper bar 430 grips the paper at the entrance of the transfer loop and pulls it around to deliver. The transfer loop is not provided with a paper supporting member and therefore the paper is pulled to outside due to a centrifugal force. To prevent this, the two rollers are drawn the vacuum to attract the paper toward the rollers. Thus when the paper is delivered past the roller, it is delivered while fluttering. The paper is attracted through static electricity by the sensitive material to which detuck collotron and transfer collotron are disposed. After transfer, the paper location is detected by a gripper home sensor 436 at the transfer exit and the gripper bar is opened at a proper timing by the solenoid to release the paper and then the paper is delivered to the vacuum paper carrier. Thus the paper is delivered for transfer through four rotations for full color and through three rotations for three colors.

Conventionally the paper have been supported by a Mylar sheet or a mesh tensioned on a supporting member made of a steel or aluminum; therefore unevenness due to different rate of thermal expansion infringes flatness of the sheet or mesh i.e., partly different transfer efficiency of the mesh, causing color irregularity. The use of the gripper in the present invention eliminates the paper supporting member but still presents color irregularity. In the tow roll transfer loop of the present apparatus, transfer function is not in effect during movement of the lead edge of the paper between the present transfer point to the next transfer point if the paper is of a small size such as A4 and B5; therefore the transfer loop is operated at a higher speed of the two speeds for increased copy speed. As for A3 size paper, the paper is as long as about ¾ of the total length of the tow roll transfer loop thus the speed is not switched.

(II-4) User interface (U/I)

(A) Employment of color display

Figure 23A:
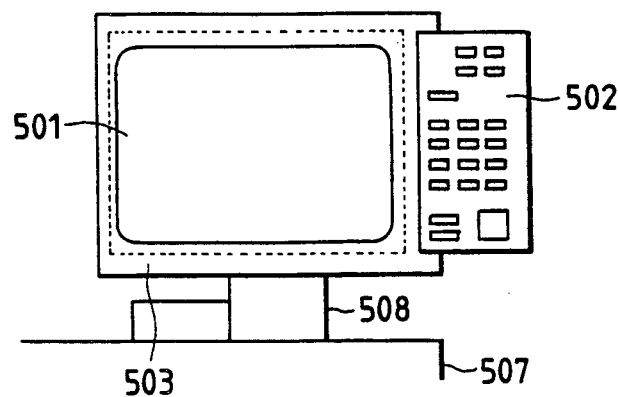
FIGS. 23(a)-(c) show a mounting assembly of UI which employs a display.

FIG. 23 illustrates mounting assembly of a display-employing user interface; FIG. 24 is a diagram for showing the mounting angle and the height the user interface.

The user interface is for supporting easy, smooth communication between an operator and the machine, is supposed to enable simple operation, and shows the relation between information, while also impressing the operator necessary information. For this purpose, the present invention aims at enhancing operability of the machine which is easy for beginers to understand but not too tedius for well trained people, direct operation when selecting the functions, use of colors for quick transmission of accurate information, and centralization of control.

If a copy machine is provided with a wide variety of functions and is highly reliable, then the copy machine can enjoy satisfactory commercial acceptance. Conversely, even if the functions provided by the apparatus are nice to have around but are not designed to be easy to use, then the apparatus loses its commercial values; therefore such a copy machine is regarded as being difficult to use and total evaluation of the machine would be very poor. From such a point of view, a user interface is an important factor that virtually dictates whether the machine is easy to use or not. The operatibility of the user interface is a key quality of the copy machine, especially for the recent machines having multi-functions.

For such improved operability, the user interface of the invention is provided with a monitor of 12 in. color display 501 and a hard control panel 502 besides. A careful, judicious use of a color display provides the users with easy to see and easy to understand menu while at the same time a combination of the color display and an infrared touch board 503 permits direct access through the software button on the picture. The efficient of sharing the operation contents by the hard buttons on the hard control panel 502 and the picture of the color display 501 allows simplified operation and efficient arrangement of the menu picture.

Figure 23B:
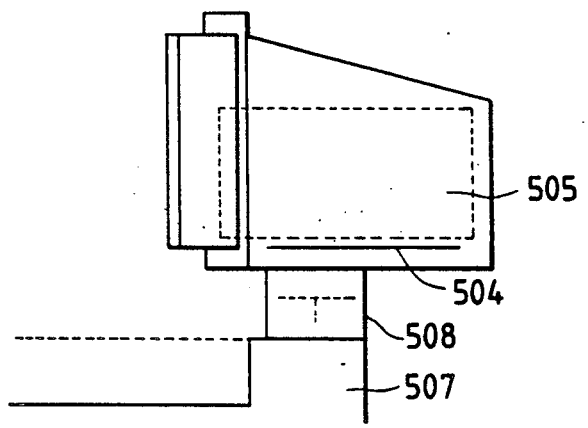
Figure 23C:
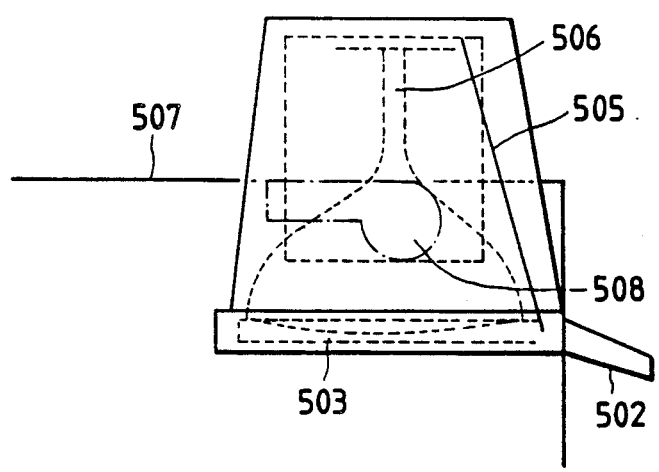

Behind the color display 501 and the hard control panel 502 are equipped with a monitor-control/power-supply board 504 and a video engine board 505 and a driver board 506 for the CRT as shown in FIG. 23b and FIG. 23c. The hard control panel 502 takes up a position or an angle facing the center of the front of the machine as compared to the surface of the color display 501 as shown in FIG. 23c.

Figure 24A:
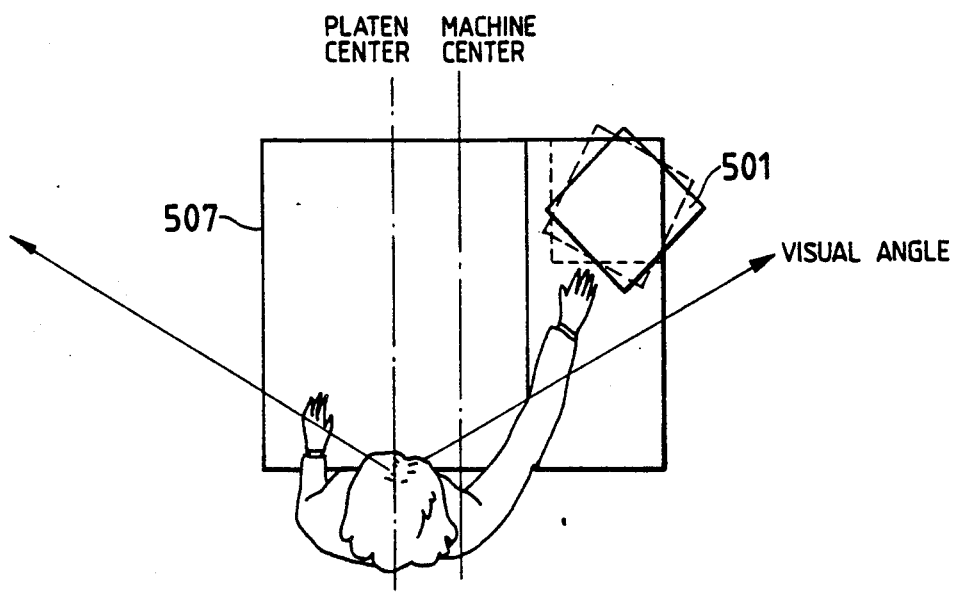
FIGS. 24(a)-(b) are diagrams for illustrating an example of the mounting angle and the height of the UI.
Figure 24B:
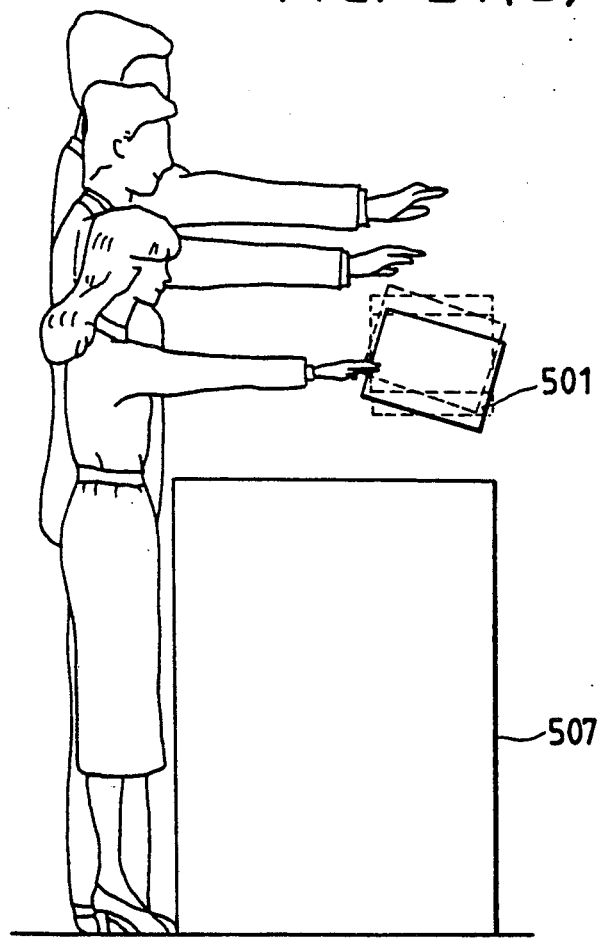

The color display 501 and the hard control panel 502 are not mounted directly on the base machine (copy machine main body) 507 but on a supporting arm 508 provided on the base machine 507. Using the color display 501 of a stand type but not using a conventional console type allows mounting the display at a three dimensional position above the base machine as shown in FIG. 23a; therefore disposing the color display 501 at the right back corner of the base machine 507 as shown in FIG. 24a permits design of the size of the copy machine without having to consider a console panel, leading to a compact machine.

With a copy machine, the height of the platen or the apparatus is designed to be as high as the waist of the operator, reasonably high for setting the document. This dictates the height of the apparatus. Conventional console panel are mounted on the upper surface of the copy machine which is at about the same level as the waist of the operator thus it is easy to use but the controls and the displays for selecting functions and setting execution conditions are necessarily positioned at a distance relatively away from the operator's eyes. Conversely, the user interface of the present invention is at a higher level than the platen thus close to the operator's eyes while at the same time its location is not below but in front of and to the right of the operator's eyes for comfortable operation. Further, having the display mounted at the eye level can provide a space thereunder that can be used for housing a control board and a memory card device for the user interface as well as option kits such as a key counter. Thus the memory card device does not necessitate structural change of the machine when mounting memory card but may be simply added without changing the appearance of the copy machine. The display may be either of a construction fixed at a predetermined angle or of a construction in which the angle may be variable.

(B) System arrangement

Figure 25:
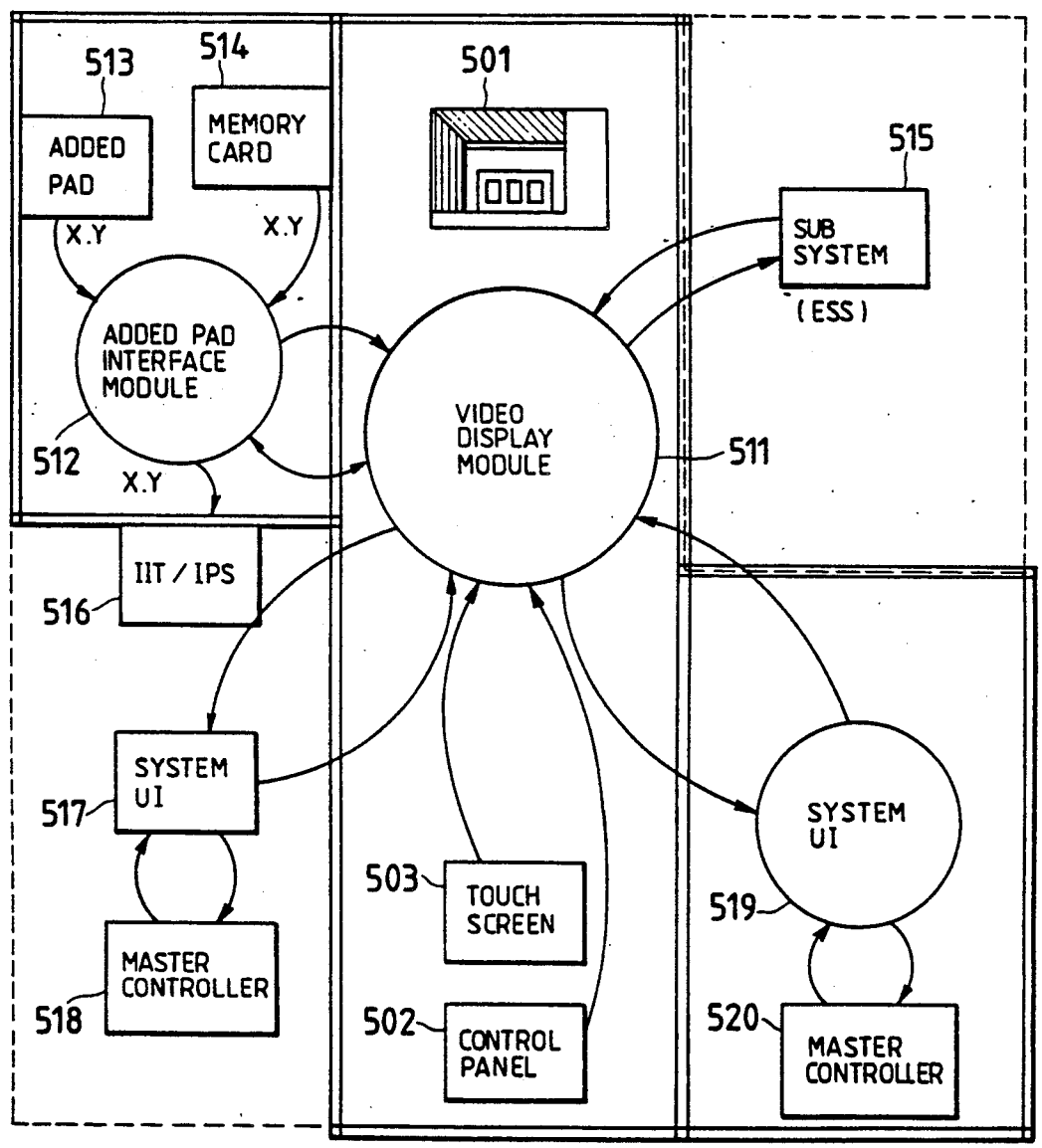
FIG. 25 shows a module arrangement of the UI.
Figure 26:
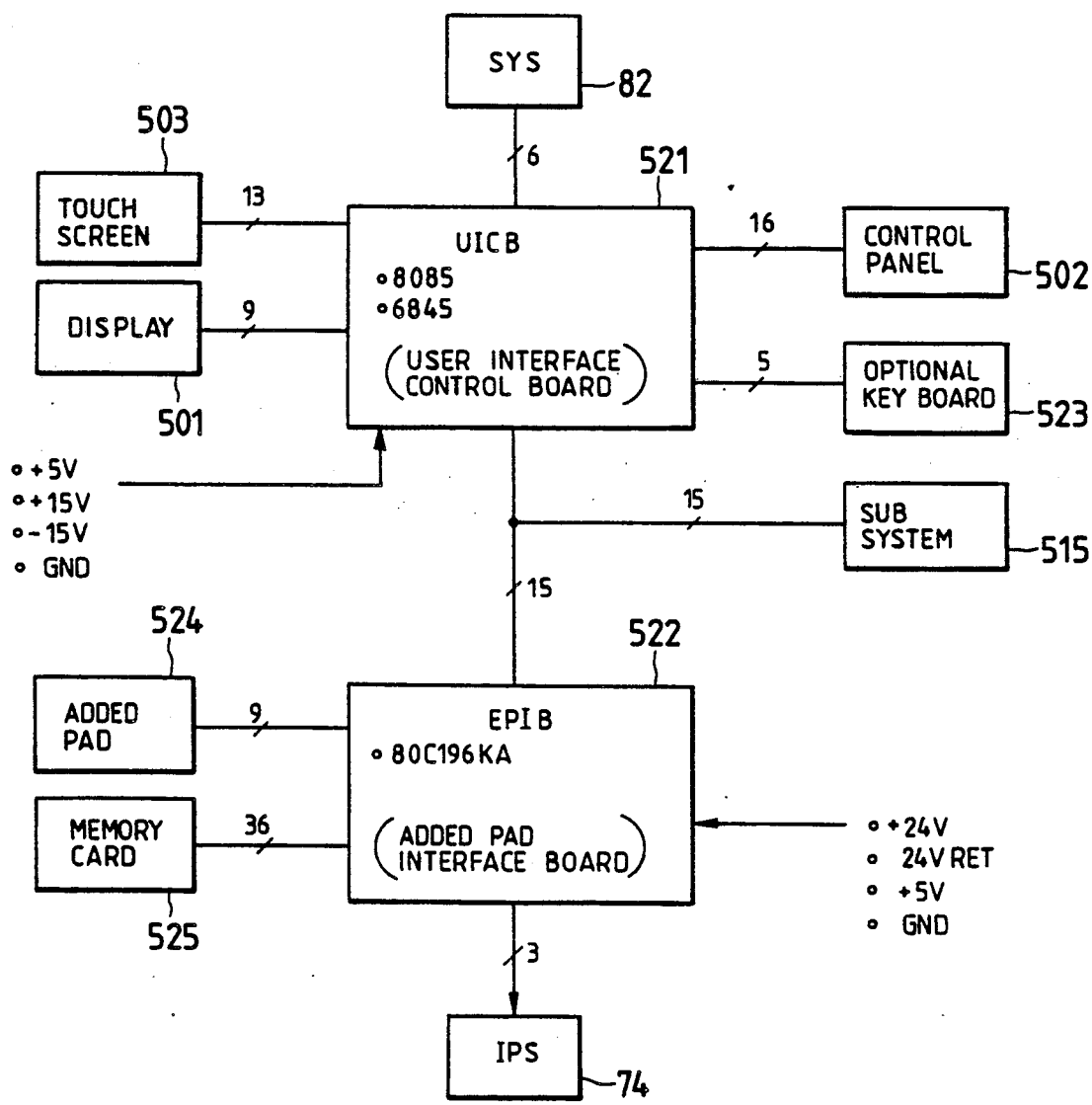
FIG. 26 is a diagram for showing a hardware arrangement of the UI.

FIG. 25 is a diagram for showing module arrangement of the user interface, and FIG. 26 is a diagram for illustrating the hardware arrangement of the user interface.

A module arrangement of the user interface according to the invention comprises, as shown in FIG. 25, a video display module 511 for controlling the display picture of a color display 501, an edit pad interface module 512 for inputting and outputting information, an edit pad 513 and a memory card 514. System UI's 517 and 519 for controlling the above modules, a subsystem 515, a touch screen 503, and a control panel 502 are connected with the video display module 511.

The edit pad interface module 512 inputs X, Y coordinates from the edit pad 513 as well as inputs jobs and X, Y coordinates from the memory card 514. The module 512 also sends video map display information to the video display module 511 while also transmits and receives UI control signals between the video display module 511.

Region designation includes marker designation in which a region is specified by markers such as red and blue on the document for trimming or color conversion, two-points designation in which a region is specified by the coordinate of a square or rectangular region, closed loop designation in which a region is specified tracing with the edit pad. The marker designation does not involve particular data and the two-points designation involves only a little amount of data while the closed loop designation involves a large amount of data to specify a region to which edit is to be carried out. Editing of these data is performed by IPS but a large amount of data involved makes it difficult to transfer the data at high speeds. Thus the apparatus is constructed so that these X, Y cordinate data are transmitted through an exclusive transfer line connected to IIT/IPS 516, separate from the general data transfer lines.

The video display module 511 receives input points (coordinate positions on the touch screen) indicative of vertical and horizontal coordinates for identifying the button ID and also receives the button ID from the control panel 502. Then the module 511 transmits the button ID to the system UI 517,519 and receives display requests from the system UI 517,519. Also the subsystem (ESS) 515 is connected to, for example, a work station and a host CPU, and serves as a printer controller when the present apparatus is used as a laser printer. In which case, information from the touch screen 503, control panel 502, and keyboard (not shown) are transmitted to the subsystem 515 as they are and the contents of the display picture are transmitted from the subsystem 515 to the video display module 511.

The system UI 517,519 transmits and receives information of the copy mode and the machine state between the master controller 518,520. One of the system UIs 517 and 519 corresponds to SYSUI module 81 of the SYS remote shown in FIG. 4 while the other corresponds to the MCBUI module 86 of the MCB remote in FIG. 4.

The hardware of the user interface according to the present invention comprises two control boards consisting UICB 521 and EPIB 522 as shown in FIG. 26. Accordingly, the functions are divided into two groups. UICB 521 uses two CPUs (for example, INTEL 8085 or equivalent and 6845 or equivalent) for controlling UI hardware to drive the edit pad 513 and the memory card 514 and also for processing the inputs to the touch screen 503 to write on the CRT. EPIB 522 uses 16-bit CPU (for example, INTEL 80C196KA) since 8-bit CPU is not enough for the function for drawing in the bit map area, and an image-drawing data in the bit map area is transferred to UICB 521 through DMA, thereby decentralizing functions.

Figure 27:
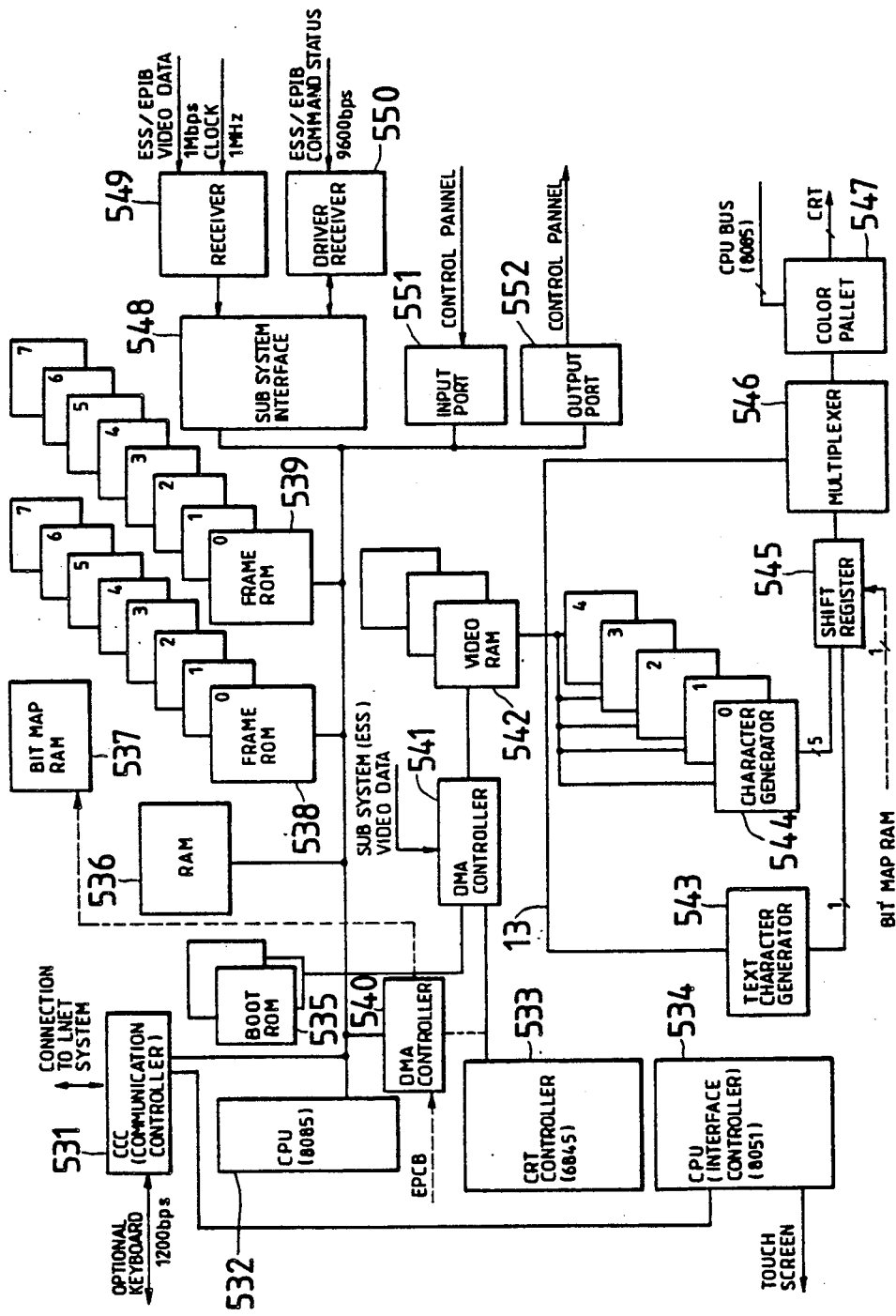
FIG. 27 is a diagram for showing an arrangement of UICB.

FIG. 27 is a diagram for showing an arrangement of UICB. In UICB, CPU 534 (for example, INTEL 8051 or equivalent) is resident besides the CPUs as described above and CCC 531 is connected to the high speed communication line L-NET and the communication lines of optional key boards, thereby controlling communication by the CPU 534 and the CCC 531 as well as using the CPU 534 for driving the touch screen as well. The signal from the touch screen, coordinate position information, is read in via the CCC 531 from the CPU 534 to the CPU 532 where the button ID is identified and processed. The UICB is connected to the control panel through an input port 551 and an output port 552, as well as receives a clock of 1 MHz and a video signal of 1 Mbps from EPIB 522 and the subsystem (ESS) through a subsystem interface 548, a receiver 549, and a driver 550, and transmits and receives commands and status information at 9600 bps through the subsystem interface 548 and the driver 550.

The memories include, frame ROMs 538, 539, a RAM 536, a bit RAM 537, and a V-RAM 542 in addition to a boot ROM 535 in which boot strap is stored. The frame ROMs 538, 539 are memories in which the data to be displayed on the CRT picture in the form of data structure that can easily be handled through the software but not through the bit map. When the display data is received through the L-NET, the CPU 532 produces a picture-drawing data in the RAM 536 as a work area and the data is then written into the V-RAM 542 through DMA 541. the bit map data is transferred by the DMA 540 from the EPIB 522 to the bit map RAM 537. A character generator 544 is for a graphic 544 is for a graphic tile while text character generator 543 is for a letter tile. The V-RAM 542 is supervised by a tile code which is formed of 24 bits (three bytes), of which 13 bits are used for tile-type information, two bits for an identity information for identifying whether it is a text or a graphic or a bit map, one bit for blink information, five bits for tile color information, and three bits for information whether it is background or foreground. A CRT controller 533 expands the display picture on the basis of the tile code written into the V-RAM 542 and sends out the video data to the CRT through a shift register 545, a multiplexer 546, and a color pallet 547. The picture-drawing into the bit map area is selected by a shift register 545.

Figure 28:
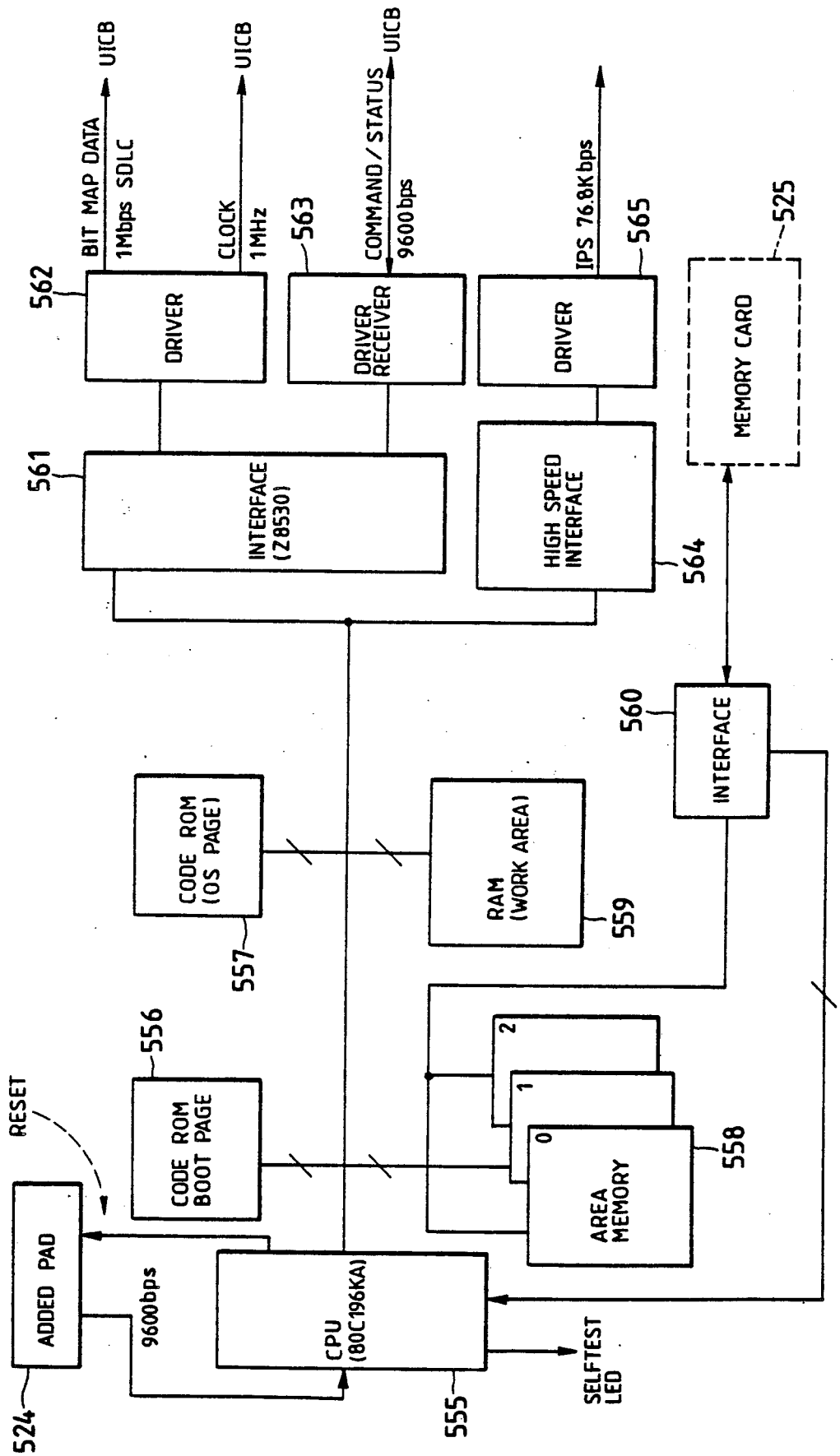
FIG. 28 illustrates an arrangement of EPIB.

FIG. 28 is a diagram for showing an arrangement of EPIB.

EPIB has a 16-bit CPU 555 (for example, INTEL 80C196KA or equivalent), a code ROM 556 for boot page, a code ROM for OS page, an area memory 558, a RAM 559 for use as a work area. The EPIB transfers the bit map data to the UICB, transmits and receives the commands and the status information between the UICB via an interface 561, a driver 562, and a driver/receiver 562, and also transfers X, Y coordinate data to IPS via a high speed interface 564 and a driver 565.

The data read-out and write-in of the memory card 525 is effected through the interface 560. Thus when the edit region-designating information and copy mode information of the closed loop are inputted from the edit pad 524 and the memory card 525, respectively, the information is transferred appropriately to UBICB via the interface 561 and the driver 562, and to IPS through the high speed communication interface 564 and the driver 565, respectively.

(C) Display picture arrangement

In the event the user interface employs a display, if the information is to be provided to comply with multi-functions, the amount of information will be large accordingly; therefore a rough, simple calculation reveals that a large display area is required, imposing difficulty on the requirement for compactness of the apparatus machine.

If a compact size display is to be employed, providing all the necessary information through a single picture imposes problems from standpoints of not only the display density but also a picture easy, comprehensive for the operator to use.

The user interface according to the invention employs a compact-size display but careful, judicious arrangement is still made in the display picture and control thereof. Various judicious arrangements are made for building a display easy to understand by making use of the advantages that color display is capable of using wide variety of display manner by controlling the color and the intensity and other display properties as compared to LEDs and liquid crystal displayers used for the console panel. For example, the information to be displayed on the CRT is roughly divided into a plurality of pictures, then each picture is blown up through "pop up" for detailed information, thus eliminating unnecessary information from primary picture to display only pertinent, minimum amount of information.

(a) Picture layout

Figure 29A:
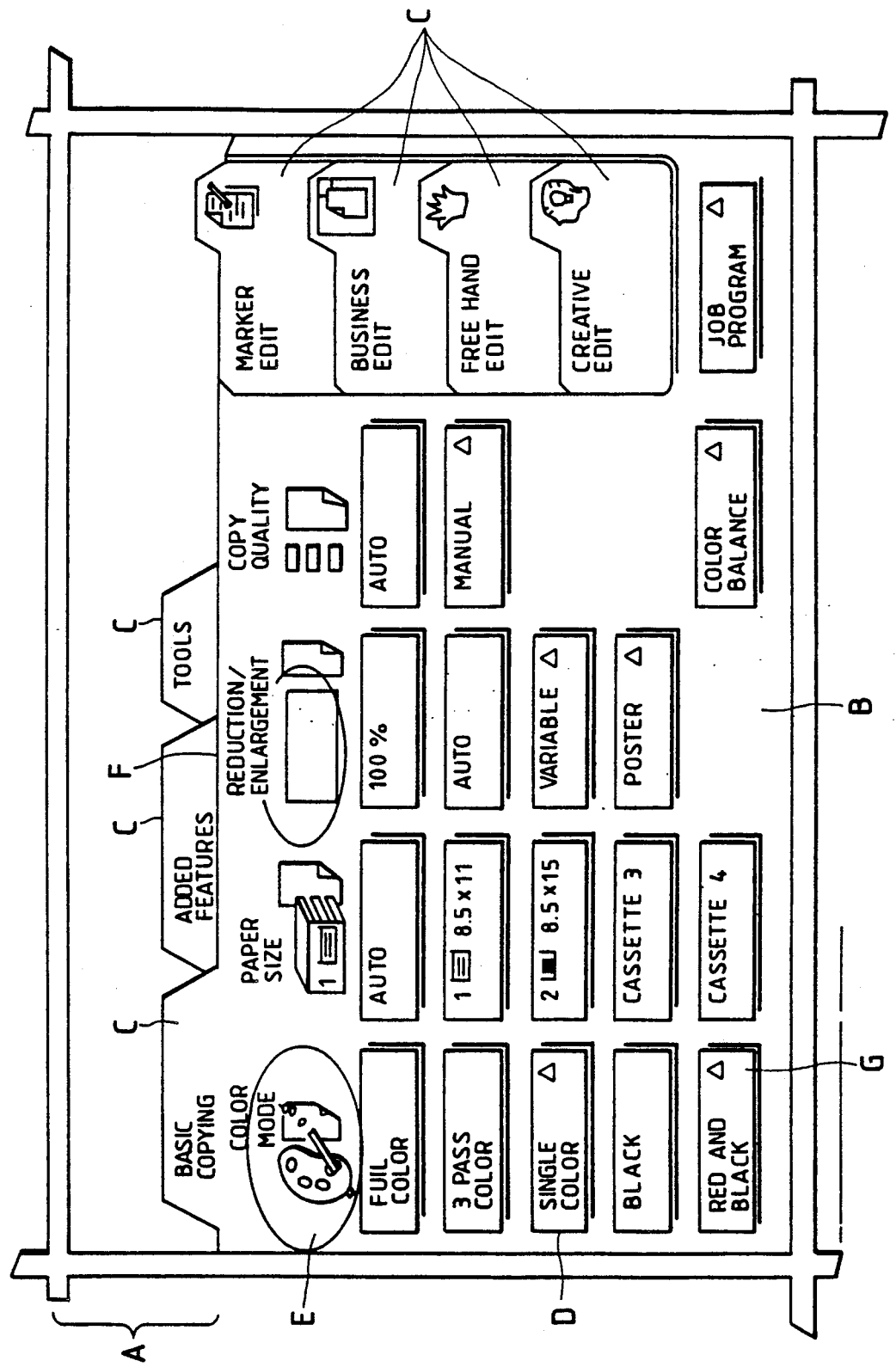
FIGS. 29(a)-(c) show examples of arranging a display image.
Figure 29B:
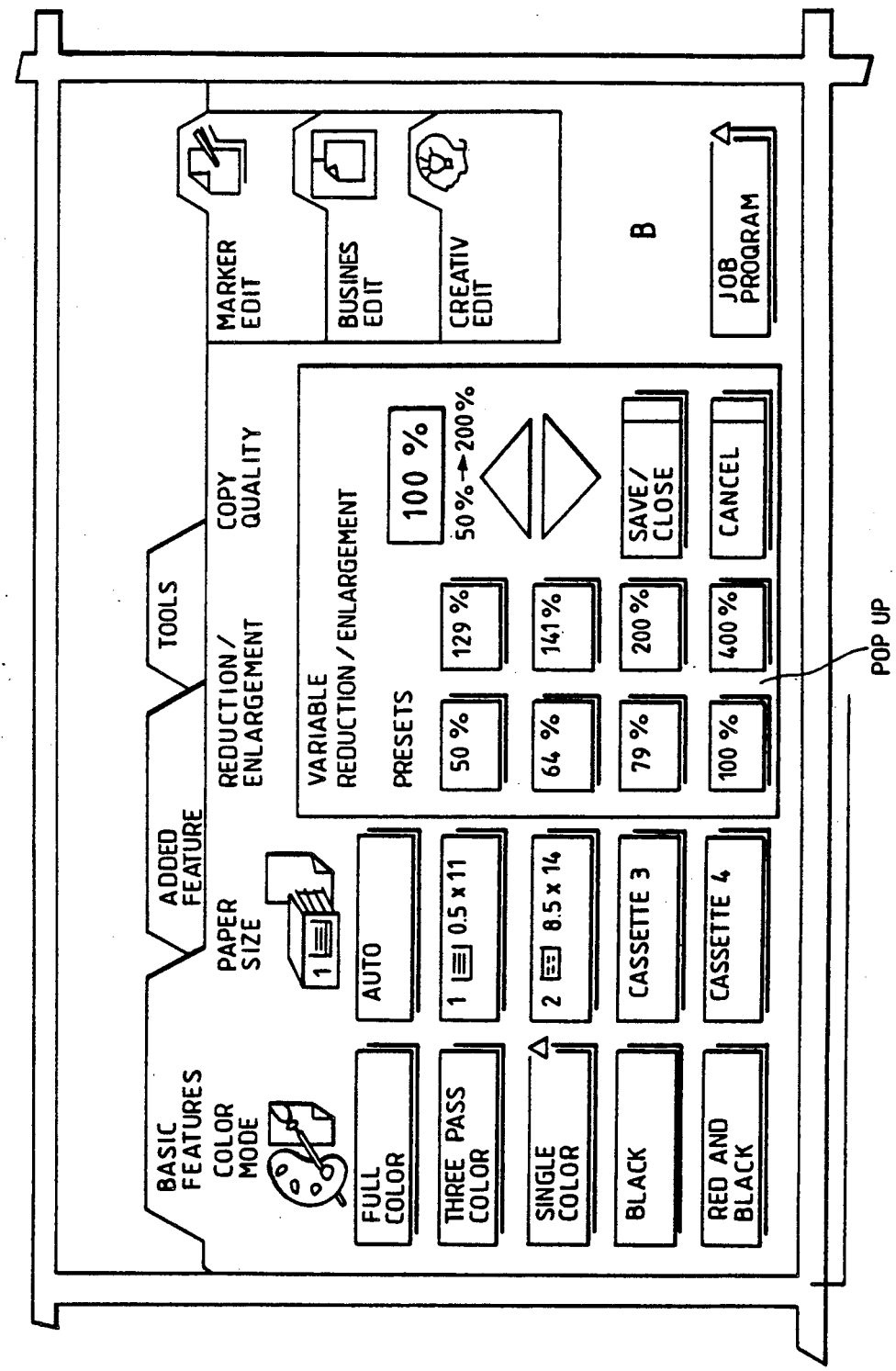
Figure 29C:
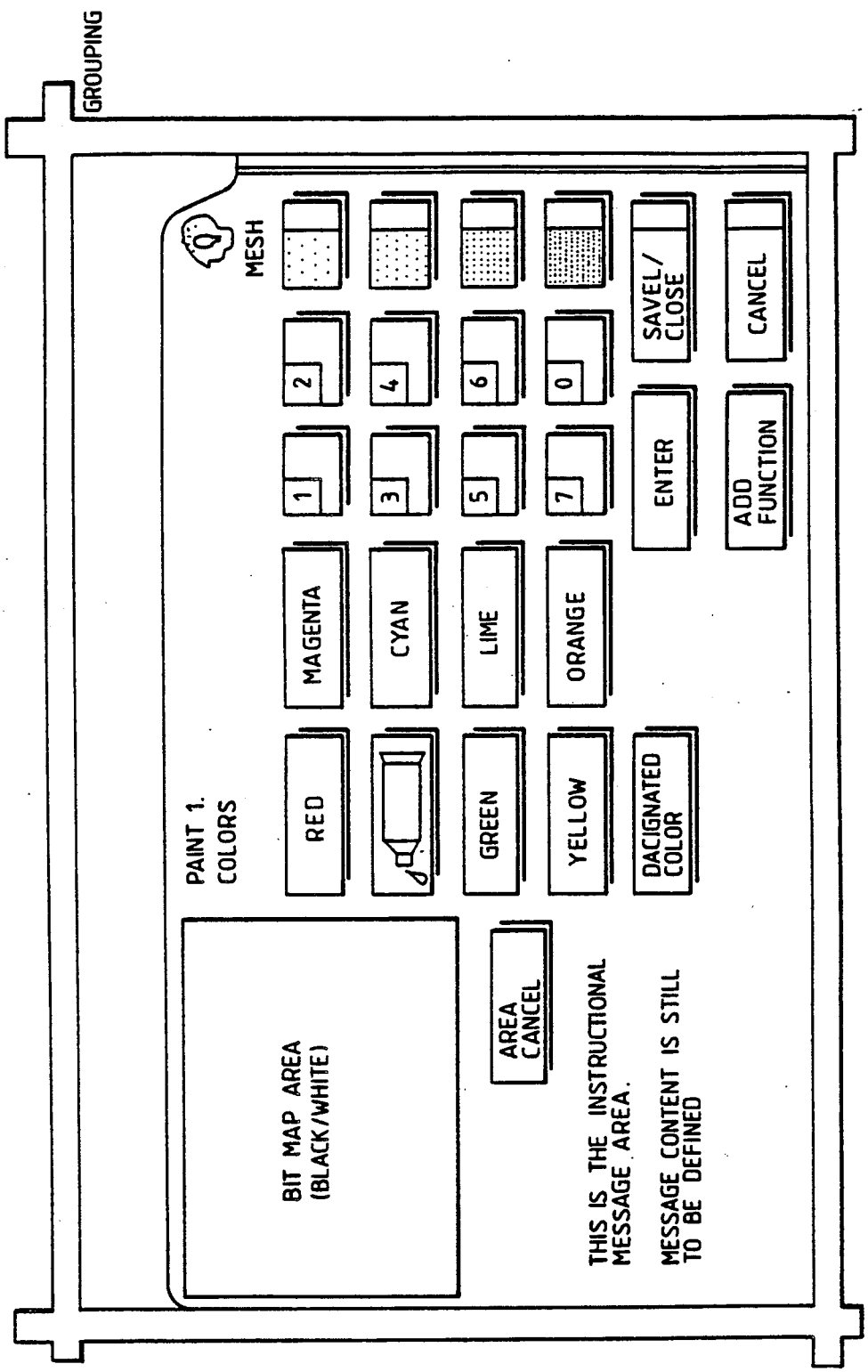

FIG. 29 shows an example of the display picture, FIG. 29a shows an arrangement of the basic copy picture, FIG. 29b is a diagram for showing an example of a picture popped up in the basic copy picture, and FIG. 29c is a diagram for showing an arrangement of a paint 1 picture of the creative edit.

In the user interface according to the present invention, an initial picture is the basic copy picture for setting copy modes as shown in FIG. 29. The picture for setting the copy modes constitutes a soft control panel which is divided into a message area A and a pass way B.

The message area A takes up upper three lines of the screen in which the first line is for state messages, the second and third lines are for a predetermined messages such as guide message when there is a conflict in functions selected, messages indicative of abnormalities of the apparatus, and alarm information messages. On the right side of the message area A is provided a copy quantity display area in which settings of the number of copies inputted through the ten key and the number of copies currently being copied are displayed.

The pass way B is a region for selecting various functions which pass way B includes various pass way such as BASIC COPYING, ADDED FEATURES, MARKER EDIT, BUSINESS EDIT, FREE HAND EDIT, CREATIVE EDIT and TOOLS, and a pass way, a tab C is displayed correspondingly to each of the pass way. Each pass way has a pop up for its improved operability. The pass way B displays software buttons D which are selections from which a specific function is selected when touched, an icon (picture) E which varies in accordance with the functions selected for displaying the selected function, and an indicator F for indicating reduction/enlargement factors. Functions that are popped up by the software button D are given a pop up mark G of "Δ". Touching the pass way tab C opens up the corresponding pass way, and touching the software button D allows selection of the corresponding function. Selection of function by touching the software button D is designed to be operated in the order from left upper one to right lower one for good operability.

The pictures are divided into a basic copy picture and others so that the apparatus can be used with as much "feeling" common to other models and hard console panel as possible. The edit picture is of an arrangement having a plurality of steps or levels to provide pictures and functions in accordance with the level of training of operators. Further, combining such a picture structure and pop up functions provides pictures that can be used in a wide variety, for example, high level functions and somewhat complicated functions in a single picture being displayed through "pop up".

The pop up gives a detailed setting information of a particular functions. The pop up function is used to pop up the detailed setting information as required, thereby enabling simple and easy-to-see picture arrangement of each pass way. The pop up opens when software buttons having a pop up mark is touched and closed when a close button or a cancel button is selected, when the all clear button is pressed, and when autoclear function enables all clear. FIG. 29b shows a picture when pop up is opened by touching a variable reduction/enlargement software button.

Touching pass way tab of the creative edit in the basic copy picture switches the picture to the creative edit pass way picture, "paint 1" of which is shown in FIG. 29c. This picture in FIG. 29c has a bit map area H and a guiding message area I. The bit map area H uses the left upper portion of the screen and when the edit area is designated on the edit pad, that area is displayed in a bit map in black and white. While the guiding message area I uses the left lower portion of the screen and guides the user with respect to edit operation, varying in accordance with the content of the edit operation. The remaining screen except the guiding message area I, the bit map area H and the message area A at the upper portion of the screen is used as a work area.

(b) Basic copy picture

Basic copy pass way has software buttons (selections) for selecting various functions such as COLOR MODE, PAPER SELECTION (paper size), REDUCTION/ENLARGEMENT, COPY QUALITY, COLOR BALANCE, and JOB PROGRAM and pass way tabs of MARKER EDIT, BUSINESS EDIT, FREE HAND EDIT, CREATIVE EDIT, ADDED FEATURE, and TOOLS. These pass way are initial pass ways displayed in autoclear after power on or all clear button ON.

The COLOR MODE comprises selections such as full color (four pass color) in which copy is taken using four types of toner Y, M, C and K; three pass color excepting K from the full color, single color in which one of 12 colors may be selected; black; and black/red. The default that is automatically selected may be arbitrarily set at will. The selections of the single color and black/red are extended through pop up because they have further detailed setting items.

PAPER SELECTION comprises selecting such as autopaper selection (APS), tray 1 and 2, and cassette 3 and 4, of which APS is effective when a particular scale has been set in the reduction/enlargement but not when automatic magnifying scale has been set. Default is in APS. The REDUCTION/ENLARGEMENT comprises 100%, AMS in which when the paper has been selected, the magnifying scale is set on the basis of the paper size and the document size and the arbitrarily variable magnifying scale, and the top indicator indicates the magnifying scale setting, calculated magnifying scale, or automatic magnifying scale. The variable magnifying scale can set the scale at an increment of 1% in the range of 50-400% as well as vertical and horizontal magnifying scale independently (irregular magnifying scale) of each other. Therefore detailed setting items of these are extended through the pop up. Default of the reduction/enlargement is "100%".

As described previously, the reduction/enlargement is effected by changing the scan speed in the subscanning direction (X direction) and by changing the manner of reading out from the line memory of IPS in the main scanning direction (Y direction).

COPY QUALITY is controlled by IPS to provide selections AUTO in which automatic density adjustment is applied to a black and white document while automatic color balance adjustment is performed for a color document and MAN in which seven steps of density control can be performed through the pop up. In the COLOR BALANCE, a color to be decreased on a copy is specified from Y, M, C, B, G, R through pop up under the control of IPS.

In JOB PROGRAM, the selection of the job program can be made only when the memory card is inserted into the slot of the reading machine. The job program mode allows the user to select reading a job from the memory card by means of pop up and writing a job into the memory card. The memory card is of, for example, 32 kbyte in which up to eight jobs may be stored and allows programming of all the jobs except the film projector mode.

(c) Added feature picture

The pass way of the added feature includes software buttons (selections) for selecting various such as copy output, copy sharpness, copy contrast, copy position, film projector, page programming, job programme and binding margin as well as pass way tabs such as MARKER EDIT, BUSINESS EDIT, FREE HAND EDIT, CREATIVE EDIT, BASIC COPYING and TOOLS.

The "copy output" has selections of either outputting to the top tray or outputting in sort mode. Default of the "copy output" is the top tray and is not displayed if the sorter is not equipped.

The "copy sharpness" has STANDARD, MANUAL in which control in seven steps through pop up is possible, and PHOTO which is subdivided through the pop up into photo, characters, print, and photo/characters, and is controlled by IPS. Default of the copy sharpness can be arbitrarily set.

In the "copy contrast", contrast in seven steps can be selected. The copy position has selection of auto center function in which the center of the copy image is aligned with the center of the paper in its default mode.

As described in other items, film projector is a mode in which copy is taken from various films and has selections such as 35 mm negative and 35 mm positive using a projector, 35 mm negative on the platen, slide of 6 cm by 6 cm, and slide of 4 in. by 4 in.

The "page programming" has selections such as cover in which the copy is attached a cover, insert in which white or color paper is inserted between copies, color mode in which the document can be copied on selected pages, paper in which tray is selected according to the selected pages of the document. This page programming is not displayed if ADF is not equipped.

In the "binding margin", the binding margin can be set in an increment of 1 mm in the range of 0–30 mm, and only one portion can be specified for one document. The size of binding is defined as a distance between the forward end of the paper and the leading edge of the image and is produced by shift operation using the line buffer of IPS in the main scanning direction and by shifting the scanning timing of IIT in the subscanning direction.

(d) Edit picture and tool picture

The edit picture includes four pass way i.e., marker edit, business edit, free hand edit, and creative edit.

The marker edit pass way and the free edit pass way have selections of various functions related to extracting, deleting, coloring (dots/lines/painted out), and color conversion and pass way tabs such as basic copy, added feature, and tools.

The business edit pass way has selections of various functions relating to extracting, deleting coloring (dots/lines/painted out), color conversion color paint, logo insertion, and binding margin and has pass way tabs such as basic copy, added feature, and tools as in the marker pass ways, etc.

The "creative edit pass way" has selection of various functions related to extracting, deletion, coloring (dots/lines/painted out), color conversion, color painting, logo insertion, binding margin, negative-positive inversion, mosaic synthesis, water mark synthesis, paint, mirror image, repeat, enlarged successive copy, partial movement, corner/center movement, manual/auto variable magnifying scale, manual/auto irregular magnifying scale, color mode, color balance adjustment, page successive copy, and color synthesis. The "creative edit pass way" further has pass way tabs such as basic copy, added feature, and tool as in the marker edit pass way, etc.

Tool pass way can be accessed by a key operator and a customer engineer by inputting a pass word or number. The tool pass way has selection of various functions relating to auditron, set up of machine initial values, default selection of the respective functions, registration of colors, registration of film types, fine adjustment of the registered colors, preset of various selection of the machine, setting of film projector scan area, audio tone (kinds of sounds, volume, etc.), timer set of paper delivery paths and other various types (autoclear, etc.), billing meter, setting of dual languages, diag mode, maximum adjustment, and formatting of the memory card.

Default selection is applied to color mode, paper selection, copy density, copy sharpness, copy contrast, paper tray for page programming, color of the single color, color and net color pallets for coloring, pattern of logo type, size of binding margin, and color balance.

(e) Other picture control

In the user interface, when jam occurs, a picture corresponding to the jam is displayed by monitoring execution condition of the copy at all times. In setting functions, information pictures for the picture presently being displayed are provided and are in condition for being displayed appropriately.

Display on a picture, except bit area, is of tile display of 3 mm wide (8 pixel), 6 mm high (16 pixel), and overall dimension is 80 tiles wide and 25 tiles high. The bit map area is displayed in a dimension of 151 pixel high and 216 pixel wide.

As described above, in the user interface according to the present invention, the display picture is grouped into the modes such as basic copy, added feature, and edit, etc. to be switched and the menu are displayed for selecting functions and setting execution conditions in each mode as well as the selections are specified to input execution conditions by touching the soft buttons. Some of the selections of the menu are displayed by pop up display (overdisplay and window display) to expand the display content. As a result, the display picture can be neatly organized even though there are a large number of functions and setting conditions to be set, thus improving operability of the copy machine.

(D) Hard control panel

Hard control panel is mounted at the right side of the color display at an angle with respect to the CRT screen so that it faces the center of the copy machine as FIG. 23. On the hard control panel are provided buttons including ten key, ten key clear, all-clear, stop, interrupt, start, information, auditron and language. The ten key button is used for setting the number of copy to be taken, inputting codes and data in the diag mode, and inputting a pass word when "tool" is in use and is invalid while a job is being processed or the job is being interrupted.

The all-clear button brings all of the copy modes that have been set back to the defaults thereof and also brings the picture back to the basic copy picture except when the tool picture is being opened. While interrupt job is being set, the copy mode returns to the default but the interrupt mode is not disabled.

The stop button is to halt the job at the end of a preceding copy but before the following copy during the copy job and is used to stop the machine after the paper is discharged. In the diag mode, the stop button is used to discontinue checking of input and output.

The interrupt button is for entering the interrupt mode while primary job is being executed but except the period during which the job is discontinued and for exiting the interrupt to the primary job while the interrupt job is being executed. When the button is operated while the primary job is being executed, the machine is caused to be in a reserved condition and the job is discontinued or terminated at the end of discharge of the preceding copy paper to enter the interrupt job.

The start button is for starting the job and for resuming the job after being interrupted. It is used to start input/output of code values and data values and to save code values and data values that are input. When the start button is scanned while the machine is being preheated, the machine starts automatically upon completion of the preheat.

The information button consists of an ON button and an OFF button and is ready for accepting operation thereof except while the copy is being carried out. The ON button enables display of an information picture corresponding to the picture currently being displayed while the OFF button causes the information picture to disappear.

The auditron button is operated to input the pass word or number when starting the job.

The language button is operated when selecting the language on the display picture. Accordingly, the respective display pictures have data in plurality of languages so as to be selected therefrom.

On the hard control panel are provided, in addition to the above described buttons, LED (light emitting diode) lamps appropriately for displaying the condition of operation of the buttons.

(II-5) Film picture reading device (A) General construction of film picture reading device As shown in FIG. 2, the film picture reading device consists of a film projector (F/P) 64 and a mirror unit (M/U) 65.

(A-1) Construction of F/P

Figure 30:
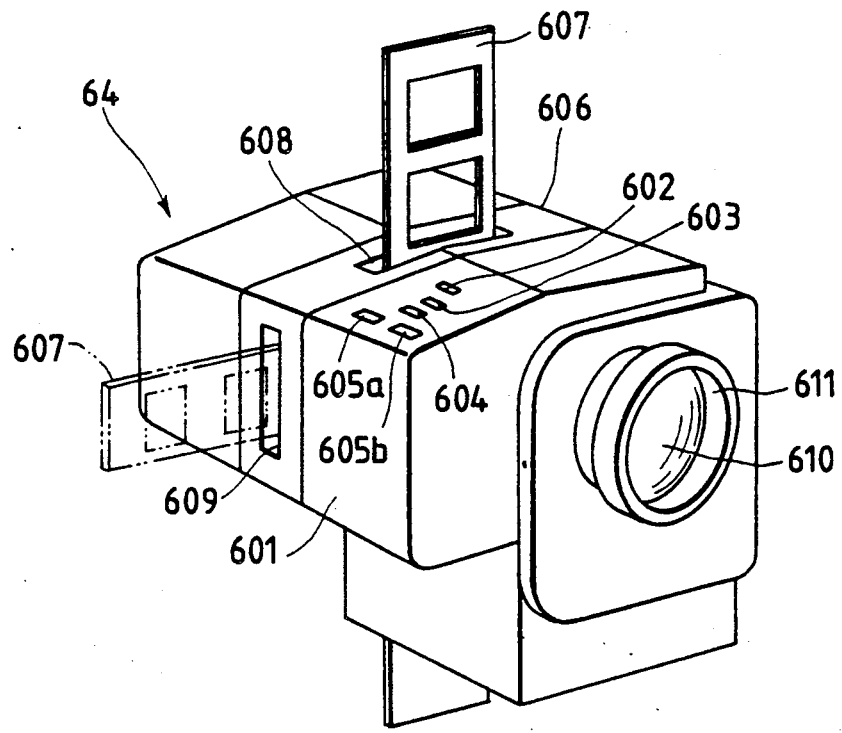
FIG. 30 is a perspective veiw of F/P.

As shown in FIG. 30, the F/P 64 is provided with a housing 601 which accommodates an operation confirmation lamp 602, a manual lamp switch 603, an autofocus/manual focus selector switch (AF/MF selector switch) 604, and manual focus operation switches (M/F operation switch) 605a, 605b. The housing 601 is also provided with an open/close portion 606 are provided holes 608, 609 of a size through which a film retaining case 607 for retaining a document film 633 can be inserted into the housing 601 in a vertical or horizontal direction in accordance with the manner in which the subject is photographed on a document film 633. There are provided aligned holes (not shown) through which the film retaining case 607 can project.

The open/close portion 606 is mounted to the housing 601 either rotatably by means of a hinge or detachably. By arranging the open/close portion 606 in such a way that they can be opened and closed, small foreign materials can be readily removed when the foreign materials come into the housing 601 through holes 608, 609.

The film retaining case 607 are available with a 35 mm negative film case and a 35 mm positive film case. Thus the F/P 64 is adapted to adjust itself to these films as well as a 6 cm by 6 cm or a 4 in. by 4 in. negative films. In which case the negative film is placed on the platen glass 31 for close contact between the M/U 65 and the platen glass 31.

Figure 33:
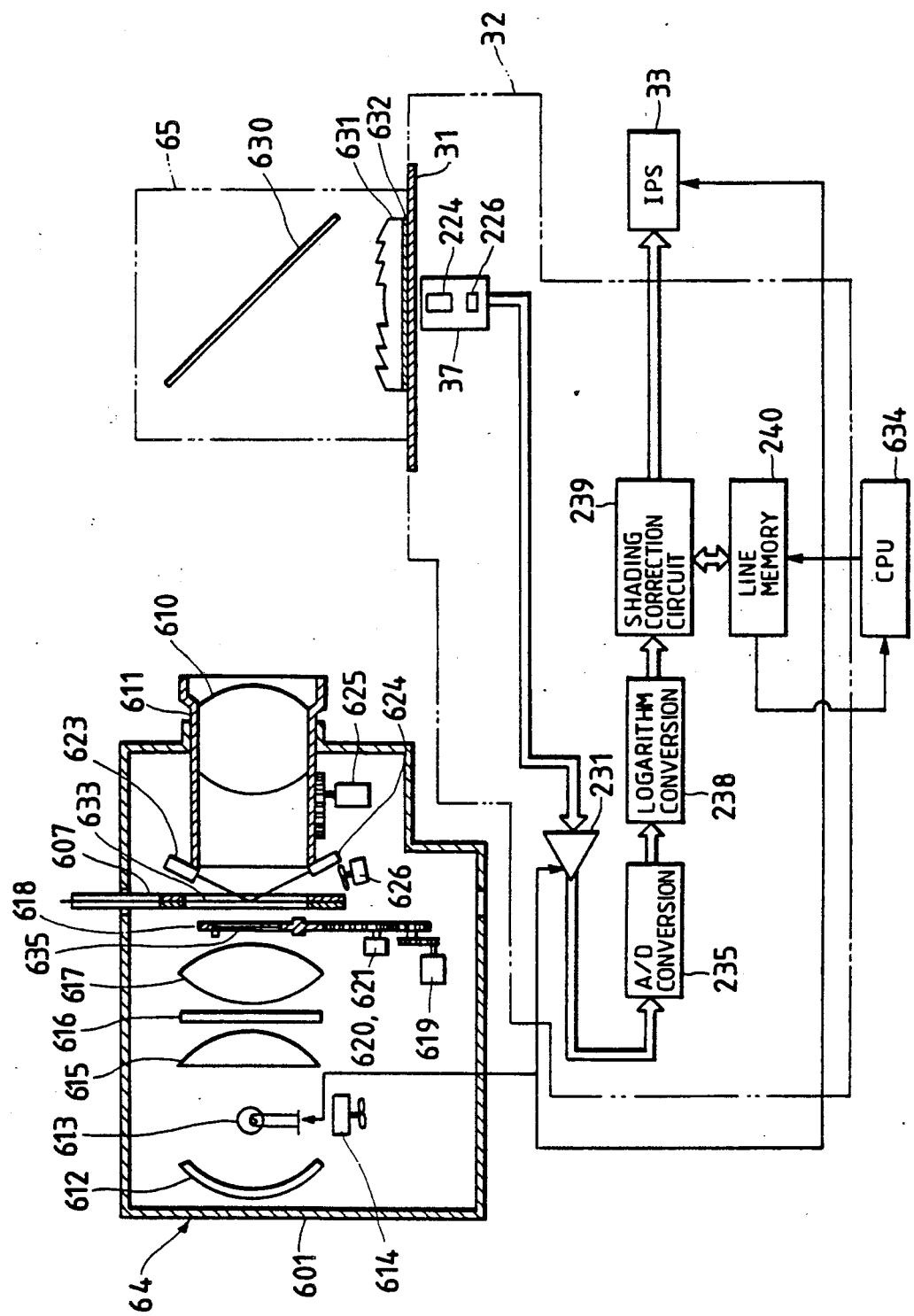
FIG. 33 illustrates a general arrangement of the F/P as well as the relationship between the F/P and M/U and IIT.

As shown in FIG. 33, on the right side of the housing 601 is supported slidably a projection lens retaining member 611 for retaining a projection lens 610.

Within the housing 601 is disposed a light source lamp 613 consisting of a reflector 612 and harogen lamp, etc. directly in line with the projection lens 610. In the proximity of the lamp 613 is provided a cooling fan 614 for cooling the lamp 613. On the right side of the lamp 613 are disposed a non-spherical lens 615 for converging the light from the lamp 613, a heat absorbing filter 616 for a shielding the lights of predetermined wavelengths and a convex lens 617, all being disposed on the same axis as the projection lens 610.

On the right side of the convex lens 617 is provided a correction filter automatic exchange device equipped with a correction filter retaining member 618 for retaining a filters 635 (FIG. 33 shows one of the correction filters) which adjusts film density of the 35 mm negative and positive films, a drive motor 619 which drives the correction filter retaining member 618, a first and a second position detecting sensors 620, 621 for detecting rotational position of the correction filter retaining member 618, and a control device (provided within F/P 64 but not shown) for controlling the drive motor 619. Of the correction filters 635 supported by correction filter retaining member 618, a correction filter 635 corresponding to the document film 633 is automatically selected and is aligned with the required position on the same axis with the respective lenses such as projection lens 610. The correction filter 635 can be positioned anywhere on the light axis of the projected light, for example between the platen glass 31 and the imaging unit 37.

Further, within the housing is provided an autofocus device which is equipped with a light emitting device 623 and a light receiving device 624 for auto focus sensor that are operatively connected to the projection lens retaining member 611, and a sliding drive motor 625 for causing the projection lens retaining member 611 to slide relative to the housing 601. When the film retaining case 607 is inserted into the housing 601 through the hole 608 or the hole 609, the film retaining case 607 takes up a position relative to the hosing 601 such that the document film 633 supported by the film retaining case 607 is positioned between the correction filter retaining member 618 and the light emitting device 623 as well as the light receiving device 624. A film cooling fan 626 for cooling the document film 633 is provided in the proximity where the document film 635 is set.

The power source for the F/P 64, separate from the power supply for the base machine 30, is housed in the base machine 30.

(A-2) Arrangement of M/U

Figure 31:
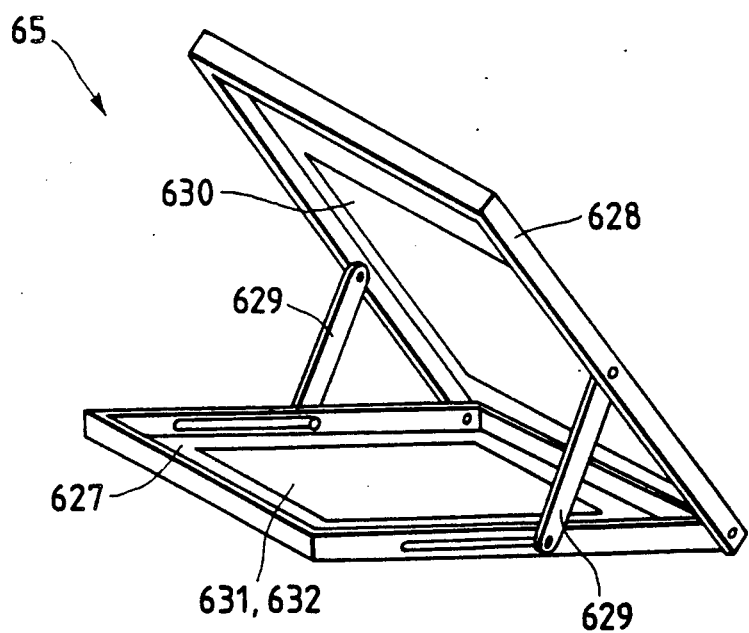
FIG. 31 is a perspective view of M/U.

As shown in FIG. 31, the mirror unit 65 is provided with a bottom board 627 and a cover 628 one end of which is rotatably mounted to the bottom board 627. Between the bottom board 627 and the cover 628 is pivotally connected a pair of supporting bars 629, 629 which supports the cover 628 so that the cover 628 is inclined by 45 degrees relative to the bottom board 627 when the cover 628 is fully opened.

On the rear plane of the cover 628 is provided a mirror 630. A large opening is formed at the bottom board 627 and a Fresnel lens 631 and a diffusion board 632 are provided to fill the opening.

As shown in FIG. 33, the Fresnel lens 631 and the diffusion board 632 are made of a sheet of acrylic board front surface of which is made into the Fresnel lens and the rear surface of which is formed into the diffusion board 632. The Fresnel lens 631 converts the light, which is reflected from the mirror 630 and is to diffuse, into a parallel light to thereby prevent the peripheral portion of the picture from becoming dark. The diffusion board 632 functions to diffuse little amount of the parallel light so that a line sensor 226 will not detect the shade of the SELFOC lens 224 within the imaging unit 37.

The mirror unit 65 is folded to be stored in place when color copy by the F/P 64 is not carried out. The unit 65 is opened and placed on the predetermined position of platen glass 31 of the base machine 30 when it is used.

(B) Major functions of film picture reading device

The film picture reading device is provided with the following functions.

(B-1) Automatic exchange function of correction filter

A harogen lamp conventionally used as a light source lamp 613 in the F/P 64 has spectral property that generally red (R) is dominant and blue (B) is less dominant, thus projecting the film with this lamp 613 causes the spectral property of the lamp 613 to affect the ratio of red (R), green (G), and blue (B) of the projected light. For this reason, correction of the spectral property is required when harogen lamp is to be used as a light source.

In the mean time, films for photographing pictures include a large number of types, not only negative and positive films but also some more types within the negative films or the positive films. These films differs in the spectral property. For example, a negative film is in orange in which transmittance of R is high while that of B is low. Thus it is necessary to correct the spectral property of the negative films in such a way that the amount of light in B is increased.

The F/P 64 provides correction filters for correcting the described spectral property and is adapted to automatically exchange these correction filters. The correction filters are exchanged with the aid of the correction filter automatic exchange device. In other words, when a microprocessor (CPU) in the system (SYS) outputs a 2-bit instruction signal indicative that a correction filter corresponding to the document 33 is to be set, a control device drives and controls a drive motor 619 so that a 2-bit signal from the first and second position detection sensors 620, 621 become coincident with the signal from the CPU. When the signal from the sensors 620, 621 become coincident with the signal from the CPU, the control device causes the motor 619 to stop. When the motor 619 is stopped, the correction filter corresponding to the document is automatically set in the required position.

Therefore the correction filter can be exchanged easily and correctly.

(B-2) Sensing function of insertion direction of document film

The document film 633 may be inserted through either of the insertion holes 608, 609 formed at the open/close portion 606, in other words, the document film 633 may be attached either in the vertical direction or in the horizontal direction depending on the manner in which the subject is photographed. In which case a film sensing switch is provided at least one of the holes 608, 609. If the film sensing switch is provided at the hole 608 but not at the hole 609, the switch senses the film to become ON to provide a sensing signal when the film retaining case 607 is inserted through the hole 608. While the sensing signal is present, required area of the line sensor 226 is set in such a way that a longitudinal or subscanning direction is the longitudinal direction of the projected image. When the film retaining case 607 is inserted through the hole 609, the same switch remains OFF, thus the switch will not provide a sensing signal. If there is not sensing signal the required area of the line sensor 226 is set in such a way that the main scanning direction is the longitudinal direction of the projected image.

On the other hand, if the film sensing switch is provided only at the hole 609 or the film switch is provided both at the hole 608 and at the hole 609, the film sensing switch provides the ON or OFF signals so as to set the required area of the line sensor 226 in such a way that subscanning direction is the longitudinal direction of the projected image when the film case 607 is inserted through the hole 608 and in such a way that the main scanning direction is the longitudinal direction of the projected image when the film retaining case 607 is inserted through the hole 609.

(B-3) Autofocus functions (AF function)

The mounting position of the document 633 is required to be within a tolerance of one tenth of a millimeter when the film retaining case 607 is loaded to the F/P 64.

Therefore, after the document film 633 is loaded, focusing is required. If the focusing 633 must be projected on the diffusion board 632 of the M/U 65 which is set in place on the platen glass 31 and thereafter the projection lens retaining member 611 must be slided while watching the projected picture. In which case, it is extremely difficult to watch the picture projected on the diffusion board 632, causing inaccurate focusing.

Thus the F/P 64 is adapted to automatically focus when the document film 633 is loaded to the F/P 64.

The AF function is effected by the previously described AF device as follows.

By operating the keys on the display of the U/I 36 to set the F/P mode, the light emitting device 623 emits a light, and by shifting the AF/MF selector switch 604 to "AF", the AF device becomes ready to operate. As shown in FIG. 33, when the film case 607 in which the document film 633 is supported is inserted into the F/P 64, the light from the light emitting device 623 is reflected by the document film 633. The reflected light is then detected by, for example, the light receiving device of a two-element type for AF.

Then the two elements of the light receiving device 624 provide to the CPU 634 signals in accordance with the amount of the reflected light. The CPU 634 calculates the difference between the two signals to provide an output signal if the calculation is not zero, thus driving the motor 625 in a direction such that the difference between the two signals becomes smaller. This causes the projection lens retaining member 611 to slide and both the light emitting device 623 and the light receiving device 624 moves in interlocking relation with the member 611. When the difference between the signals from the two elements becomes zero, the CPU 634 causes the motor 625 to stop. The focusing completes when the motor 625 stops.

In this manner, AF operation is effected. This eliminates manual focusing each time a film case containing a document film is loaded into the F/P 64, saving labor and preventing copy failure caused by inaccurate focusing.

(B-4) Manual focus function (MF function)

By shifting the AF/MF selector switch 604 to "MF", the lamp 613 can be automatically out on for a predetermined time interval, allowing focusing manually. Operation in MF is carried out by pressing operation switches 605a, 605b while watching the picture of the document film projected on the diffusion board 632 of the mirror unit 65. The MF allows to focus on a particular portion of the film picture.

(B-5) Function of manually lighting up of light source lamp

The lamp 613 can be lighted up unconditionally by pressing a manual lamp switch 603. Normally, the switch 603 is not operated except when back-lighting in copying the picture stored on a relatively thick film material, when watching the projected image for a long time in the AF mode, and when checking if the lamp is cut off.

(B-6) Function of automatic change of scaling factors and function of automatic change of scan area By setting the paper size through the U/I 36, the scaling factor can be automatically set. Also by selecting types of the document film through the U/I 36, the copy area may be automatically selected in accordance with that film type.

(B-7) Automatic shading correction function

Within the ROM of the CPU 634 are stored each density data of range mask of ASA 100 of FUJI (registered trade mark), KODAK (registered trade mark), and KONICA (registered trade mark) which are negative films often used in general photographing. When these films are selected, the CPU 634 automatically performs shading correction on the basis of the density data stored in the ROM. In which case, the base films of these films are not required to be loaded, thus not only eliminating the procedure or labor for loading the base films but also preventing loading a wrong base film by mistake and yet eliminating supervision of the base films.

In addition to these three types of films, the density data of orange mask of one more film type can be registered. This data is stored into a RAM within the system of the copy machine. Automatic shading correction is also applied to this additional registered film as in the previous three types of films.

(B-8) Automatic picture quality adjustment function

Corrections such as Γ correction are performed on the basis of various conditions including the density characteristic of the document and exposure condition when exposing the films, thereby automatically adjusting the density and the color balance.

(C) Picture signal processing (C-1) Necessity of correction of picture signal and principle of correction of the picture signal The density range of a film is generally wider than that of a document. The density range of the film type depends on its type. For some types of films, the positive film differs in density range from the negative film of the same film. Furthermore, the density range of the film is dictated by photographing conditions such as the amount of light to which the film is exposed, density or brightness of a subject when photographing. In fact, the density of the subject widely varies in the density range of a film.

Thus if a picture stored in such a film is to be copied by a copy machine in which the document is copied through a reflected light, processing signals in the same way for all different levels of density will not give good repeatability.

In the invention, the signal indicative of a picture is appropriately corrected so that the density of a major subject is reasonable, thereby obtaining good repeatability.

Figure 32:
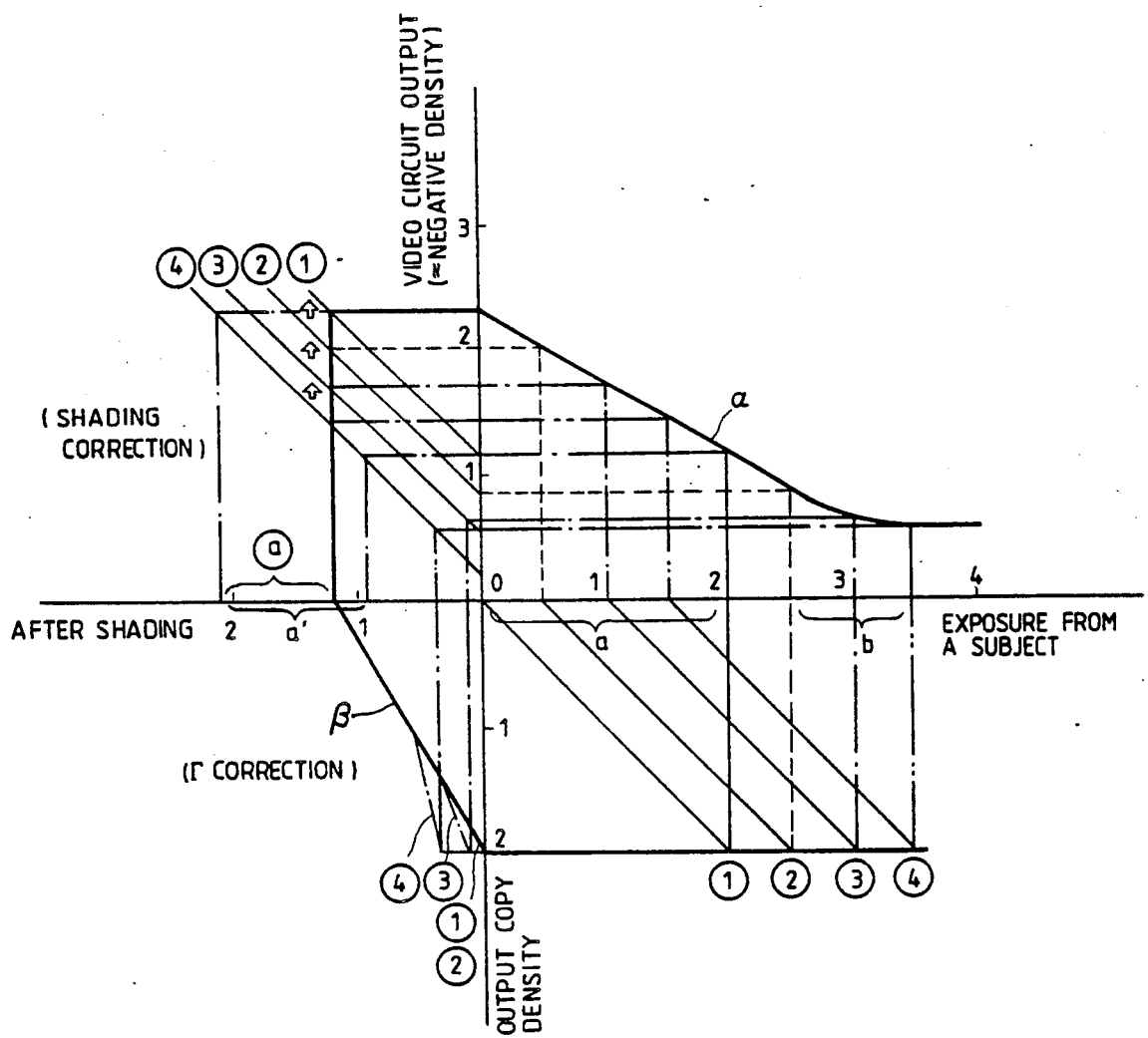
FIG. 32 is a diagram for illustrating the density characteristic and principle of correcting a negative film.

FIG. 32 illustrates the principle of density characteristic and the density correction of a given negative film.

In FIG. 32, abscisa indicates the exposure of a subject on the right side half thereof (corresponds to the density of the subject) and the density after shading correction on the left half side thereof. While ordinate represents a video circuit output (substantially equal to the density of the negative film) on the upper half side thereof and output copy density on lower half side thereof. That is, the first quadrant shows the density characteristic of the given negative film, the second quadrant shading correction, the third quadrant correction, and the fourth quadrant the relationship between the exposure amount from the subject and output copy density, respectively.

The density characteristic of the given negative film is depicted by a line $\alpha$ in FIG. 32, the first quadrant. When the exposure from the subject is much, the density of the negative film is high and increasingly lower in a linear fashion with decreasing exposure from the subject. When the exposure is below a certain level, linear relationship between the exposure from the subject and the density of the negative film is lost. In the case where the exposure is little, if the picture stored in the film is a man's bust then it is difficult to obtain reasonable contrast between his face and hair. In the case where the exposure is much, slope of the line $\alpha$, i.e., the value of Γ is less than 1 thus the resultant copy is of soft contrast unless Γ correction is applied. For this reason, correction is required.

The principle of correction will be described with reference to FIG. 32. There is shown an END curve $\beta$ for Γ correction. The slope Γ' of the END curve $\beta$ is set to Γ=1/Γ so that the exposure from the subject is linearly related to the output copy density by a straight line having a slope of 45 degrees in the fourth quadrant.

For example, in a region a where the exposure from the subject is relatively much, assuming that density adjustment value which is set in a register in the shading correction circuit is of a value represented by a straight line (4) in the second quadrant, the density after shading correction is shown in a region a'. The region a' will be out of conversion range of the END curve $\beta$ and the copy result of this region will be merely in white. Thus density adjustment value is shifted from the line (4) to a line (1) in the second quadrant so that the density after shading is within the conversion range of the END curve $\beta$. By arranging this way, the relation between exposure from the subject and the output copy density will follow a straight line (1) having a slope of 45 degrees in the fourth quadrant, thereby the copy having the density of degradation.

In the region b where exposure from the subject is relatively little, linear relation between the exposure from the subject and the density of the negative film will be lost. In which case, the density adjustment value of the shading correction circuit is set to a value on the curve (4) in the second quadrant. Thereafter the END curve $\beta$ represented by the line (4) in the third quadrant is chosen. By choosing the END curve $\beta$, the relation between the exposure from the subject and the output copy density will be represented by a straight line having a slope of 45 degrees in the fourth quadrant. That is, when the exposure from the subject is in a region b, for example, if the subject is a person having black hair and putting on a brown hat, a problem that the hat and the hair will be of the same density is overcome, thus obtaining a clear contrast between the hair and the hat. In this manner, the density of the subject can be corrected to a reasonable value.

(C-2) Method of picture signal processing

As shown in FIG. 33, the line sensor 226 reads as an analog quantity the projected light of the picture of the document film 633 in terms of the amount of light of R, G, B, respectively and the picture signal represented by the amount of light is amplified to a required level by an amplifier 231. The amplified signal is then converted into a digital signal by an A/D converter 235 and is then further converted by the log converter 238 from a light-amount signal to a density signal.

The picture signal represented in terms of the density is subjected to a shading correction by the shading correction circuit 239. By the shading correction, adverse effects due to change with time and variation of the amount of light of SELFOC lens 224, variation in sensitivity of each picture element of the line sensor 226, variation in the amount of light, and spectral property of the correction filter and the lamp 613, can be eliminated.

Prior to the shading correction, when a document film type is selected from the previously described three types and a registered type, the correction filter for the positive film is set. Thereafter, without the document film 633 being loaded, the line sensor 226 reads the light signal emitted from the lamp 613. The output of the line sensor 226 is amplified by the amplifier 231 and is then converted into a digital signal which in turn is converted by the A/D converter 235 into a density signal. Thereafter a data obtained on the basis of thus produced digital signal is stored into the line memory 240. That is, the imaging unit 37 is caused to line-step scan each of picture elements R, G, B to sample and sampling data thus obtained is supplied via the line memory 240 to the CPU 634, which calculates the average density value of the sampling data for 32 lines to produce the shading data. By taking average in this manner, individual error of each element is eliminated.

Then a document film is loaded to read the picture form the document film. The CPU 364 calculates a new density adjustment $D_{ADJ}$ from the density data of the negative film stored in the ROM to update the $D_{ADJ}$ which has been set in the register in an LSI in the shading correction circuit 239. Further CPU 634 adjusts the amount of light of the lamp 613 and the gain of the amplifier 643 in accordance with the selected film type. The shading correction circuit 239 adds the $D_{ADJ}$ to the data actually read from the document film, thereby causing the density value that has been read to shift. Further, the shading correction circuit 239 substracts shading data for the respective picture elements from the data thus adjusted to thereby perform shading.

If the film is not of a type stored in neither the DOM of the CPU 634 nor the RAM of the system, it is necessary to load a base film to obtain the density data of that film from which a $D_{ADJ}$ value is to be calculated.

When the shading correction is completed, IIT 32 supplies the density signal of R, G, B to the IPS 33.

Thereafter the CPU 634 selects the END curve on the basis of the actual data of the document film and outputs a correction signal so that the signal is subjected to $\Gamma$ correction on the basis of the selected curve. Using this correction signal, the IPS 33 performs $\Gamma$ correction for the signal, thus correction poor contrast due to non-linearity and the fact that the $\Gamma$ of the document film is not unity.

(D) Operation procedure and timing of signal

Figure 34:
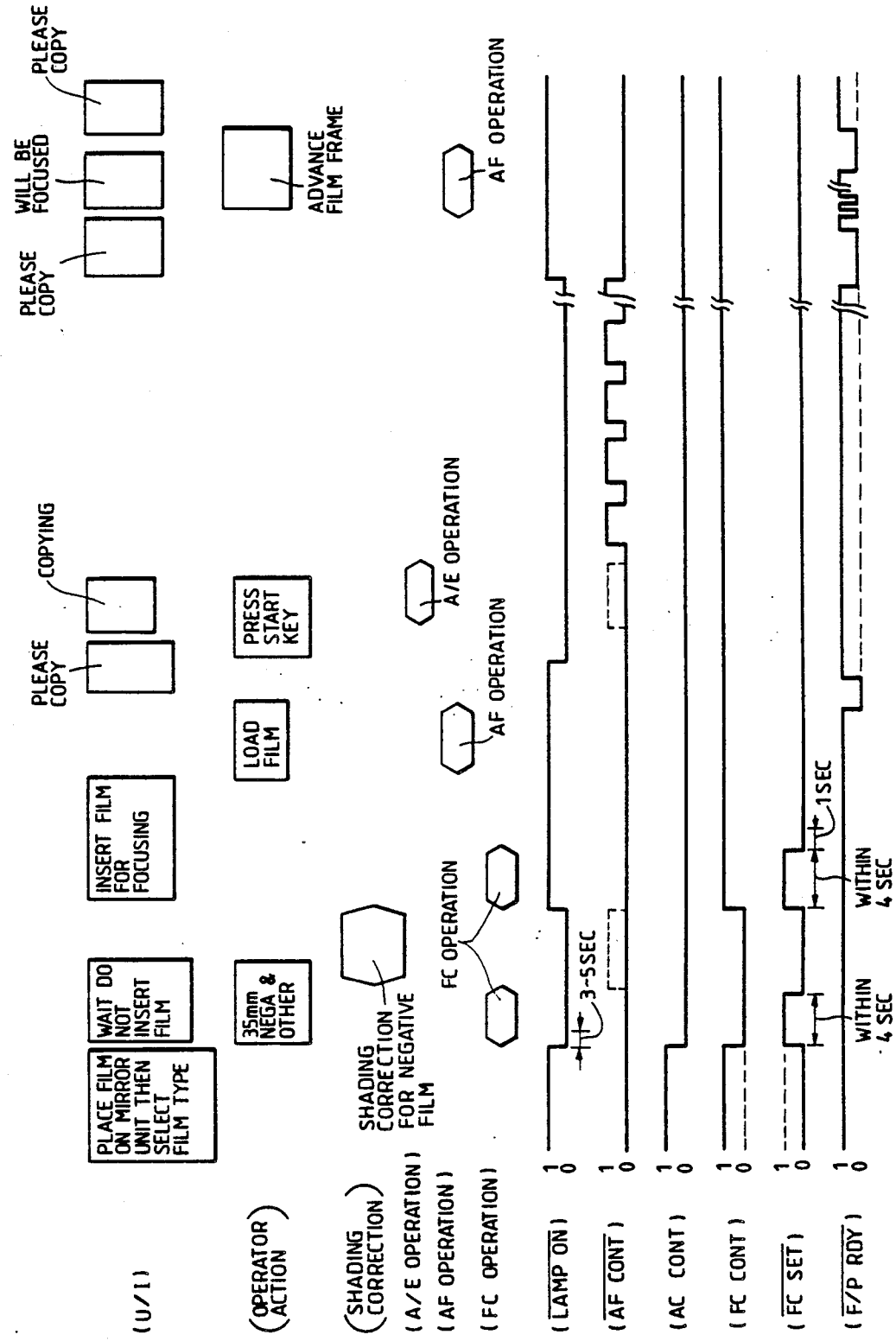
FIG. 34 is a diagram for illustrating operation procedure and timing.

Referring to FIG. 34, the operating procedure and the timing of signal will be described. Signals depicted by dotted lines may also be used.

The F/P 64 is mainly operated by means of the U/I 36 of the base machine 30. That is, the base machine 30 is switched to the F/P mode by operating the F/P operating key displayed on the display picture of the U/I 36. Assuming that the document film is one of the three types of films and the registered film type, the display of the U/I 36 displays "PLEASE PLACE MIRROR UNIT BEFORE SELECTING FILM TYPE". Thus the M/U 65 is first opened to position the platen glass 31 in place.

Then upon pressing a film selecting key on the picture, the picture displays "PLEASE DO NOT INSERT FILM BUT WAIT". At the same time, the lamp 613 lights up and also a correction filter control (FC CONT) becomes (0,0) to activate the FC operation. That is, the correction filter automatic exchange device operates to set the positive film correction filter in the use position. When the correction filter is set, a correction filter exchange completion signal (FC SET) turns to be LOW.

This LOW level together with time elapse of 3-5 seconds after the lamp 613 becomes ON triggers gathering of the shading data for shading correction. Upon completion of the gathering of the shading data the FC CONT becomes (0,1) to cause the correction filter automatic exchange device to operate, thus positioning the film correction filter in the use position. In response to the shading correction, the picture displays "PLEASE INSERT FILM FOR FOCUSING" while at the same time the lamp 613 lights out. Then the operator insert the film case 607, in which the document film 613 is mounted, into the F/P 64. The light form the light emitting device 623 is reflected from this film and the reflected light is detected by the light receiving device 624.

When the difference between the light reflected and the amount of light received by the two elements of the light receiving device 624 is not zero, a motor 625 for the A/F device runs for focusing. That is, the AF operation is effected. Upon completion of focusing, an F/P operation preparation completion signal (F/P RDY) becomes LOW. After the (F/P RDY) signal turns to LOW and one second after the FC SET becomes LOW, the picture displays "PLEASE COPY". Press of the start key of the U/I 36 causes the picture to 4 display "COPYING" while at the same time the lamp 613 lights up as well as the data gathering for automatic density adjustment is initiated (A/E) after time elapse for the lamp to rise up. That is, the imaging unit carries out one scan cycle to obtain the data for density adjustment, color balance adjustment, and $\Gamma$ correction, etc., thereby reading part of or the entire projected image.

In full color copy, the imaging unit carries out four scan cycles to perform a complete copy operation. In which case the shading correction and the density adjustment is automatically carried out on the basis of the shading data and the automatic density adjustment data. When the copy operation is completed, the lamp 613 lights out and the picture displays "PLEASE COPY". Thus pressing the start key again allows a new copy operation. If other pictures are to be copied, the film frame is simply advanced. When advancing the film frame, F/P RDY becomes HIGH while at the same time the picture displays "WILL BE FOCUSED". When the new film frame has been set, AF operation is effected while at the same time the F/P RDY becomes LOW as well as the picture displays "PLEASE COPY". Thereafter pressing the start key initiates the copy operation.

(III) Image processing system (IPS)

(III-1) Arrangement of module of IPS

Figure 35:
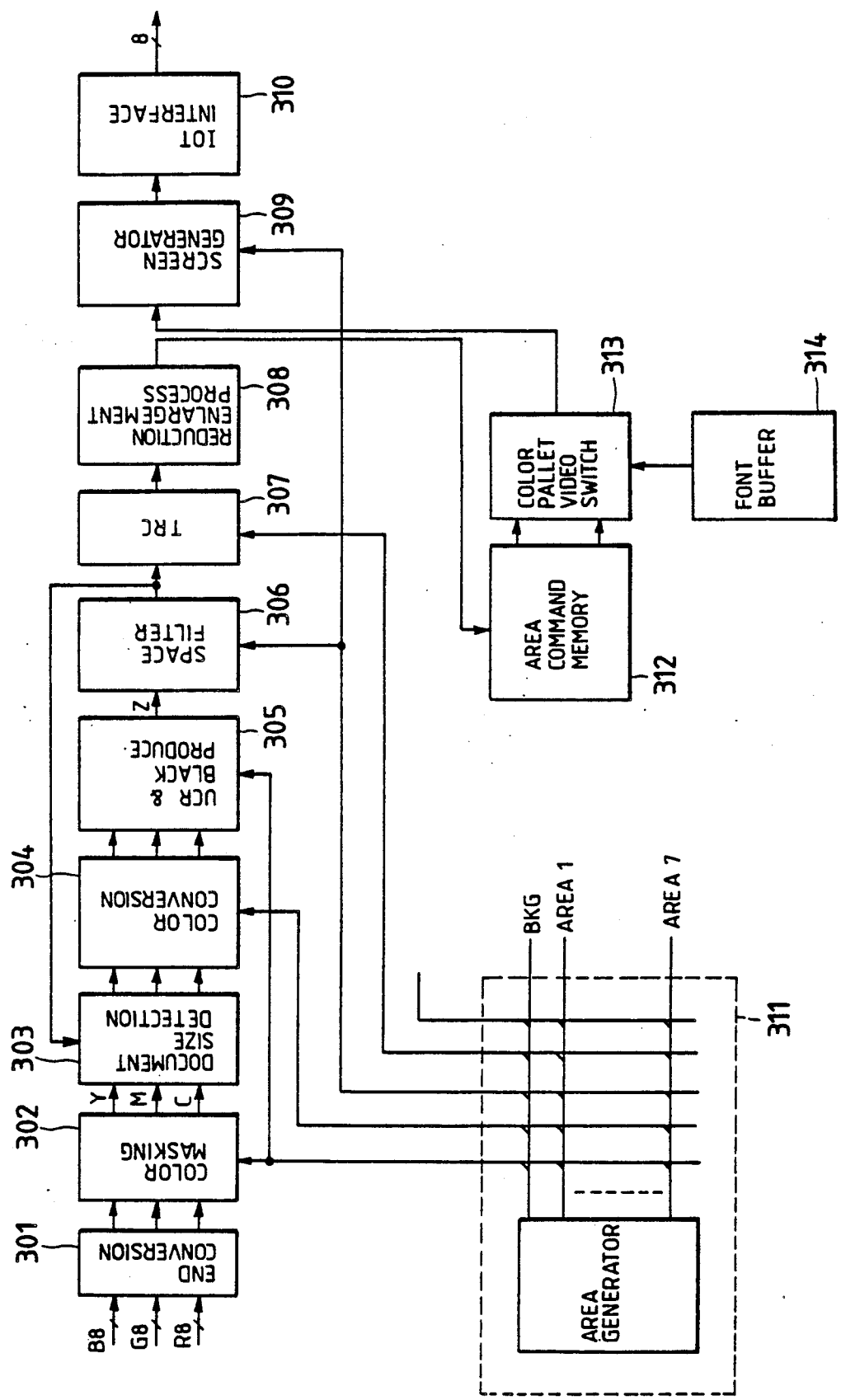
FIG. 35 is a general arrangement of the module of IPS.

FIG. 35 illustrates outline of a module arrangement of IPS.

In the color picture forming device, the color document is read at IIT (image inputting terminal) in its components B (blue), G (green), and R (red) of primary colors of light by using the CCD line sensors; the outputs of the CCD line sensors are then converted into the primary colors of the toner Y (yellow), M (magenta), C (cyanogen), and also K (black); and IOT (image outputting) terminal) exposes using laser beam and develops to produce the color picture. In this case, the color document is resolved into the toner components of Y, M, C, and K to carry out one copy process of Y, and similarly M, C, and K, four processes in total. Therefore, in the case where the color-separation signals (B, G, R signals) are converted into the toner signals (Y, M, C, K signals), problems involved are how color balance of a particular color is to be adjusted, how that color is to be reproduced in accordance with IIT reading characteristic and IOT output characteristic, how balance of the density and contrast should be adjusted, and how emphasis of edge, fuzzy edge, Moire are to be adjusted.

IPS is a process in which the color signals of B, G, R from IIT are subjected to various data processing to enhance reproducibility of colors, reproducibility of degradation, and reproducibility of definition and then the toner signals of the development process colors are converted into ON/OFF signals to output to IOT. As shown in FIG. 35, IPS is made up of END conversion (Equivalent Neutral Density) module 301, a color masking module 302, a document size detection module 303, a color conversion module 304, UCR (Under Control Removal) & black producing module 305, a space filter 306, TRC (Tone Reproduction Control) module 307, a reduction/enlargement processing module 308, a screen generator 309, an IOT interface module 310, a region picture control module 311 having a region producing circuit and a switch matrix, an edit control module primarily having an area command memory 312, a color pallet video switch circuit 313 and a font buffer 314.

The color signals of B, G, R, each of which is of 8-bit data (degradation of 256 levels), from IIT are inputted to the END conversion module 301 to be converted into the toner signals of Y, M, C, and K. Then a toner signal X of the process color is selected to convert into binary signals, as on ON/OFF signal of the toner signal of the process color, which are outputted from the IOT interface module 310 to IOT. Thus in full color (four colors), after document size, edit region, and other document information are detected through prescan, signal processing is carried out in accordance with the four document reading scans every time each of four copy cycles is carried out using the toner signals X indicative of process colors of Y, M, and so on.

In IIT, the CCD sensor is used for each of B, G, R to read each pixel in a size of 16 dots/mm and outputs the data thereof in 24 bits (three color times 8 bit; degradation of 256 levels). The CCD sensors are attached filters of B, G, and R thereon and have a length of 300 mm with a density of 16 dots/mm. The CCD sensors scan 16 lines/mm at a speed of 190.5 mm/sec to read the data, which is outputted at nearly 15 Mega pixel per second for each color. In IIT, by logarithmic conversion of analog data of the picture elements of B, G, R, the information indicative of reflective index is converted into the density data, then into the digital data.

The respective modules will how now be described as follows.

FIG. 36 is a diagram for illustrating the respective modules that constitute IPS.

(A) END conversion module

Figure 36A:
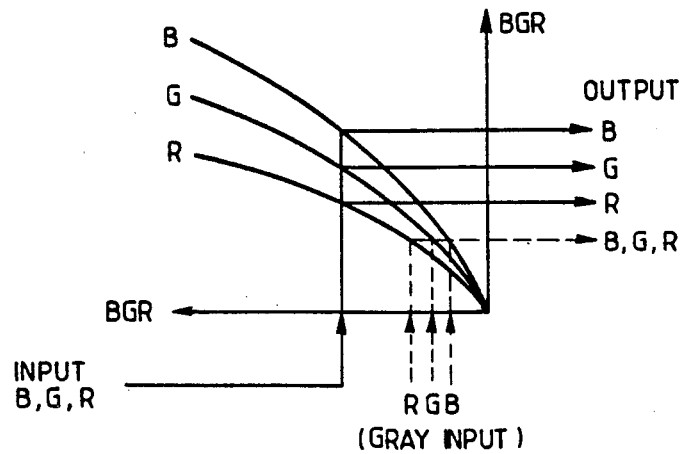
FIGS. 36(a)-(j) are diagrams for showing the respective modules that form the IPS.
Figure 36B:
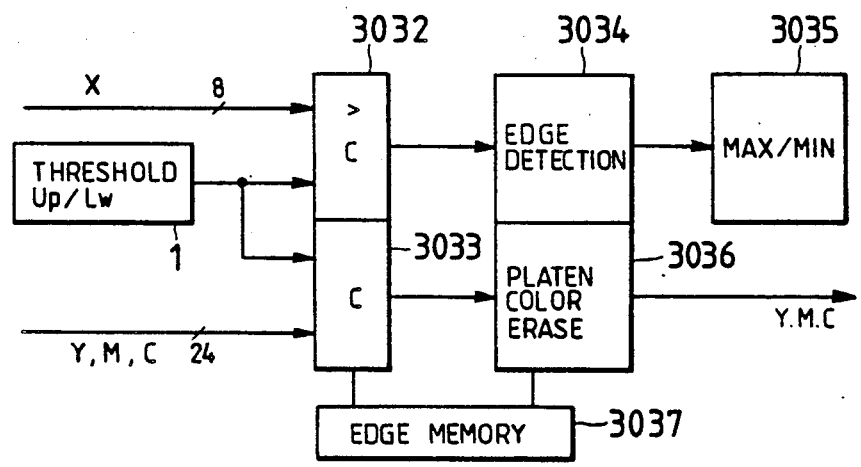

END conversion module 301 is a module for conditioning (converting) an optical readout signal of the color document obtained from the IIT into a color signal which is gray balanced. The respective toners for a color picture are of an equal amount if the color picture is gray which is a reference. However, the color-separation signals of B, G, R that are input when the gray document is read in from IIT are not of equal value due to non-ideal spectral property of the light source and the color separation filter. Thus END conversion is for balancing out the variation of color-separation signals using a look up table (LUT) as shown in FIG. 36a. Thus the look up table is for providing color-separation signals of B, G, R of the equal degradation in accordance with the level (black to white) of the gray document when the gray document is read in. The characteristic of the look up table depends on that of IIT. Sixteen different look up tables are provided, of which 11 tables are for the film projector that can also take negative film, three tables are for ordinary copy, photographs, and generation copy.

B) Color masking module

The color masking module 302 is for converting signals corresponding to the amount of the toners Y, M, and C by performing matrix operation of B, G, R signals, and processes signals which have been subjected to gray balance adjustment through the END conversion.

While 3 by 3 matrix in which Y, M, C are produced only from B, G, R is used for matrix conversion in color masking, various matrices may be used for adding components of BG, GR, RB, $B^2$, $G^2$, and $R^2$. The conversion matrix in the invention includes two sets, one for the ordinary color adjustment and the other for producing strength signals in the monocolor mode.

In this manner, the video signals from IIT are first subjected to gray balance before they are processed by IPS. If the gray balance is to be effected after color masking, then the look up table will be more complex since the gray balance has to be effected by a gray document which takes characteristic of the color masking into consideration.

(C) Document size detection module

Need often arises to copy not only documents of regular sizes but also other documents of other arbitrary shapes as well as scrap-and-joined documents. In which case, it is necessary to detect the size of the document in order to select an appropriate size of paper for the document. If the copy paper is of a larger size than the documents, erasing the outer area of the document yields copy result of a preferable quality. For this reason, the document size detection module 303 detects the document size when scanning and carries out the process of erasing (frame erasure) of the platen color. Thus the platen color is of a color that can be easily distinguished from the document, for example, black and the upper and lower limits in distinguishing the platen color are set to a threshold register 3031.

When scanning, a signal X (the output of a later described space filter 306), which has been converted (Γ conversion) into information close to the reflective index of the document is compared by a comparator 3032 with the upper and lower limits which have been set to the threshold register 3031, and the edge of the document is detected by an edge detection circuit 3034 to store the maximum and minimum values of coordinates x and y into a max/min sorter 3035.

Figure 36C:
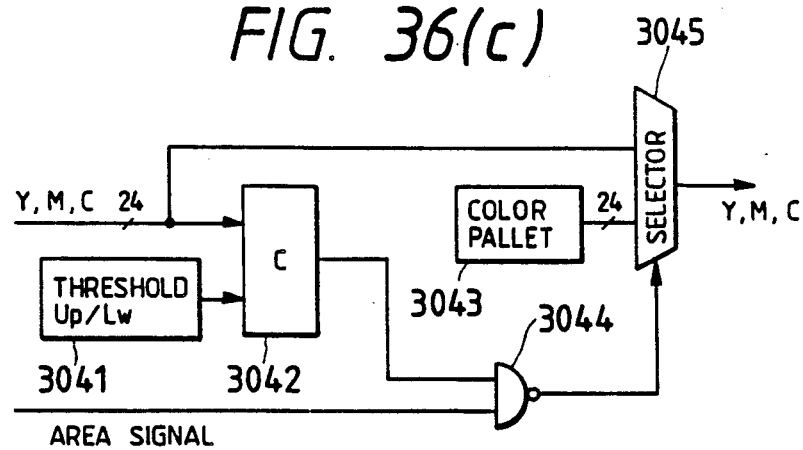
Figure 36D:
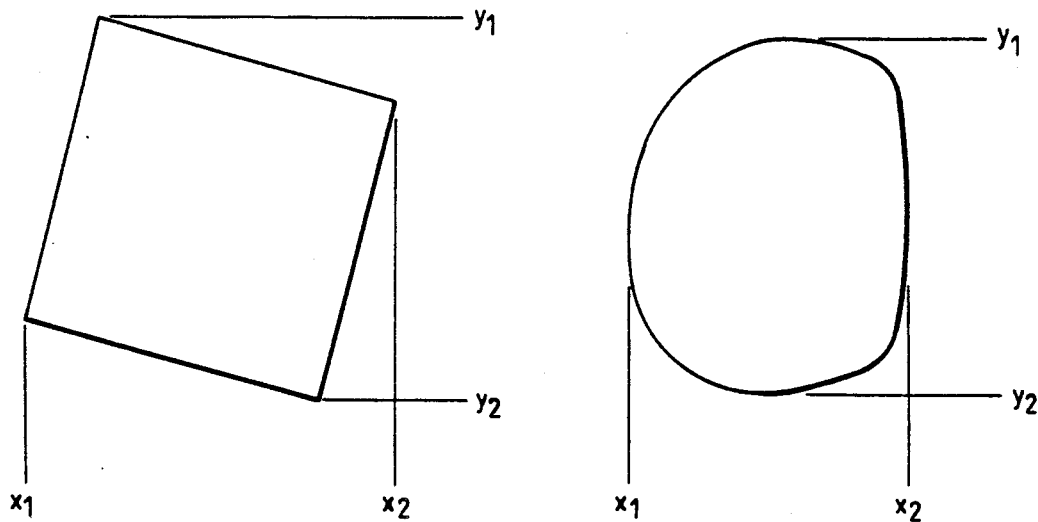

For example, in the case where the document is tilted or is not rectangular as shown in FIG. 36d, the maximum and minimum values (x1, x2, y1, y2) of top and bottom and left and right are detected and stored. When scanning to read data, the comparator 3033 compares Y, M, C of the document with the upper/lower limits that have been set to the threshold register 3031 and the platen color erasing circuit 3036 erases the outer area of the edge, i.e. the signal that has been read by the platen, thereby effecting frame erasure process.

(D) The color conversion module 305 causes the colors specified in a particular region to be converted and is primarily provided with a window comparator 3052, a threshold register 3051, color pallets 3053, as shown in FIG. 36c. In color conversion, the color module 305 sets the upper/lower limits of the respective Y, M, C of the colors to be converted to the threshold register 3051 as well as the values of the respective Y, M, C of colors to the color pallet 3053.

The module 305 then controls a NAND gate 3054 in accordance with the area signal which is inputted from the region image control module, and if it is not color conversion area, then Y, M, C of the document are directly output from a selector 3055; when the color conversion area is entered, if Y, M, C signals of the document falls between the upper and lower limits of Y, M, C that have been set in the threshold register 3051, then the output of the window comparator 3052 shifts the selector 3055 to send out Y, M, C of the colors that have been set to the color pallet 3053.

By directly pointing the document with a digitizer, when prescanning the 25 picture elements of each of B, G, R in the proximity of the coordinate specified are averaged out to identify the specified color. Through this averaging operation, a document of 150 lines can be identified to an accuracy of color difference of 5. The B, G, R density data are read out from the IIT shading correction RAM by converting the specified coordinate into an address, where address conversion requires re-adjustment of registration as in detection of the document size. When prescanning, IIT operates in the sample scan mode. The B, G, R density data which are read out from the shading correction RAM are subjected to the shading correction through the software; are then averaged out; and further are subjected to the END correction and color masking before the density data are set to the window comparator 3052.

Up to eight colors of 16700 thousands colors can be registered as registered colors to the color pallet 3053 while 14 colors from Y, M, C, G, B, R intermediate colors of Y, M, C, G, B, R, and K, W are provided as standard colors.

(E) UCR & black producing module

An equal amount of Y, M, C makes gray, thus Y, M, C of an equal amount may be replaced by black in theory, but black color causes muddiness of color in practice, leading to poor reproducibility of color. Thus in order to prevent muddiness of color, the UCR & black producing module 305 produces a proper amount of K and reduces (under color removal) Y, M, and C by an equal amount, respectively in accordance with the amount of K. Specifically, the maximum and minimum values of Y, M, C are detected and K of an amount less than the minimum amount is produced through the look up table in accordance with the difference between the maximum and minimum values, thereby effecting the under color removal for Y, M, C in accordance with the amount of K.

Figure 36E:
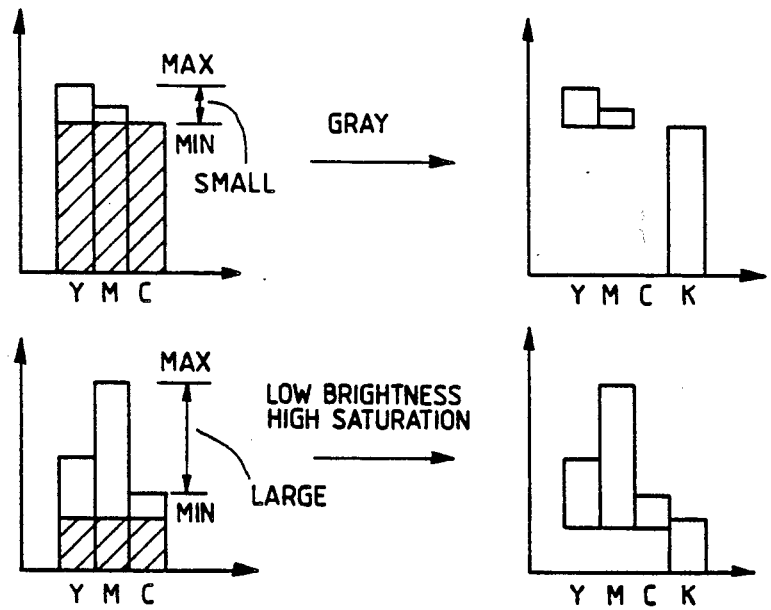

As shown in FIG. 36e, for example, if colors are closer to gray, then the maximum and minimum values are of little difference. Thus in UCR & black production, Y, M, C are reduced by an amount equal to the minimum values thereof and K is produced but if the difference is large, then the amount of removal is less than the minimum value of Y, M, C and accordingly the amount of K is reduced to prevent intermixing of black and lowered saturation of low brightness value/high saturation colors.

Figure 36F:
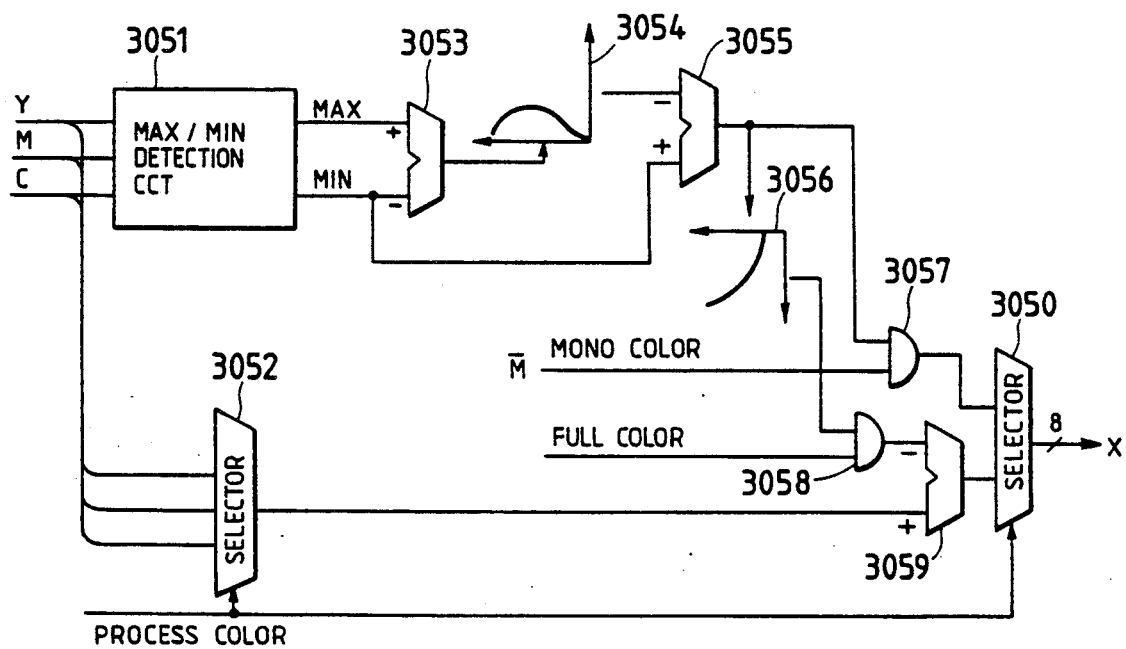

FIG. 36f shows a specific circuit arrangement in which the maximum/minimum value detecting circuit 3051 detects the maximum and minimum values of Y, M, C and the operational circuit 3053 calculates the difference between the two and then the look up table 3054 and the operational circuit 3055 produces K. The look up table 3054 adjusts the value of K. If the maximum and minimum values are of little difference, the output of the look up table 3054 becomes zero; therefore operational circuit 3055 provides the minimum value as a value of K. If the difference between the maximum and minimum values is large, the output of the look up table 3054 is not zero; therefore the operational circuit 3055 outputs a value obtained by subtracting the non-zero output from the minimum value through the operational circuit 3055 as a value of K. The look up table 3056 is a table for finding a value to be removed from Y, M, C in accordance with K. Using the table 3056, the operational circuit 3059 reduces Y, M, C by an amount corresponding to K. AND gates 3057, 3058 are for gating signals which have been subjected to the under color removal of Y, M, C and K signals in response to either the monocolor mode signal or four full color mode signal, whereas the selectors 3052, 3050, are for selecting any one of Y, M, C, K in response to the process color signal. In this manner, the colors are actually reproduced in dots of Y, M, C, K; therefore the amount of removal of Y, M, C and production ratio of K are determined by using experimentally determined curves or tables.

(F) Space filter module

In a copy machine to which the present invention is applied, since IIT reads the document while scanning the CCD as previously described, direct use of the information thus obtained causes a blur image. Since the documents are reproduced in dots, thus Moire may be developed between the dot period of the printed materials and the dot period of sampling rate of 16 dot/mm. Also, the Moire may be developed between the dot period of the document and the dot period of the apparatus. The space filter module 306 is provided with a function for recoverying such a blur and a function of eliminating the Moire. A low pass filter is employed for cutting the dots components in removing Moire while a high pass filter is employed for edge emphasis.

In the space filter module 306, the selector 3003 cuts away one color out of the input signals of Y, M, C, Min, Max-Min as shown in FIG. 36 and the look up table 3004 converts that color into information close to index of reflection. This information makes it easier to pick up the edge of the picture, and for example, Y is selected as one of the colors. A threshold register 3001, a 4-bit binary circuit 3002, and a decoder 3005 cooperate to separate each picture element into eight colors of Y, M, C, G, R, W (white) from Y, M, C, Min, Max-Min. The decoder 3005 is for identify in the hue in accordance with the binary information and then outputting one-bit information of whether or not that process color is required.

Figure 36G:
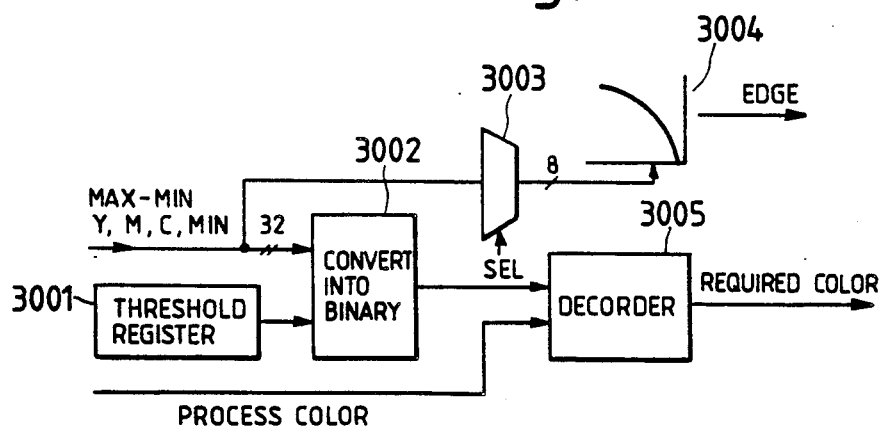
Figure 36H:
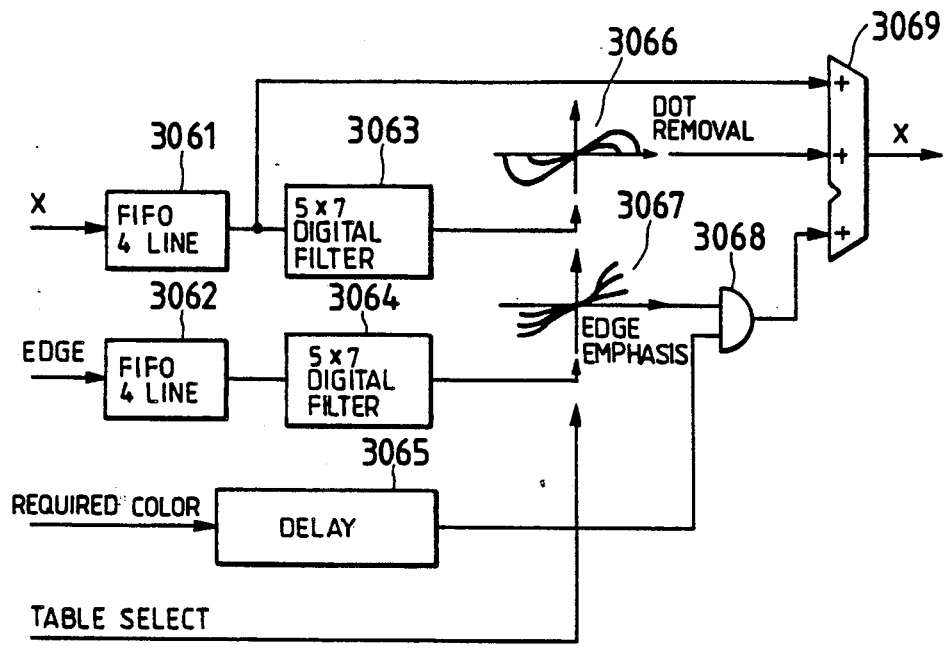

The output of FIG. 36g is inputted to the circuit shown in FIG. 36h. In FIG. 36h, a FIFO 3061, a 5×7 digital filter 3063, and a modulation table 3066 produce information for dot removal while a FIFO 3062, 5×7 digital filter 3064, a modulation table 3067, delay circuit 3065 produce an edge emphasis information from the output information of FIG. 36g. The modulation table 3066, 3067 are selected in accordance with copy mode including photo, exclusive for characters, and intermixing of both.

In edge emphasis, for example, if a green character as depicted by (i)(1) in FIG. 36 is to be reproduced as depicted in (i)(2), Y, C are emphasis processed as depicted by (i)(3) and (i)(4) but M is not emphasis processed as shown in (i)(5). The edge emphasis is switched by an AND gate 3068. If the signal is emphasized as depicted by (i)(5), then turbidity of M is caused due to color intermixing as depicted by (i)(6). The delay circuit 3065 is a circuit for the AND gate 3068 to switch such emphasis for every process color in synchronism with the FIFO 3062 and 5×7 digital filter 3064. If a brilliant green character is reproduced through ordinary process, then magenta is intermixed into the green character, causing turbidity. Thus when the color is identified to be green, Y, C are outputted normally but M is not subjected to the edge emphasis.

(G) TRC conversion module

Figure 36J:
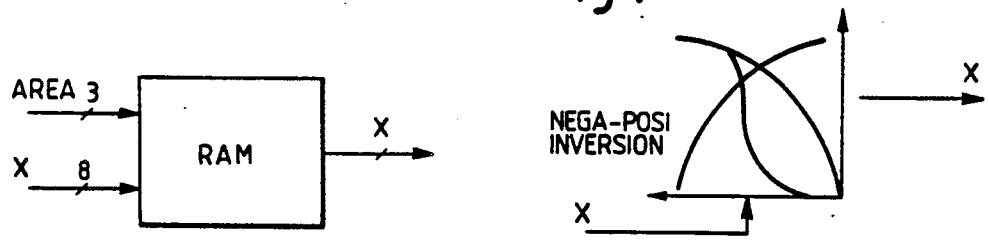
Figure 36K:
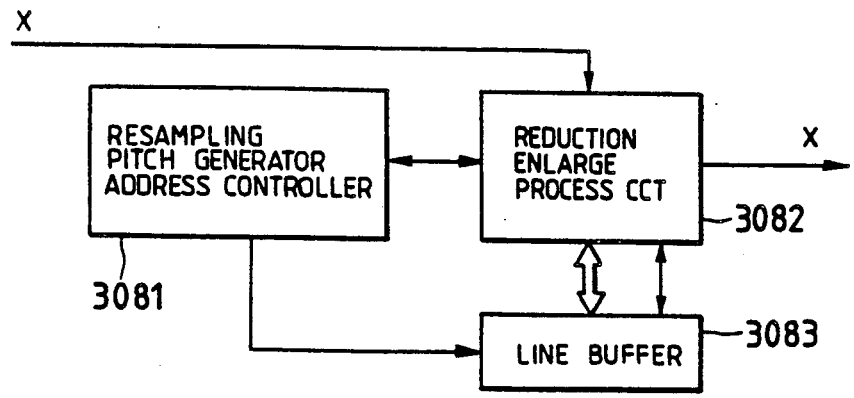
Figure 36I:
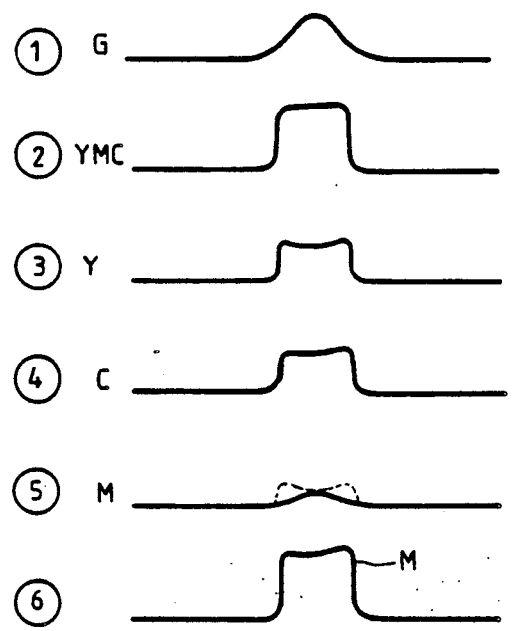
Figure 36L:
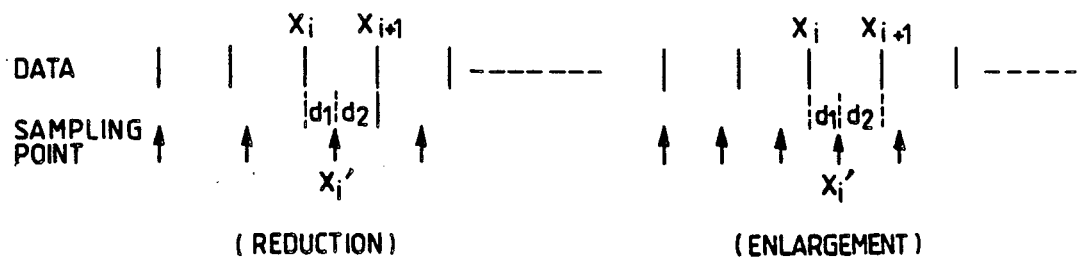

IOT executes four copy cycles (in four full color copy) for the respective process color of Y, M, C, K in accordance with ON/OFF signal from IPS, thereby enabling reproduction of the full color document. In practice, in order to faithfully reproduce the color theoretically determined through processing, fine adjustments are required taking the IOT characteristics into consideration. A TRC conversion module 309 is for improving the reproducibility of the color and has an address conversion table in a RAM thereof, address inputs of which table is of 8-bit picture data as shown in FIG. 36(j), and has editing functions of density adjustment in accordance with the area signals, contrast adjustment, negative-positive inversion, color balance adjustment, character mode, and water mark. The upper three bits of the RAM address uses the bit 0 to bit 3 of the area signal. The above described functions can be combined in the external region mode. The RAM consists of 2 kbyte (256 bytes×8 tables) to have eight conversion tables in which the data of up to eight tables is stored for the respective cycles of Y, M, C during IIT carriage return and is selected in accordance with region specified and copy modes. Of course, if the RAM capacity is increased, then it is not necessary to load the data on a cycle basis.

(H) Reduction/enlargement module

A reduction-enlargement module 308 is for reducing or enlarging the data X through a reduction/enlargement processing circuit 3082 in the course that the data X is temporarily stored in a line buffer 3083 and is outputted. A resampling generator and address controller 3081 produces a sampling pitch signal and a read/write address for the line buffer 3083. The line buffer 3083 is of a ping pong buffer consisting of two lines in which reading of one line is carried out while at the same time writing into the other line is executed. The reduction/enlargement process is digitally carried out by the reduction/enlargement processing module 308 in the main scanning direction and by varying the scan speed of IIT in the sub scan direction. The scan speed to reduce or enlarge the document in the range from 50 to 400% of its original size. In digital processing, the line buffer 3083 reduces the data by interpolating through thinning when reading and writing the data and enlarges by interpolating through adding. The interpolation data is produced through weighting process in accordance with the distance between the data on both sides as shown in FIG. 36(1) if the data is in the middle. For example, the data Xi' is determined from the data Xi, Xi+1 on the both sides and the distances d1, d2 between these data and the sampling points as follows.

$$(Xi \times d2) + \{(Xi+1) \times d1\}$$

where $d1 + d2 = 1$

In reduction process, the data is read into the line buffer 3083 while interpolating the data and at the same time the data of the preceding line that has been subjected to reduction process is read out from the buffer. In enlargement process, the data is once written as it is while at the same time the data of the preceding line is read out while being subjected to interpolation for enlargement. If the interpolation enlargement is carried out when writing, the clock rate when writing must be increased in accordance with enlargement scale. The aforementioned enlargement process permits write-/read operation at the same clock rate. By this arrangement, shift image process in the main scanning direction can be effected by reading from part way or reading at a delayed timing, repetitive process is possible by repeatedly reading out the data as well as mirror image process may be effected by reading from the opposite side.

(I) Screen generator

A screen generator 309 is for converting the degradation toner signal of the process color into the binary toner signal of ON/OFF and outputting the toner signal. The screen generator 309 performs process for producing the binary data and error diffusing process by comparing the threshold matrix and the data values represented in terms of degradation. IOT receives the binary toner signal to reproduce a picture of intermediate degradation by cycling ON and OFF a laser beam of an eliptic shape having a long diameter of 80 μm and a short diameter of 60 μm.

Figure 36M:
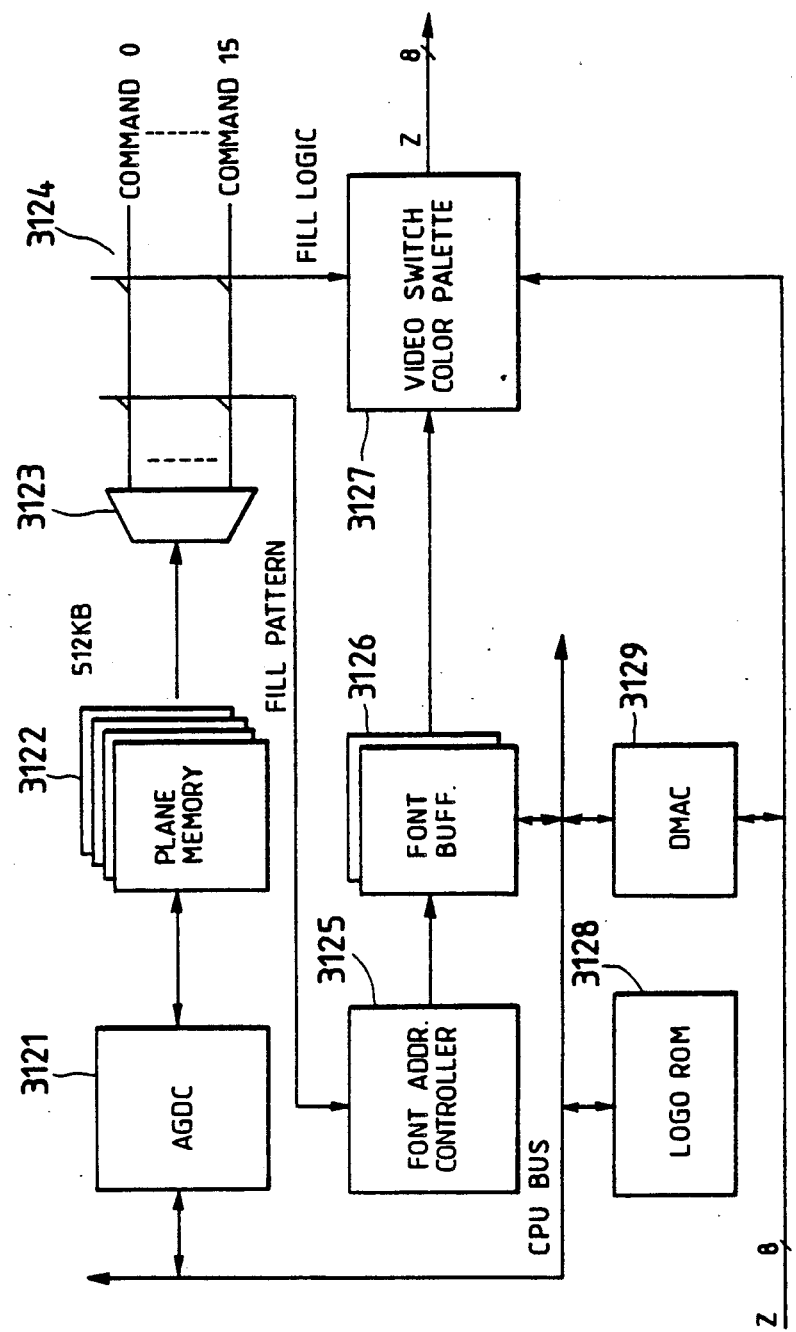
Figure 36N:
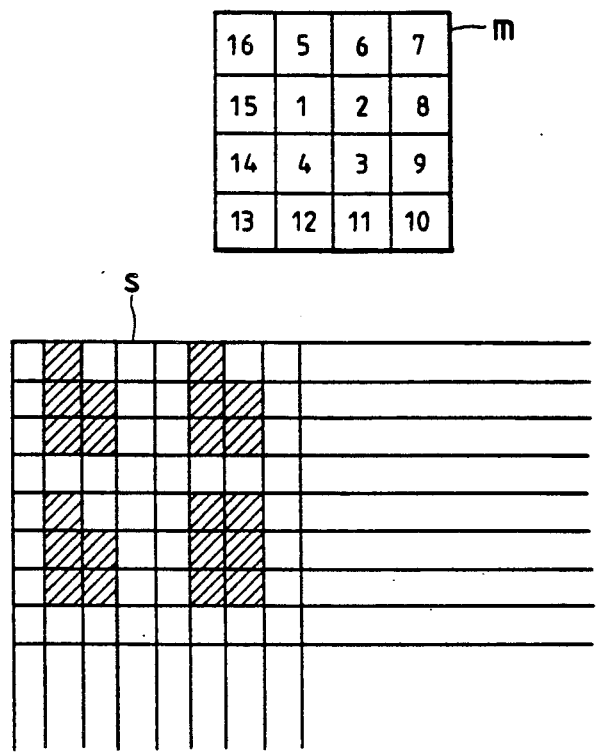

How the degradation is represented will now be described as follows. As shown in FIG. 36n, for example, a half tone cell s of 4×4 is arranged as follows. A threshold matrix m is set correspondingly to such a half tone cell s and is compared with the data value that is represented in terms of degradation. In this comparison, for example, if the data value is "5", then a signal is produced for causing the laser beam to be ON at a portion below "5" of the threshold matrix m.

Figure 36O:
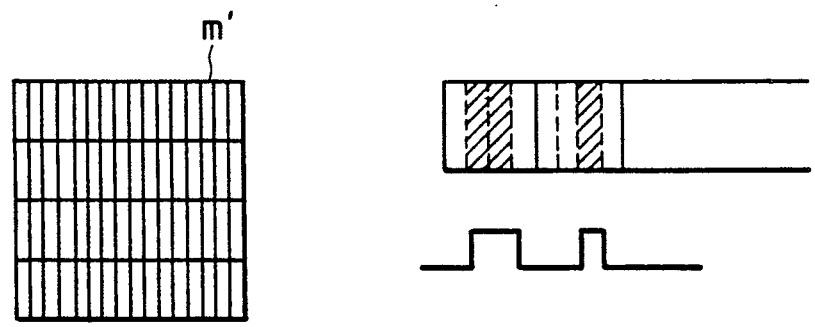

A half tone cell of 16 dots/mm, 4×4 is generally called a dot of 100 spi, 16 degradation, which causes a coarse picture and poor reproducibility of a color picture. Thus in the present invention, in order to increase the degradation, the picture element of 16 dot/mm is divided into four vertical segments (in the direction of the main scanning) and ON/OFF rate of the laser beam on a picture element basis is set to ¼ of a unit, that is four times higher rate. Thus a threshold matrix m' has been set as shown in FIG. 36o. Further it is useful to employ submatrix method to increase the number of lines.

Figure 36P:
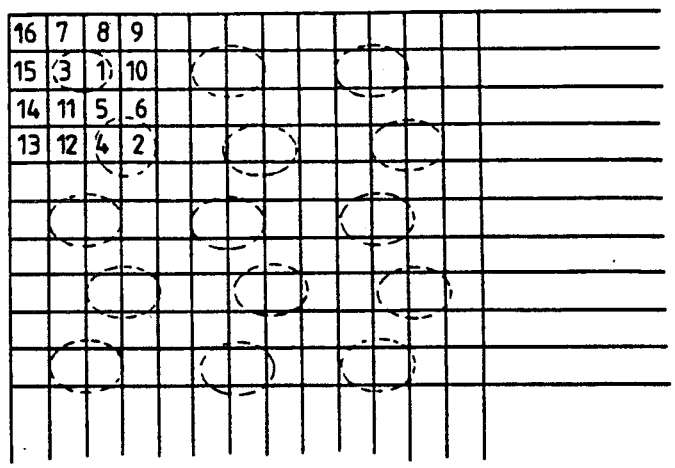

In the above example, while the same threshold matrix m in which the proximity of the middle portion of the respective half tone cell is the only growing nucleus is used, the submatrix method consists of a plurality of a unit matrix in which there are two or more growing nuclei as shown in FIG. 36p. Employment of such a pattern design approach of the screen permits varying degradation and the number of lines at will in accordance with a dark portion and a bright portion of the picture by, for example, representing the bright portion in 141 spi, 64 degradation and the dark portion in 200 spi, 128 degradation. Such pattern can be designed by deciding through visual inspection smoothness of the degradation, fineness of lines, and particle property, etc.

Figure 36Q:
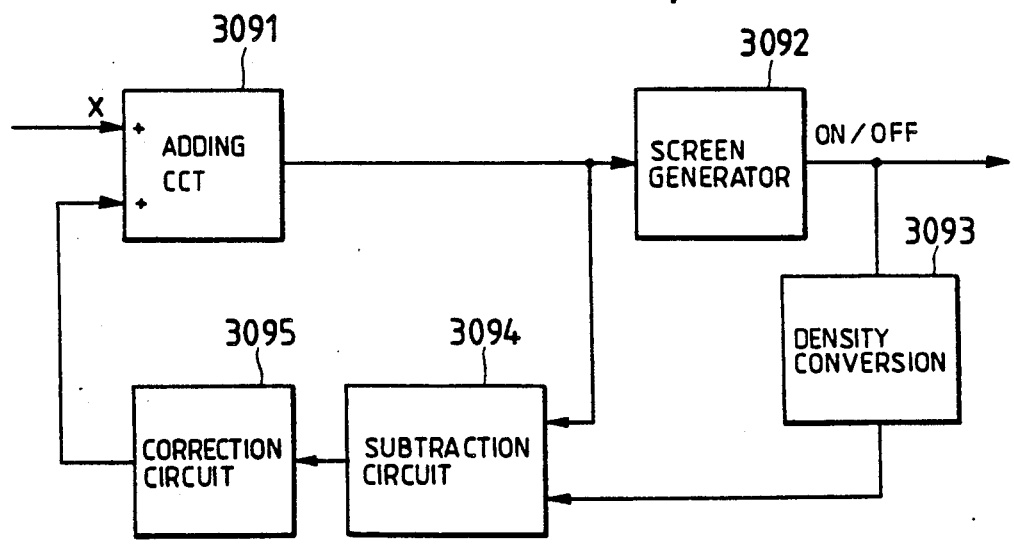

When a picture of an intermediate tone is to be reproduced by means of the dot matrix, the number of levels in degradation and resolution are in conflict with each other. That is, increasing the number of levels of degradation decreases resolution while increasing resolution decreases the number of levels of degradation. Also a small matrix of the threshold data causes quantization error of the picture that is actually output. As shown in FIG. 36q, a density conversion circuit 3093 and a subtracting circuit 3094 detects quantization error between the binary signal indicative of ON/OFF, produced by the screen generator 3092, and the degradation signal of the input signal X, thereby feeding back through a correction circuit 3095 and a subtraction circuit 3091 to improve the reproducibility of the degradation in macro view. For example, error diffusion process is carried out in order to average out through a digital filter the picture elements at a position of the document and on both sides of the picture elements to which the preceding line corresponds.

The screen generator 309 switches or selects, feedback coefficients in the error diffusion process and threshold data either on a region basis or on a document basis depending on the picture types such as pictures of intermediate level of degradation and character pictures, thereby improving reproducibility having high degradation and high definition picture.

(J) Region picture control module

A region picture control module 311 is of an arrangement capable of setting seven rectangular regions and setting the priority level thereof into a region producing circuit. A control information of the region is set in a switch matrix, corresponding to the respective regions. The control information includes color mode of whether it is color conversion, monocolor or full color, modulation select information of photograph and characters, etc., select information for TRC, and select information of the screen generator, and these are used for controlling the color masking module 302, the color conversion module 304, the UCR module 305, the space filter 306, and TRC module 307. Additionally the switch matrix may be set by the software.

(K) Edit control module

An edit control module reads documents having not only rectangular figures but also pie charts and permits line drawings in which a specified area of no particular shapes is painted out with a specified color. As shown in FIG. 36m, an AGDC (Advanced Graphic Digital Controller) 3121, font buffer 3126, logo ROM 3128, and DMAC (DMA Controller) 3129 are connected to a CPU bus. The CPU writes a 4-bit area command encoded into a plane memory 3122 through an AGDC 3121 and a font into a font buffer 3126. The place memory 3122 consists of four sheets, for example, "0000" being a command 0 indicative that original document is output; therefore the plane memory 3122 is capable of setting the respective points of the document by four bits, plane 0 to plane 3. It is a decoder 3123 that decodes the 4-bit information into the command 0 to command 15 and it is a switch matrix 3124 that determines which one of fill pattern, fill logic, or logo, the commands 0 to 15 should be assigned to. The font address controller 3125 produces addresses for the font buffer 3126 in accordance with a pattern of dot shade, hatching shade, etc. using a 2-bit fill pattern.

A switch circuit 3127 primarily selects the document data X, font buffer 3126, and color pallets depending on the content of a fill logic signal of the switch matrix 3124, and the document data X. The fill logic is information for specifying that only background (background portion of the document) is painted out with color mesh, or a particular portion is subjected to color conversion, masking and trimming, or painting out.

In IPS according to the present invention, as described above, the document-readout signal of IIT is first subjected to END conversion and then to color masking, and is then subjected to process of document size, frame erasure, and color conversion that are more efficient with full color data, thereby performing the under color removal and producing india ink to concentrate on the process color. However, processing such as space filter and color modulation, TRC, and reduction/enlargement may be reduced their amount of process in processing the data of the process color than in processing in the data of the full color as well as the number of look up tables is reduced to ½ but types of tables are increased thereby enhancing flexibility of adjustment, reproducibility of colors, reproducibility of degradation, and reproducibility of fineness.

(III-2) Hardware arrangement of image processing system

FIGS. 37(a)-(d) illustrate example of a hardware construction of IPS.

Figure 37A:
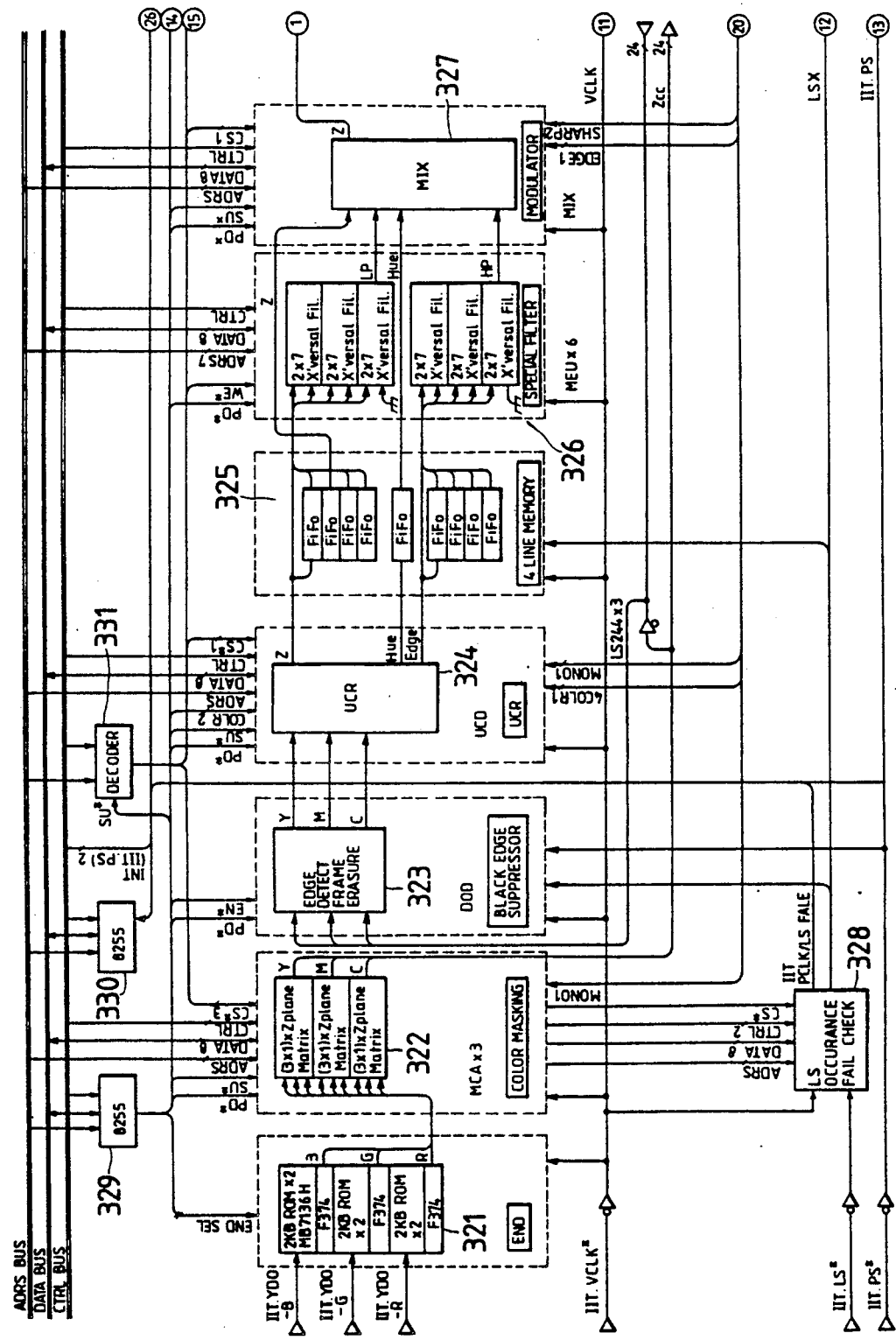
FIGS. 37(a)-(d) are diagrams for illustrating example of arranging hardware of the IPS.
Figure 37B:
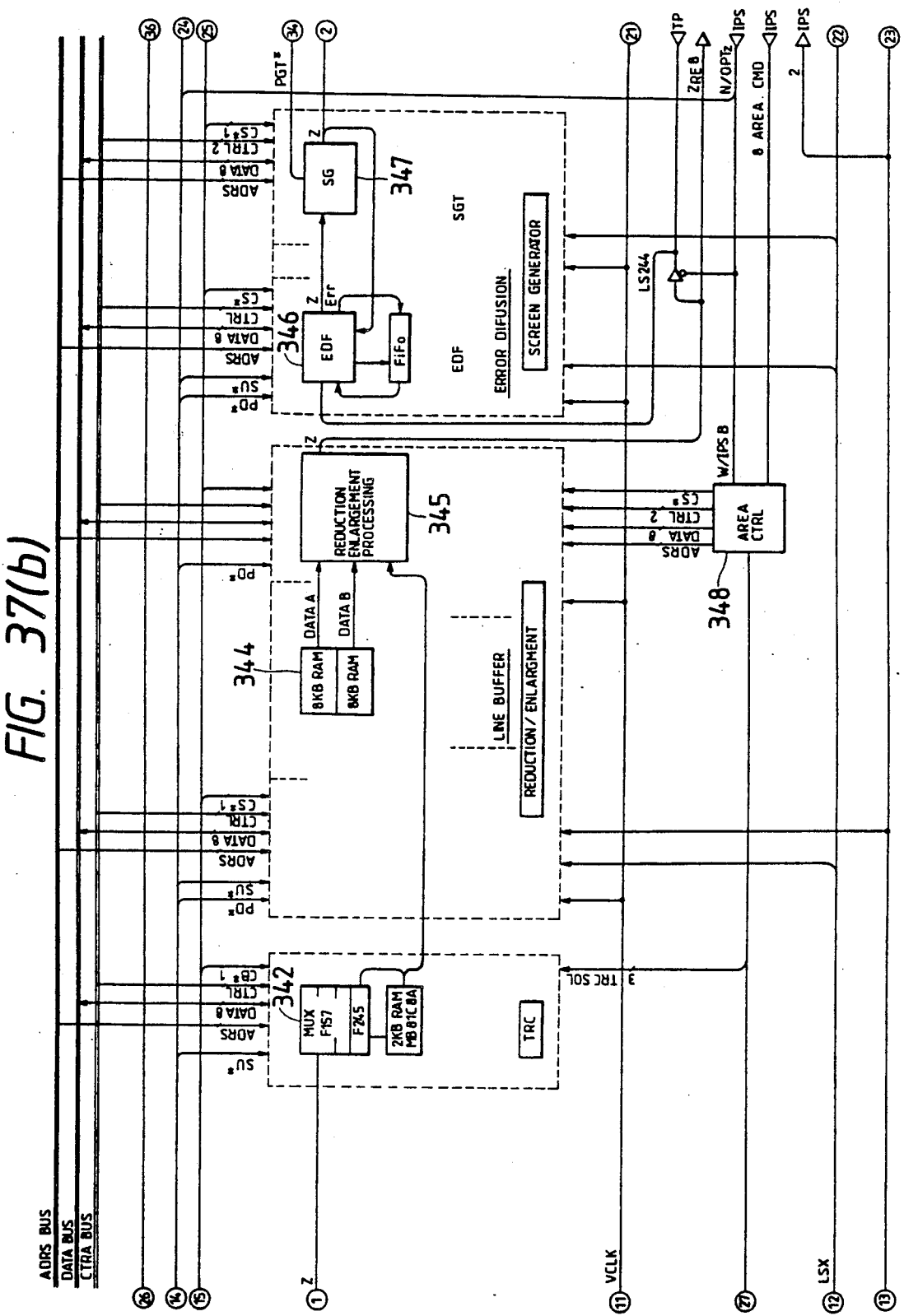
Figure 37C:
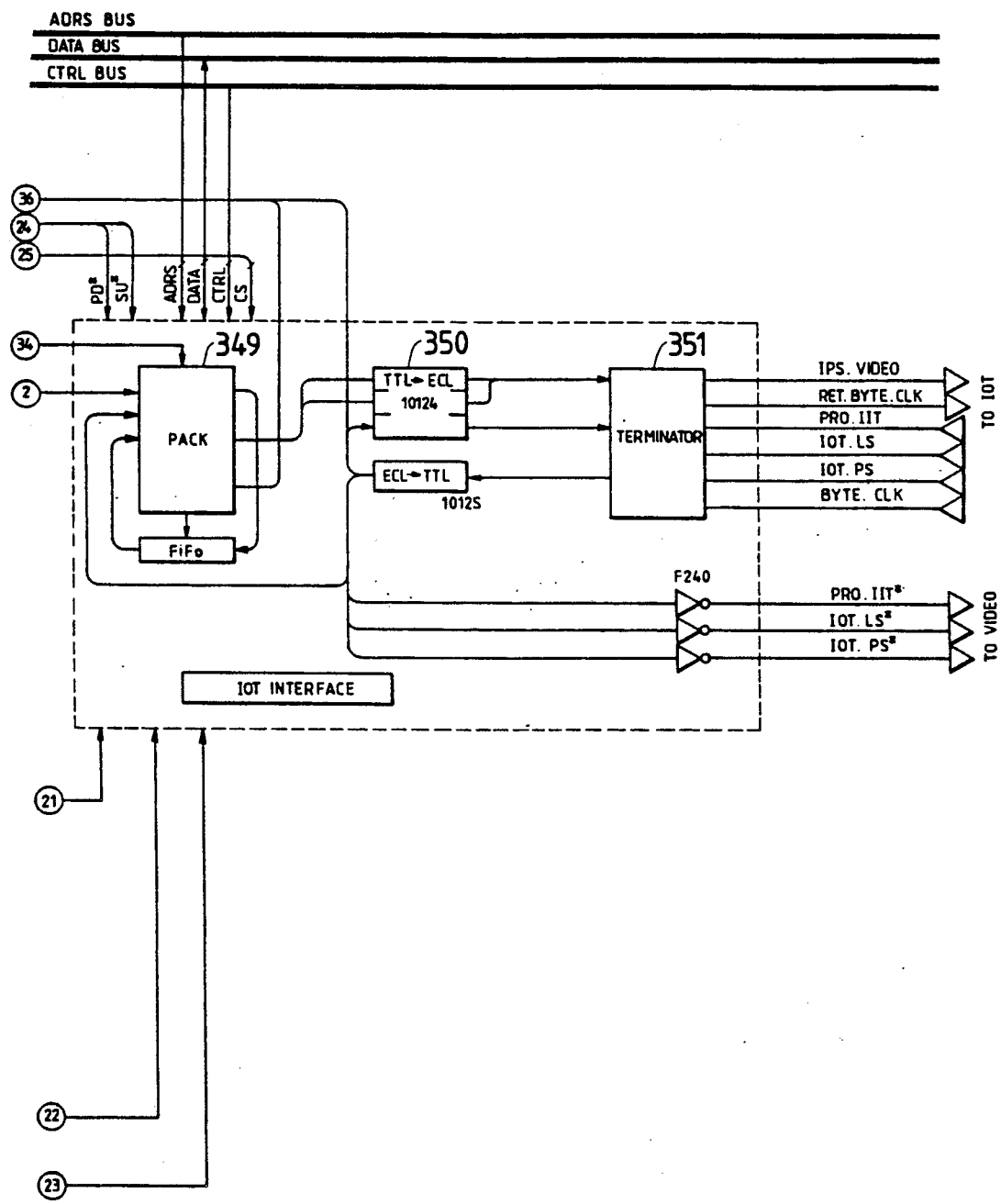

IPS according to the invention is divided into two boards, a first board (IPS-A) for carrying out the fundamental functions including color repeatability, degradation repeatability, and fineness repeatability, and a second board (IPS-B) for carrying out applied functions such as edit, and specialized functions. The construction of the former is shown in FIG. 37a-37c and that of the latter in FIG. 37d. If the first board is capable of achieving the fundamental functions, then may adjust itself to the advanced functions as well as specialized functions by simple design modification of the second board. Thus if the device is to be further improved its functions as a color picture forming device, then only the other board is required to be modified.

As shown in FIG. 37, to the IPS board are connected CPU bus (address bus ADRSBUS, data bus DATABUS, control bus CTRLBUS) and video data B, G, R of IIT, video clock IIT as a synchronism signal, VCLK, line sync signal (main scanning direction, horizontal synch) IIT LS, and page sync signal IIT PS (sub scanning direction vertical sync).

The video data is processed through pipe line process after it passes the END conversion unit, thus delay of data occurs on a clock basis in the course of the respective data processing steps. Thus a line sync generating and fail check circuit 328 produces and distributes the horizontal sync signal in accordance with such delay and also performs fail check of the video clock and the line sync signal. For this purpose, to the line sync generating and fail check circuit 328 are connected the video clock IIT VCLK and the line sync signal IIT LS as well as CPU bus (ADRSBUS DATABUS CTRLBUS), and chip select signal CS.

The video data B, G, R of IIT are input to a ROM 321 in the END conversion unit. The END conversion table may be formed of a RAM which may be loaded by means of the CPU appropriately. In the invention, since there is actually no need of rewriting data during processing the picture data with the apparatus being operative, two 2-kbyte ROMs are used for each of B, G, and R to employ LUT (look up table) method by a ROM. The apparatus is equipped with 16 tables which are selected by 4-bit selection signal ENDsel. The output of the ROM which has been subjected to END conversion, is fed to a color masking unit consisting of three operational LSIs 322 having two 3×1 matrix for each color. To the operational LSI 322 is connected the respective buses of the CPU through which the CPU can set the matrix coefficient. Connected to the operational LSI 322 are a set up signal SU and a chip select signal CS for switching from, for example, process of the picture signal to the data-rewriting by means of the CPU, etc. and a 1-bit selector signal MONO for selecting matrices. Additionally, a power down signal PD is input to the LSI 322 to halt the video clock while IIT is not scanning i.e., IIT is not processing the picture.

Figure 37D:
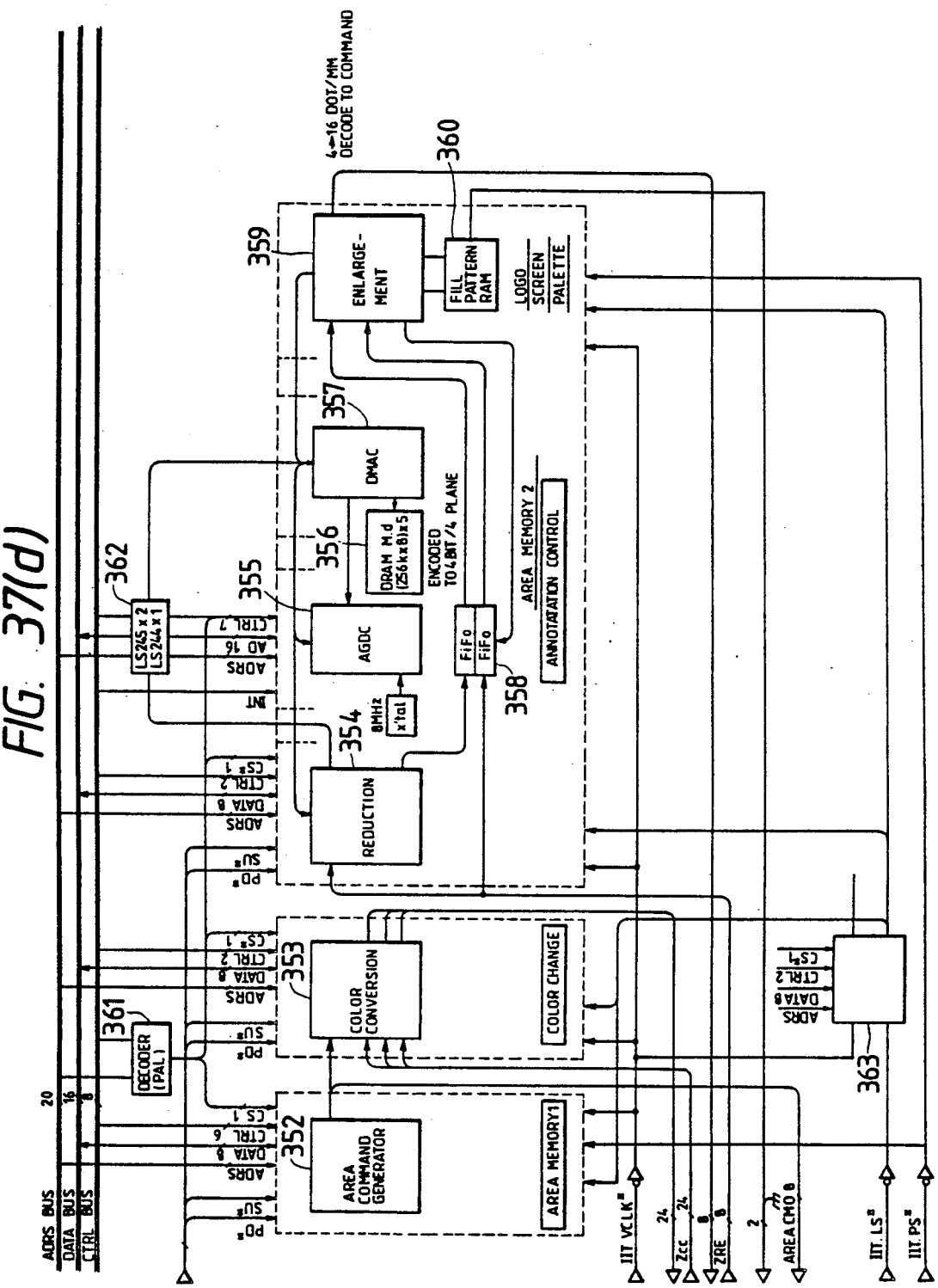

The signals that have been converted by the operational LSI 322 from B, G, R to Y, M, C, are subjected to color conversion process through a color conversion LSI 353 on the second board (IPS-B) shown in FIG. 37d and thereafter is input to the LSI 323 for DOD. Provided within the color conversion LSI 353 are four color conversion circuits including a threshold register for setting color that is not to be converted, a color pallet for setting color that is to be converted, and a comparator, etc. The LSI 323 for DOD includes primarily a document edge detection circuit, a frame erasure circuit.

The output of the LSI 323 for DOD which has been subjected to frame erasure process is supplied to an LSI 324 for UCR. The LSI 324 includes a UCR circuit and an india ink producing circuit as well as a required-color producing circuit and provides respective signals of a process color X, Hue of the required color, and Edge which correspond to the toner color in the copy cycles. Thus the LSI 324 also receives a process color specifying signal COLR of two bits and a color mode signal (4 COLR, MONO).

A line memory 325 comprises a FIFO in which data for four lines is stored and another FIFO for delaying by the same amount as the former FIFO, thereby inputting into a 5×7 digital filter 326 the respective signals, the process color X, the required color Hue, the Edge which are output from the LSI 324 for UCR. Here, process color X and the Edge enough for four lines are stored; therefore five lines in total are supplied to the digital filter 326 while the required color Hue is delayed by the FIFO to synchronize with the output of the digital filter 326 to thereby feed an LSI 327 for MIX.

The digital filter 326 comprises two 5×7 filter (LPF and HPL) formed of three 2×7 filter LSI, one of which performs process for the process color X and the other of which performs Edge process. An LSI 327 for MIX performs dots elimination and edge emphasis of these outputs through the conversion table and then mixes the outputs with the process color X. EDGE and Sharp are input as signals for selecting the conversion table.

TRC 342 comprises a 2K bytes RAM in which eight conversion tables are stored. Rewriting of the conversion tables is conveniently effected during carriage return period before scanning. TRC 342 is switched by a 3-bit switching signal TRCsel. The output from the TRC 342 is supplied through a transceiver to an LSI 345 for reduction/enlargement process. The reduction-/enlargement unit uses two 8k bytes RAMs 344 to form a line buffer, producing the resampling pitch and the address for the line buffer by the LSI 343.

The output of the reduction/enlargement unit returns to an LSI 346 for EDF through an area memory unit of the second board shown in FIG. 37d. The LSI 346 for EDF has a FIFO for retaining information of the preceding line, which is used to perform error diffusion process. The signal X through the error diffusion process is outputted to IOT interface via an LSI 347 for SG that forms a screen generator.

IOT interface reforms 1-bit ON/OFF signals, which are input from the LSI 347 for SG, into an 8-bit parallel signal and supplies it to IOT.

In the second board shown in FIG. 37, actually flowing data is of 16 dot/mm, and a reduction LSI 354 reduces the data to ¼ and transforms the data into a binary signal to store into the area memory. An enlargement decode LSI 359 has a fill pattern RAM 360 and enlarges the region information into 16 dots when the information is read out from the area memory for producing commands as well as generating the logo address, color pallet, and generating the fill pattern. A DRAM 356 stores a coded 4-bit area information formed of four pages. An AGDC 355 is an exclusive controller for controlling the area command.

As described above, according to the present invention, the picture data is subjected to density adjustment to convert into a plurality of the toner signals corresponding to the color toners Y, M, C, K for development. Thus the density balanced toner signals Y, M, C permit highly precise color region judgment, edge judgment of document, frame erasure, etc. as well as facilitates processes of color conversion, under color removal, and production of india ink. The toner signal of the developing process color X is subjected to digital filtering to produce the binary toner signal X of ON/OFF, thereby preventing Moire and blur of the reproduced pictures as well as allowing efficient process of the edge emphasis. Also control information for each region is produced, the picture signal in the region is converted and controlled, and the look up table is controlled by switching; therefore control on a region basis is facilitated corresponding to the color modes including color conversion, monocolor and full color, and picture modes including the photograph and characters. Addition of picture data such as dots, line drawing for painting and change and edit of the picture data are carried out through the toner signals of copy process color, thereby increasing degree of freedom in editting and controlling.

What is claimed is:

1. A digital image processing apparatus in which color-separation signals of a picture represented in terms of gradation are converted into binary signals, said apparatus comprising:
    END conversion means for converting color-separation signals into color signals which are gray-balanced;
    color masking means for applying color masking process to the gray-balanced color signals provided by said END conversion means to produce first-order gradation toner signals;
    background-color removing and black tone producing means for removing background-colors and for producing black tone in response to the first-order gradation signals provided by said color masking means to produce second-order gradation toner signals; and
    process toner signal processing means for applying processes for Moire prevention and edge emphasis to the second-order gradation toner signals provided by said background-color removing and black tone producing means to produce binary toner signals.

2. A digital image processing apparatus according to claim 1, wherein said process toner signal processing means is provided with a reduction/enlargement processing unit having a ping pong buffer for storing two lines into which said gradation toner signals are written on a line basis and from which said gradation toner signals are read on a line basis to thereby perform a reduction and an enlargement process.

3. A digital image processing apparatus according to claim 2, wherein said digital image processing apparatus is arranged such that reading of one line of said ping pong buffer is executed at a time when writing to the other line of said ping pong buffer is executed.

4. A digital image processing apparatus according to claim 1, wherein said process toner signal processing means is provided with a screen generator for converting said gradation toner signals into binary toner signals of on and off by comparing said gradation toner signals with a threshold matrix, and thereafter performing an error diffusion process.

5. A digital image processing apparatus according to claim 4, wherein said digital image processing apparatus is arranged to select by a region signal a combination of said threshold matrix and an ON/OFF operation of said error diffusion process.

6. A digital image processing apparatus according to claim 4, wherein said threshold matrix is formed by subdividing a pixel.

7. A digital image processing apparatus according to claim 4, wherein said threshold matrix is formed so as to have a plurality of growing nuclei.

8. A digital image processing apparatus according to claim 4, wherein said threshold matrix has a submatrix construction formed of a plurality of unit matrices, and wherein a plurality of growing nuclei are disposed in said submatrix.

9. A digital image processing apparatus according to claim 1, wherein said background-color removing and black tone producing unit detects a maximum value and a minimum value of said first-order gradation toner signals to produce an adjustment value in accordance with a difference between the maximum and minimum values as a value of the black tone, and determines a background-color removal value in accordance with the black tone value.

10. A digital image processing apparatus according to claim 9, wherein said adjustment value and said background-color removal value are determined using approximation through mathematical operation and using conversion tables.

11. A digital image processing apparatus according to claim 1, further comprising region image control means for producing control information for each of a plurality of regions in an image to control said color masking means, background-color removing and black tone producing means and process toner signal processing means.

12. A digital image processing apparatus according to claim 11, wherein said region image control means is arranged to output color mode information including color conversion and full color and picture mode information including photograph and characters as said control information.

13. A digital image processing apparatus according to claim 11, wherein said region image control means is arranged to produce said control information in accordance with a priority level between said plurality of edit regions.

14. A digital image processing apparatus according to claim 1, further comprising edit control means for controlling said first-order gradation toner signals or said second-order gradation toner signals in accordance with edit information.

15. A digital image processing apparatus according to claim 14, wherein said edit control means has a specified region and edit information of said specified region and controls a gradation toner signal of said specified region with said edit information.

16. A digital image processing apparatus according to claim 14, wherein said edit contol means produces edit commands for picture elements on the basis of said edit information to perform edit control of said gradation toner signals.

17. A digital image processing apparatus according to claim 14, wherein said edit control means is provided with a plurality of control patterns which are selectively controlled by said edit commands.

18. A digital image processing apparatus according to claim 1, wherein said END conversion means is provided with a color conversion processing unit for converting a specified color of a square which is specified and contolled by a region processing information producing means before background-color removal.

19. A digital image processing apparatus according to claim 18, wherein said region processing information producing means, and said color conversion processing unit are constructed on a circuit board.

20. A digital image processing apparatus according to claim 1, wherein said process toner signal processing means is provided with an edge detection and frame erasure unit for detecting a document size from said first-order gradation toner signals before background-color removal and for removing gradation outside the document.

21. A digital image processing apparatus according to claim 1, wherein said process toner signal processing means is provided with a digital filtering circuit for detecting hue to decide for each gradation toner signal if edge emphasis and edge damping is required, thereby controlling a level of edge emphasis.

22. A digital image processing apparatus according to claim 1, wherein said process toner signal processing means is provided with a tone correction control unit for causing said gradation toner signals to be subjected to processes including density adjustment, contrast emphasis, negative/positive inversion, and color balance adjustment.

* * * * *